US012400592B2

(12) United States Patent
Cho et al.

(10) Patent No.: US 12,400,592 B2
(45) Date of Patent: Aug. 26, 2025

(54) DISPLAY DEVICE

(71) Applicant: LG DISPLAY CO., LTD., Seoul (KR)

(72) Inventors: Youngsung Cho, Gyeonggi-do (KR); Byeong-Seong So, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 401 days.

(21) Appl. No.: 17/847,487

(22) Filed: Jun. 23, 2022

(65) Prior Publication Data

US 2023/0064771 A1 Mar. 2, 2023

(30) Foreign Application Priority Data

Aug. 25, 2021 (KR) ........................ 10-2021-0112582
Dec. 13, 2021 (KR) ........................ 10-2021-0178144

(51) Int. Cl.
*G09G 3/3233* (2016.01)

(52) U.S. Cl.
CPC ... *G09G 3/3233* (2013.01); *G09G 2300/0452* (2013.01); *G09G 2300/0819* (2013.01);
(Continued)

(58) Field of Classification Search
CPC ......... G09G 3/3233; G09G 2300/0452; G09G 2300/0819; G09G 2300/0842; G09G 2310/08; G09G 2320/0686; G09G 2300/0426; G09G 2300/0852; G09G 2300/0861; G09G 2300/0876;
(Continued)

(56) References Cited

U.S. PATENT DOCUMENTS 10,529,792 B2 * 1/2020 Kim .................. H10K 59/1213
10,984,273 B2 4/2021 Ikeda et al.
(Continued)

FOREIGN PATENT DOCUMENTS

CN 108766347 A 11/2018
CN 110379356 A 10/2019
(Continued)

OTHER PUBLICATIONS

Office Action issued in Korean Patent Application No. 10-2021-0178144 dated Apr. 24, 2023, 7 pages.
(Continued)

*Primary Examiner* — Jeff Piziali
(74) *Attorney, Agent, or Firm* — Morgan, Lewis & Bockius LLP

(57) ABSTRACT

A display device includes subpixels disposed in a display area for displaying an image. Each subpixel includes a light emitting element; a driving transistor for driving the light emitting element; and a transistor whose turn-on or turn-off may be controlled by a gate signal supplied through a gate line. The subpixels includes a subpixel disposed in a specific area in the display area, and such subpixel may include a compensation capacitor formed by overlapping of a gate node of the driving transistor or a connection pattern connected to the gate node of the driving transistor and the gate line. A voltage level of the gate signal supplied through the gate line is changed to a lower voltage level at a timing at which a data voltage or a voltage resulting from changing of the data voltage is applied to the gate node of the driving transistor.

24 Claims, 32 Drawing Sheets

(52) U.S. Cl.
CPC . *G09G 2300/0842* (2013.01); *G09G 2310/08* (2013.01); *G09G 2320/0686* (2013.01)

(58) Field of Classification Search
CPC ... G09G 2310/0251; G09G 2310/0262; G09G 2320/0233
See application file for complete search history.

(56) References Cited

U.S. PATENT DOCUMENTS

| | | | | |
|---|---|---|---|---|
| 10,984,723 | B1 | 4/2021 | Zhou et al. | |
| 11,088,078 | B2 * | 8/2021 | Huang | H01L 29/78678 |
| 11,094,772 | B2 | 8/2021 | Ma et al. | |
| 11,257,886 | B2 * | 2/2022 | Bae | H10K 50/844 |
| 11,580,888 | B2 * | 2/2023 | Liu | G09G 3/035 |
| 11,690,258 | B2 * | 6/2023 | Jang | H10K 59/124 257/72 |
| 2010/0013816 | A1 | 1/2010 | Kwak | |
| 2010/0177024 | A1 | 7/2010 | Choi | |
| 2012/0001893 | A1 | 1/2012 | Jeong et al. | |
| 2014/0320544 | A1 | 10/2014 | Kim | |
| 2017/0077199 | A1 * | 3/2017 | Nguyen | H10K 77/111 |
| 2020/0135814 | A1 | 4/2020 | Park et al. | |
| 2020/0213514 | A1 | 7/2020 | Kim et al. | |
| 2020/0234634 | A1 | 7/2020 | Li | |
| 2021/0118367 | A1 | 4/2021 | Chen | |
| 2021/0167161 | A1 | 6/2021 | Yang et al. | |
| 2021/0193781 | A1 | 6/2021 | Chim et al. | |
| 2021/0241689 | A1 | 8/2021 | Lee et al. | |
| 2022/0115480 | A1 | 4/2022 | Park et al. | |

FOREIGN PATENT DOCUMENTS

| | | | | |
|---|---|---|---|---|
| CN | 111105722 | A | 5/2020 | |
| CN | 111613180 | A | 9/2020 | |
| CN | 112992989 | A | 6/2021 | |
| CN | 113169218 | A | 7/2021 | |
| CN | 113223457 | A | 8/2021 | |
| EP | 4 195 192 | A1 | 6/2023 | |
| KR | 20100009219 | A | 1/2010 | |
| KR | 10-2014-0127048 | A | 11/2014 | |
| KR | 10-2018-0025488 | A | 3/2018 | |
| KR | 20180025488 | A * | 3/2018 | H01L 27/3272 |
| KR | 20200079868 | A | 7/2020 | |
| KR | 10-2703482 | B1 | 9/2024 | |
| TW | 201201180 | A | 1/2012 | |
| TW | 202117689 | A | 5/2021 | |

OTHER PUBLICATIONS

Notice of Allowance issued on Jun. 26, 2024 for Korean Patent Application No. 10-2021-0178144.

Office Action dated Dec. 29, 2023 for Taiwan Patent Application No. 111123240.

Taiwanese Office Action dated Jun. 28, 2023, issued in corresponding Taiwanese Patent Application No. 111123240.

Extended European Search Report of Application No. 22180100.4, dated Dec. 13, 2022, 11 pages.

Office Action issued on Sep. 5, 2023 for Japanese Patent Application No. 2022-123667.

Notice of Allowance issued on Feb. 26, 2025 for European Patent Application No. 22180100.4.

2nd Office Action issued on Jun. 14, 2025 for Chinese Patent Application No. 202210702183.6 with English translation (Note: KR20180025488A cited in this CNOA has already been cited in a prior IDS.).

* cited by examiner

DISPLAY DEVICE

CROSS-REFERENCE TO RELATED APPLICATIONS

This application claims the benefit of and priority to Korean Patent Application No. 10-2021-0112582, filed on Aug. 25, 2021, and Korean Patent Application No. 10-2021-0178144, filed on Dec. 13, 2021, the entirety of each of which is incorporated herein by reference for all purposes.

BACKGROUND

1. Technical Field

The present disclosure relates to electronic devices, and more specifically, to display devices.

2. Discussion of the Related Art

As display technology advances, display devices can provide increased functions, such as an image capture function, a sensing function, and the like as well as an image display function. To provide these functions, a display device may need to include an optical electronic device (e.g., a camera or a sensor for detecting images).

In order to receive light passing through a front surface of a display device, it may be desirable for an optical electronic device to be located in an area of the display device where incident light coming from the front surface can be advantageously received or detected. Thus, in such a display device, an optical electronic device may be located in a front portion of the display device to allow the optical electronic device to be effectively exposed to incident light. In order to install the optical electronic device in such an implementation, an increased bezel of the display device may be designed, or a notch or a hole may be formed in a display area of a display panel of the display device.

Therefore, as a display device requires an optical electronic device to receive and detect incident light and perform an intended function, a size of the bezel in the front portion of the display device may be increased, or a substantial disadvantage may be encountered in designing the front portion of the display device.

The description provided in the background section should not be assumed to be prior art merely because it is mentioned in or associated with the background section. The background section may include information that describes one or more aspects of the subject technology.

SUMMARY

The inventors have developed techniques for providing or placing one or more optical electronic devices in a display device without reducing the size of a display area of a display panel of the display device. Through the development, the inventors have invented a display panel and a display device having a light transmission structure in which even when an optical electronic device is located under the display area of the display panel, and thus, is not exposed in the front surface of the display device, the optical electronic device can normally and properly receive or detect light in accordance with one or more aspects of the subject technology.

Further, the inventors have recognized a problem in which as the optical electronic device is overlapped, due to a difference in the number of subpixels per unit area between an optical area (including one or more transmission areas) and a non-optical area (not including the transmission area), a difference in luminance occurs between the optical area and the non-optical area. Accordingly, in one or more embodiments of the subject technology, the inventors have invented a subpixel structure in the optical area having a luminance difference compensation structure that can reduce or prevent a difference in luminance between the optical area and the non-optical area.

One or more example embodiments of the present disclosure may provide a display device having a light transmission structure in which an optical electronic device located under the display area of a display panel included in the display device has a capability of normally receiving or detecting light.

One or more example embodiments of the present disclosure may provide a display device capable of normally implementing display driving in an optical area included in the display area of a display panel included in the display device and overlapping an optical electronic device.

One or more example embodiments of the present disclosure may provide a display device capable of reducing or preventing a difference in luminance between an optical area and a non-optical area.

One or more example embodiments of the present disclosure may provide a display device including one or more subpixels in an optical area which have a luminance difference compensation structure in which a difference in luminance between the optical area and a non-optical area can be reduced or prevented.

According to aspects of the present disclosure, a display device may be provided that includes a plurality of subpixels disposed in a display area for displaying images, each of the plurality of subpixels including a first node, a second node, a third node, and a fourth node, and including a light emitting element connected to the fourth node, a driving transistor that is controlled by a voltage at the second node and capable of driving the light emitting element, a first transistor that is controlled by a first scan signal supplied through a first scan line and capable of controlling a connection between the second node and the third node, a second transistor that is controlled by a light emitting control signal supplied through a light emitting control line and capable of controlling a connection between the first node and a driving voltage line, and a third transistor that is controlled by the light emitting control signal and capable of controlling a connection between the third node and the fourth node.

In the display device according to aspects of the present disclosure, the plurality of subpixels may include a first subpixel disposed in a first area of the display area.

In the display device according to aspects of the present disclosure, the second node in the first subpixel may be capacitively coupled to at least one of the first scan line and the light emitting control line.

In the display device according to aspects of the present disclosure, the first subpixel may include at least one of a first compensation capacitor between the second node and the first scan line and a second compensation capacitor between the second node and the light emitting control line.

According to aspects of the present disclosure, a display device is provided that includes a plurality of subpixels disposed in a display area for displaying images, each of the plurality of subpixels including a light emitting element, a driving transistor capable of driving the light emitting element, and at least one transistor whose turn-on and turn-off are controlled by a gate signal supplied through a gate line.

In the display device according to aspects of the present disclosure, the plurality of subpixels may include at least one subpixel disposed in a predefined area of the display area, and the subpixel disposed in the predefined area may include a compensation capacitor resulting from the overlapping of a gate node of the driving transistor or a connection pattern connected to the gate node and the gate line.

In the display device according to aspects of the present disclosure, at a timing at which a data voltage or a voltage resulting from the changing of the data voltage is applied to the gate node of the driving transistor of the subpixel disposed in the predefined area, a voltage level of the gate signal supplied through the gate line may be changed to a lower voltage level.

One or more example embodiments of the present disclosure may provide display devices having a light transmission structure in which an optical electronic device located under the display area of a display panel has a capability of normally receiving or detecting light.

One or more example embodiments of the present disclosure may provide display devices capable of normally implementing display driving in an optical area included in the display area of the display panel and overlapping an optical electronic device.

One or more example embodiments of the present disclosure may provide display devices capable of reducing or preventing a difference in luminance between an optical area and a non-optical area.

One or more example embodiments of the present disclosure may provide display devices capable of reducing or preventing a difference in luminance between an optical area and a non-optical area by designing one or more subpixels in the optical area to have a luminance difference compensation structure.

Additional features and aspects will be set forth in part in the description which follows and in part will become apparent from the description or may be learned by practice of the inventive concepts provided herein. Other features and aspects of the inventive concepts may be realized and attained by the structure particularly pointed out in, or derivable from, the written description, the claims hereof, and the appended drawings.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the appended claims. Nothing in this section should be taken as a limitation on those claims.

It is to be understood that both the foregoing general description and the following detailed description of the present disclosure are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain principles of the disclosure. In the drawings.

DETAILED DESCRIPTION

Figure 1A:
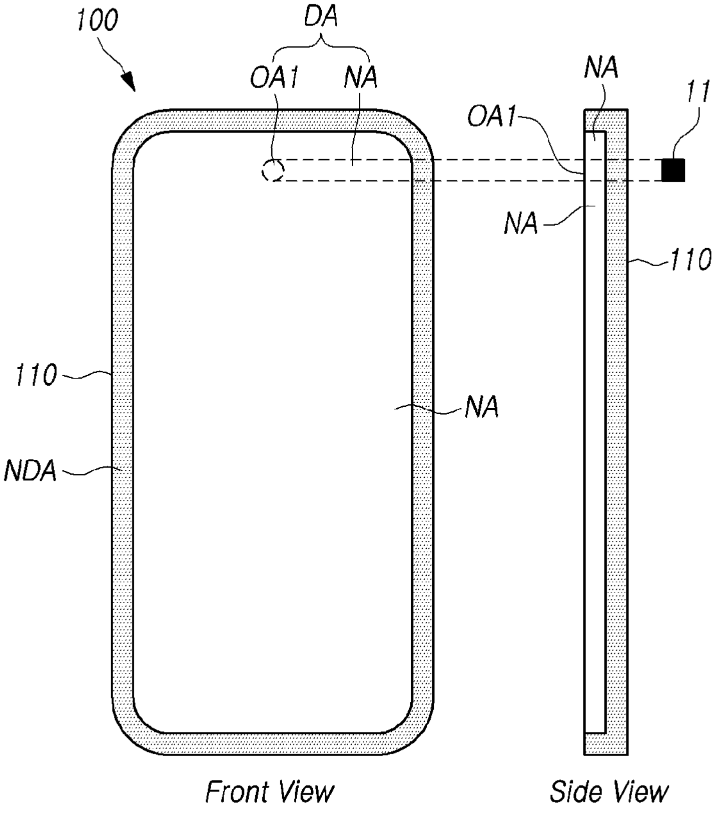
FIGS. 1A, 1B, and 1C are plan views illustrating an example display device according to aspects of the present disclosure.

Reference will now be made in detail to embodiments of the present disclosure, examples of which may be illustrated in the accompanying drawings.

In the following description, the structures, embodiments, implementations, methods and operations described herein are not limited to the specific example or examples set forth herein and may be changed as is known in the art, unless otherwise specified. Like reference numerals designate like elements throughout, unless otherwise specified. Names of the respective elements used in the following explanations are selected only for convenience of writing the specification and may thus be different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the protected scope of the present disclosure is defined by claims and their equivalents. In the following description, where the detailed description of the relevant known function or configuration may unnecessarily obscure aspects of the present disclosure, a detailed description of such known function or configuration may be omitted.

The shapes, sizes, ratios, angles, numbers, and the like, which are illustrated in the drawings to describe various example embodiments of the present disclosure, are merely given by way of example. Therefore, the present disclosure is not limited to the illustrations in the drawings.

Where the terms "comprise," "have," "include," "contain," "constitute," "make up of," "formed of," and the like are used, one or more other elements may be added unless the term, such as "only," is used. An element described in the singular form is intended to include a plurality of elements, and vice versa, unless the context clearly indicates otherwise.

Although the terms "first," "second," A, B, (a), (b), and the like may be used herein to describe various elements, these elements should not be interpreted to be limited by these terms as they are not used to define a particular order or precedence. These terms are used only to distinguish one element from another. For example, a first element could be termed a second element, and, similarly, a second element could be termed a first element, without departing from the scope of the present disclosure.

For the expression that an element or layer is "connected," "coupled," or "adhered" to another element or layer, the element or layer can not only be directly connected, coupled, or adhered to another element or layer, but also be indirectly connected, coupled, or adhered to another element or layer with one or more intervening elements or layers "disposed" or "interposed" between the elements or layers, unless otherwise specified.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers "disposed" or "interposed" between the elements or layers, unless otherwise specified.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third element or layer may be interposed therebetween. Furthermore, the terms "left," "right," "top," "bottom, "downward," "upward," "upper," "lower," and the like refer to an arbitrary frame of reference.

In describing a temporal relationship, when the temporal order is described as, for example, "after," "subsequent," "next," or "before," a case which is not continuous may be included unless a more limiting term, such as "just," "immediate(ly)," or "direct(ly)," is used.

In construing an element, the element is to be construed as including an error or tolerance range even where no explicit description of such an error or tolerance range is provided. Further, the term "may" fully encompasses all the meanings of the term "can."

The term "at least one" should be understood as including any or all combinations of one or more of the associated listed items. For example, the meaning of "at least one of a first element, a second element, and a third element" encompasses the combination of all three listed elements, combinations of any two of the three elements, as well as each individual element, the first element, the second element, and the third element.

The expression of a first element, a second elements "and/or" a third element should be understood as one of the first, second and third elements or as any or all combinations of the first, second and third elements. By way of example, A, B and/or C can refer to only A, only B, or only C; any or some combination of A, B, and C; or all of A, B, and C.

Hereinafter, various example embodiments of the present disclosure will be described in detail with reference to the accompanying drawings. In addition, for convenience of description, a scale in which each of elements is illustrated in the accompanying drawings may differ from an actual scale. Thus, the illustrated elements are not limited to the specific scale in which they are illustrated in the drawings.

Figure 1B:
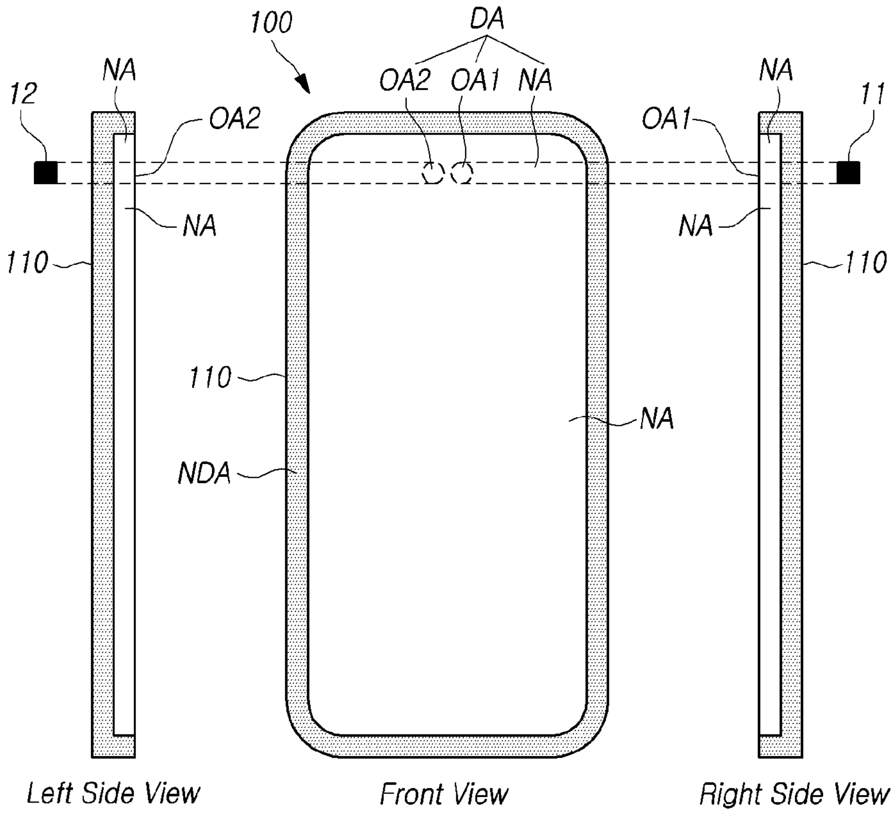
Figure 1C:
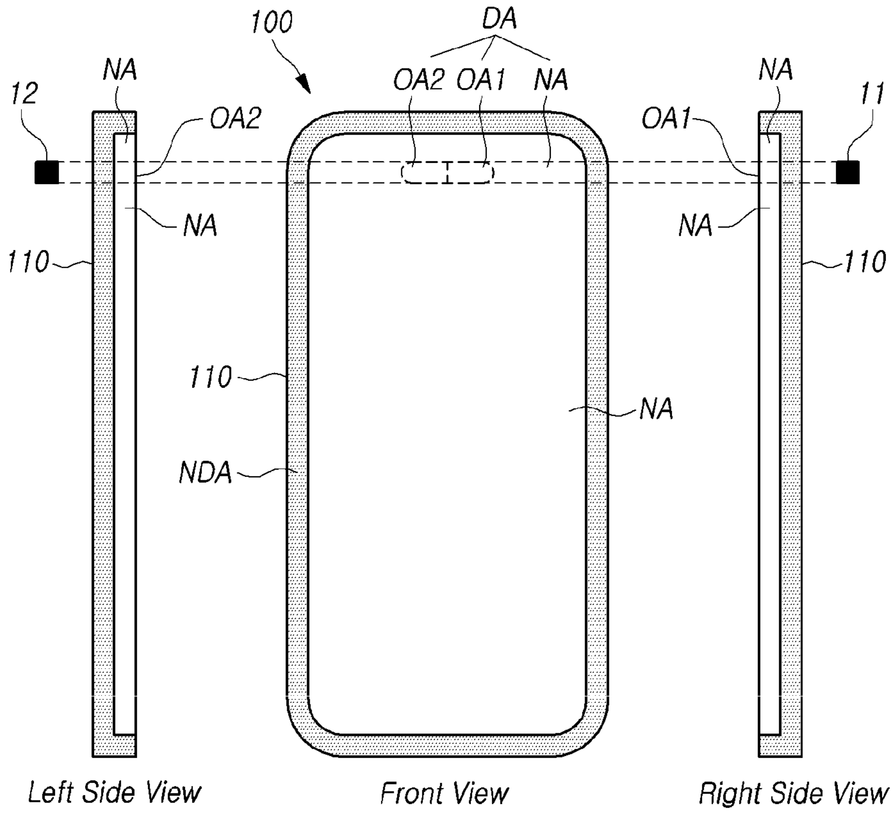

FIGS. 1A, 1B and 1C are plan views illustrating an example display device according to aspects of the present disclosure.

Referring to FIGS. 1A, 1B, and 1C, a display device 100 according to aspects of the present disclosure may include a display panel 110 for displaying one or more images, and one or more optical electronic devices 11 and 12. An optical electronic device may be referred to as a light detector, a light receiver, or a light sensing device. An optical electronic device may include one or more of the following: a camera, a camera lens, a sensor, a sensor for detecting images, or the like.

The display panel 110 may include a display area DA in which an image is displayed and a non-display area NDA in which an image is not displayed. A plurality of subpixels can be disposed in the display area DA, and several types of signal lines for driving the plurality of subpixels can be disposed therein.

The non-display area NDA may refer to an area outside of the display area DA. Several types of signal lines can be disposed in the non-display area NDA, and several types of driving circuits can be connected thereto. The non-display area NDA may be bent to be invisible from the front of the display panel or may be covered by a case (not shown). The non-display area NDA may be also referred to as a bezel or a bezel area.

Referring to FIGS. 1A, 1B, and 1C, in the display device 100 according to aspects of the present disclosure, one or more optical electronic devices 11 and 12 may be located under, or at a lower portion of, the display panel 110 (an opposite side of a viewing surface thereof).

Light can enter the front surface (viewing surface) of the display panel 110, pass through the display panel 110, reach one or more optical electronic devices 11 and 12 located under, or at the lower portion of, the display panel 110 (the opposite side of the viewing surface).

The one or more optical electronic devices 11 and 12 can receive or detect light transmitting through the display panel 110 and perform a predefined function based on the received light. For example, the one or more optical electronic devices 11 and 12 may include one or more of the following: an image capture device such as a camera (an image sensor) and/or the like; or a sensor such as a proximity sensor, an illuminance sensor, and/or the like.

Referring to FIGS. 1A, 1B, and 1C, in the display panel 110 according to aspects of the present disclosure, the display area DA may include one or more optical areas OA1 and OA2 and a non-optical area NA. The one or more optical areas OA1 and OA2 may be one or more areas overlapping the one or more optical electronic devices 11 and 12. The non-optical area NA is an area that does not overlap with one or more optical electronic devices 11 and 12, and may also be referred to as a normal area.

According to an example of FIG. 1A, the display area DA may include a first optical area OA1 and a non-optical area NA. In this example, at least a part of the first optical area OA1 may overlap a first optical electronic device 11.

According to an example of FIG. 1B, the display area DA may include a first optical area OA1, a second optical area OA2, and a non-optical area NA. In the example of FIG. 1B, the non-optical area NA may be located between the first optical area OA1 and the second optical area OA2. In this case, at least a part of the first optical area OA1 may overlap the first optical electronic device 11, and at least a part of the second optical area OA2 may overlap a second optical electronic device 12.

According to an example of FIG. 1C, the display area DA may include a first optical area OA1, a second optical area OA2, and a non-optical area NA. In the example of FIG. 1C, the non-optical area NA may not be located between the first optical area OA1 and the second optical area OA2. That is, the first optical area OA1 and the second optical area OA2 may contact each other (e.g., directly contact each other). In this case, at least a part of the first optical area OA1 may overlap the first optical electronic device 11, and at least a part of the second optical area OA2 may overlap the second optical electronic device 12.

In one or more example embodiments, both an image display structure and a light transmission structure are needed, and thus are implemented, in the one or more optical areas OA1 and OA2. In these one or more example embodiments, since the one or more optical areas OA1 and OA2 are a part of the display area DA, subpixels for displaying images are needed to be disposed, and thus are disposed, in the one or more optical areas OA1 and OA2. Further, to enable light to be transmitted to the one or more optical electronic devices 11 and 12, the light transmission structure is needed, and thus is implemented, in the one or more optical areas OA1 and OA2.

According to the example embodiments of the present disclosure, even though the one or more optical electronic devices 11 and 12 are needed to receive or detect light, the one or more optical electronic devices 11 and 12 are located on the back of the display panel 110 (e.g., on an opposite side of a viewing surface). Thus, in these example embodiments, the one or more optical electronic devices 11 and 12 are located, for example, under, or in a lower portion of, the display panel 110. That is, the one or more optical electronic devices 11 and 12 are not exposed in the front surface (viewing surface) of the display panel 110. Accordingly, when a user faces the front surface of the display device 110, the optical electronic devices 11 and 12 are located so that they are not visible to the user.

In an example embodiment, the first optical electronic device 11 may be a camera, and the second optical electronic device 12 may be a sensor. The sensor may be a proximity sensor, an illuminance sensor, an infrared sensor and/or the like. For example, the camera may be a camera lens, an image sensor, or a unit including at least one of the camera lens and the image sensor. The sensor may be, for example, an infrared sensor capable of detecting infrared rays.

In another example embodiment, the first optical electronic device 11 may be the sensor, and the second optical electronic device 12 may be the camera.

Hereinafter, simply for convenience, the descriptions below refer to example embodiments in which the first optical electronic device 11 is the camera, and the second optical electronic device 12 is the sensor. It should be, however, understood that the scope of the present disclosure includes embodiments where the first optical electronic device 11 is the sensor, and the second optical electronic device 12 is the camera.

In an example where the first optical electronic device 11 is the camera, this camera may be located on the back of (e.g., under, or in a lower portion of) the display panel 110, and be a front camera capable of capturing objects in a front direction of the display panel 110. Accordingly, the user can capture an image through the camera that is not visible on the viewing surface while looking at the viewing surface of the display panel 110.

Although the non-optical area NA and the one or more optical areas OA1 and OA2 included in the display area DA in each of FIGS. 1A, 1B, and 1C are areas where images can be displayed, the non-optical area NA is an area where a light transmission structure need not be implemented; however, the one or more optical areas OA1 and OA2 are areas in which the light transmission structure need be implemented. Thus, in one or more example embodiments, the non-optical area NA is an area where a light transmission structure is not implemented or included, and the one or more optical areas OA1 and OA2 are areas in which the light transmission structure is implemented or included.

Accordingly, the one or more optical areas OA1 and OA2 may have a transmittance greater than or equal to a predetermined level, i.e., a relatively high transmittance, and the non-optical area NA may not have light transmittance or have a transmittance less than the predetermined level, i.e., a relatively low transmittance.

For example, the one or more optical areas OA1 and OA2 may have a resolution, a subpixel arrangement structure, the number of subpixels per unit area, an electrode structure, a line structure, an electrode arrangement structure, a line arrangement structure, and/or the like different from that/those of the non-optical area NA.

In an example embodiment, the number of subpixels per unit area in the one or more optical areas OA1 and OA2 may be smaller than the number of subpixels per unit area in the non-optical area NA. That is, the resolution of the one or more optical areas OA1 and OA2 may be lower than that of the non-optical area NA. In this example, the number of subpixels per unit area may have the same meaning as a resolution, a pixel density, or a degree of integration of pixels. For example, the unit of the number of subpixels per unit area may be pixels per inch (PPI), which represents the number of pixels within 1 inch.

In an example embodiment of each of FIGS. 1A, 1B, and 1C, the number of subpixels per unit area in the first optical areas OA1 may be less than the number of subpixels per unit area in the non-optical area NA. In an example embodiment of each of FIGS. 1A, 1B, and 1C, the number of subpixels per unit area in the second optical areas OA2 may be greater than or equal to the number of subpixels per unit area in the first optical areas OA1, and be less than the number of subpixels per unit area in the non-optical area NA.

In an example embodiment of each of FIGS. 1A, 1B, and 1C, as a method for increasing a transmittance of at least one of the first optical area OA1 and the second optical area OA2, a technique (which may be referred to as a "pixel density differentiation design scheme") may be applied such that a density of pixels or a degree of integration of pixels is differentiated as described above. According to the pixel density differentiation design scheme, in an example embodiment, the display panel 110 may be configured or designed such that the number of subpixels per unit area of at least one of the first optical area OA1 and the second optical area OA2 is greater than the number of subpixels per unit area of the non-optical area NA.

In another example embodiment, as another method for increasing a transmittance of at least one of the first optical area OA1 and the second optical area OA2, another technique (which may be referred to as a "pixel size differentiation design scheme") may be applied so that a size of a pixel is differentiated. According to the pixel size differentiation design scheme, the display panel 110 may be configured or designed such that the number of subpixels per unit area of at least one of the first optical area OA1 and the second optical area OA2 is equal to or similar to the number of subpixels per unit area of the non-optical area NA; however, a size of each subpixel (i.e., a size of a corresponding light emitting area) disposed in at least one of the first optical area OA1 and the second optical area OA2 is smaller than a size of each subpixel (i.e., a size of a corresponding light emitting area) disposed in the non-optical area NA.

In one or more aspects, for convenience of description, the discussion that follows is provided based on the pixel density differentiation design scheme of the two schemes (i.e., the pixel density differentiation design scheme and the pixel size differentiation design scheme) for increasing the transmittance of at least one of the first optical area OA1 and the second optical area OA2, unless explicitly stated otherwise.

In each of FIGS. 1A, 1B, and 1C, the first optical area OA1 may have various shapes, such as a circle, an ellipse, a quadrangle, a hexagon, an octagon or the like. In each of FIGS. 1B and 1C, the second optical area OA2 may have various shapes, such as a circle, an ellipse, a quadrangle, a hexagon, an octagon or the like. The first optical area OA1 and the second optical area OA2 may have the same shape or different shapes.

Referring to FIG. 1C, in an example where the first optical area OA1 and the second optical area OA2 contact each other (e.g., directly contact each other), the entire optical area including the first optical area OA1 and the second optical area OA2 may also have various shapes, such as a circle, an ellipse, a quadrangle, a hexagon, an octagon or the like. Hereinafter, for convenience of description, discussions will be provided based on an example embodiment in which each of the first optical area OA1 and the second optical area OA2 has a circular shape. It should be, however, understood that the scope of the present disclosure includes embodiments where one or both of the first optical area OA1 and the second optical area OA2 have a shape other than a circular shape.

When the display device 100 according to aspects of the present disclosure has a structure in which the first optical electronic device 11, such as a camera, is located under, or in a lower portion of, the display panel 100 without being exposed to the outside, such a display device 100 according to aspects of the present disclosure may be referred to as a display in which a under-display camera (UDC) technology is implemented.

According to this example configuration, with respect to the display device 100 according to aspects of the present disclosure, since a notch or a camera hole for exposing a camera need not be formed in the display panel 110, the subject technology can prevent the area of the display area DA from being reduced. In other words, since the notch or the camera hole for camera exposure need not be formed in the display panel 110, the size of the bezel area can be reduced, and a substantial disadvantage in design can be removed or reduced, thereby increasing the degree of freedom in design.

Although the one or more optical electronic devices 11 and 12 are located on the back of (e.g., under or in a lower portion of) the display panel 110 of the display device 100 (e.g., hidden or not exposed to the outside), in one or more aspects, the one or more optical electronic devices 11 and 12 can perform their normal predefined functionalities, and, thus, are able to receive or detect light.

Further, in the display device 100 according to aspects of the present disclosure, although one or more optical electronic devices 11 and 12 are located on the back of (e.g., under or in a lower portion of) the display panel 110 to be hidden and located to be overlapped with the display area DA, it is necessary for image display to be normally performed in the one or more optical areas OA1 and OA2 overlapping the one or more optical electronic devices 11 and 12 in the display area DA. Thus, in one or more examples, even though one or more optical electronic devices 11 and 12 are located on the back of the display panel, images can be displayed in a normal manner (e.g., without reduction in image quality) in the one or more optical areas OA1 and OA2 overlapping the one or more optical electronic devices 11 and 12 in the display area DA.

Figure 2:
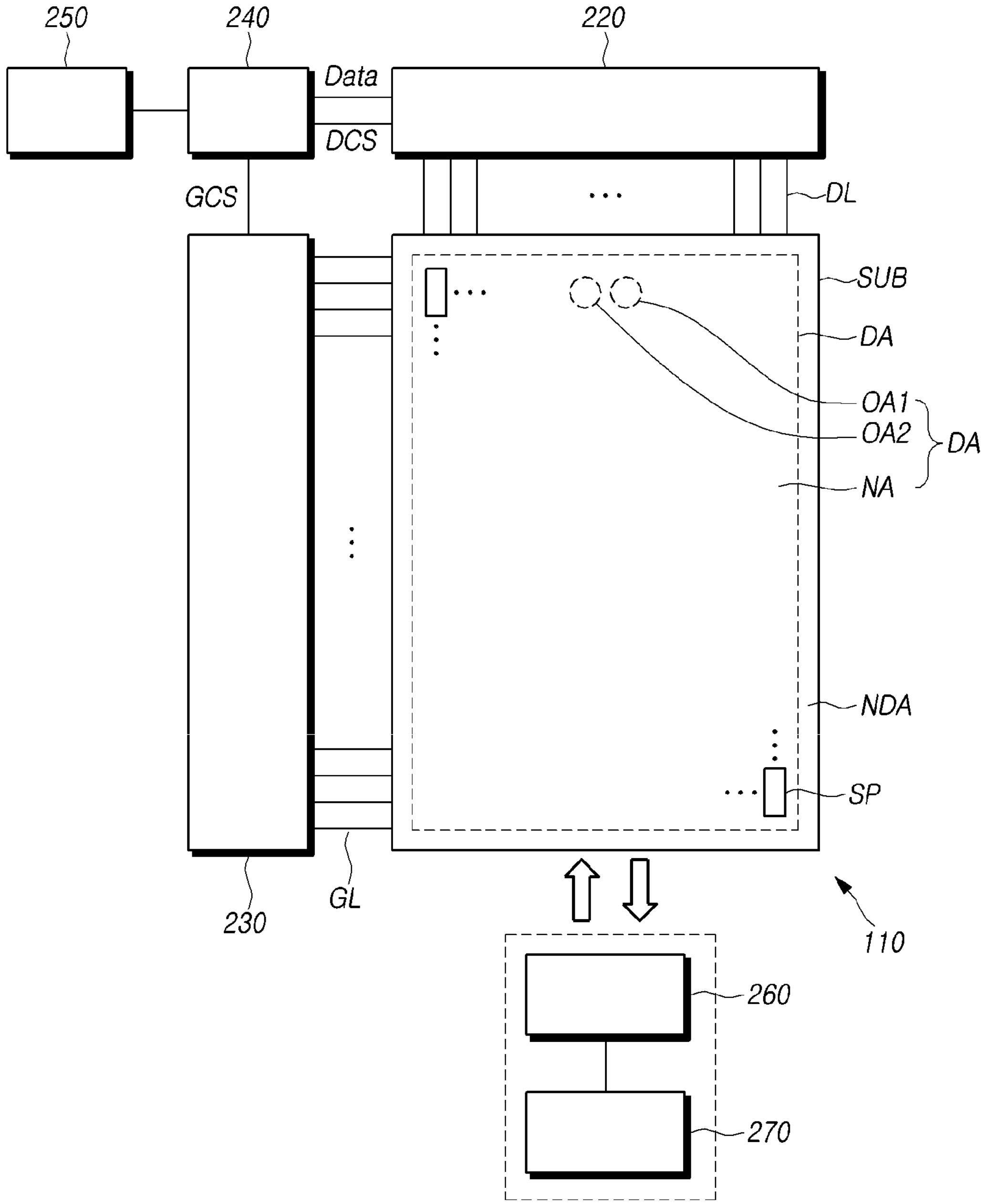
FIG. 2 illustrates an example system configuration of the display device according to aspects of the present disclosure.

FIG. 2 illustrates an example system configuration of the display device 100 according to aspects of the present disclosure. Referring to FIG. 2, the display device 100 can include the display panel 110 and a display driving circuit as components for displaying an image.

The display driving circuit is a circuit for driving the display panel 110, and may include a data driving circuit 220, a gate driving circuit 230, a display controller 240, and other components.

The display panel 110 may include the display area DA in which an image is displayed and the non-display area NDA in which an image is not displayed. The non-display area NDA may be an area outside of the display area DA, and may also be referred to as a bezel area. All or a part of the non-display area NDA may be an area visible from the front surface of the display device 100, or an area that is bent and not visible from the front surface of the display device 100.

The display panel 110 may include a substrate SUB and a plurality of subpixels SP disposed on the substrate SUB. The display panel 110 may further include various types of signal lines to drive the plurality of subpixels SP.

The display device 100 according to aspects of the present disclosure may be a liquid crystal display device, or the like, or a self-emissive display device in which light is emitted from the display panel 110 itself. When the display device 100 according to aspects of the present disclosure is the self-emissive display device, each of the plurality of subpixels SP may include a light emitting element.

In an example embodiment, the display device 100 according to aspects of the present disclosure may be an organic light emitting display device in which the light emitting element is implemented using an organic light emitting diode (OLED). For another example, embodiment, the display device 100 according to aspects of the present disclosure may be an inorganic light emitting display device in which the light emitting element is implemented using an inorganic material-based light emitting diode. In yet another example embodiment, the display device 100 according to aspects of the present disclosure may be a quantum dot display device in which the light emitting element is implemented using quantum dots, which are self-emissive semiconductor crystals.

The structure of each of the plurality of subpixels SP may vary according to types of the display devices 100. For example, when the display device 100 is a self-emissive display device including self-emissive subpixels SP, each subpixel SP may include a self-emissive light emitting element, one or more transistors, and one or more capacitors.

For example, various types of signal lines may include a plurality of data lines DL for carrying data signals (which may be referred to as data voltages or image signals), a plurality of gate lines GL for carrying gate signals (which may be referred to as scan signals), and the like.

The plurality of data lines DL and the plurality of gate lines GL may intersect each other. Each of the plurality of data lines DL may be disposed to extend in a first direction. Each of the plurality of gate lines GL may be disposed to extend in a second direction. Here, the first direction may be a column direction, and the second direction may be a row direction. Alternatively, the first direction may be the row direction, and the second direction may be the column direction.

The data driving circuit 220 is a circuit for driving the plurality of data lines DL, and can supply data signals to the plurality of data lines DL. The gate driving circuit 230 is a circuit for driving the plurality of gate lines GL, and can supply gate signals to the plurality of gate lines GL.

The display controller 240 may be a device for controlling the data driving circuit 220 and the gate driving circuit 230, and can control driving timing for the plurality of data lines DL and driving timing for the plurality of gate lines GL. The display controller 240 can supply a data driving control signal DCS to the data driving circuit 220 to control the data driving circuit 220, and supply a gate driving control signal GCS to the gate driving circuit 230 to control the gate driving circuit 230. The display controller 240 can receive input image data from a host system 250 and supply image data Data to the data driving circuit 220 based on the input image data.

The data driving circuit 220 can receive the digital image data Data from the display controller 240, convert the received image data Data into analog data signals, and supply the resulting analog data signals to the plurality of data lines DL.

The gate driving circuit 230 can receive a first gate voltage corresponding to a turn-on level voltage and a second gate voltage corresponding to a turn-off level voltage along with various gate driving control signals GCS, generate gate signals, and supply the generated gate signals to the plurality of gate lines GL.

In some example embodiments, the data driving circuit 220 may be connected to the display panel 110 in a tape automated bonding (TAB) type, or connected to a conductive pad such as a bonding pad of the display panel 110 in a chip on glass (COG) type or a chip on panel (COP) type, or connected to the display panel 110 in a chip on film (COF) type.

In some example embodiments, the gate driving circuit 230 may be connected to the display panel 110 in the tape automated bonding (TAB) type, or connected to a conductive pad such as a bonding pad of the display panel 110 in the chip on glass (COG) type or the chip on panel (COP) type, or connected to the display panel 110 in the chip on film (COF) type. In another example embodiment, the gate driving circuit 230 may be disposed in the non-display area NDA of the display panel 110 in a gate in panel (GIP) type. The gate driving circuit 230 may be disposed on or over the substrate, or connected to the substrate. That is, in the case of the GIP type, the gate driving circuit 230 may be disposed in the non-display area NDA of the substrate. The gate driving circuit 230 may be connected to the substrate in the case of the chip on glass (COG) type, the chip on film (COF) type, or the like.

In an example embodiment, at least one of the data driving circuit 220 and the gate driving circuit 230 may be disposed in the display area DA of the display panel 110. For example, at least one of the data driving circuit 220 and the gate driving circuit 230 may be disposed not to overlap subpixels SP, or disposed to overlap one or more, or all, of the subpixels SP.

The data driving circuit 220 may also be located in, but not limited to, one portion (e.g., an upper portion or a lower portion) of the display panel 110. In some example embodiments, the data driving circuit 220 may be located in, but not limited to, two portions (e.g., an upper portion and a lower portion) of the display panel 110 or at least two of four portions (e.g., the upper portion, the lower portion, a left portion, and a right portion) of the display panel 110 according to driving schemes, panel design schemes, or the like.

The gate driving circuit 230 may also be located in, but not limited to, one portion (e.g., a left portion or a right portion) of the display panel 110. In some example embodiments, the gate driving circuit 230 may be located in, but not limited to, two portions (e.g., a left portion and a right portion) of the display panel 110 or at least two of four portions (e.g., an upper portion, a lower portion, the left portion, and the right portion) of the display panel 110 according to driving schemes, panel design schemes, or the like.

The display controller 240 may be implemented in a separate component from the data driving circuit 220, or integrated with the data driving circuit 220 and thus implemented in an integrated circuit.

The display controller 240 may be a timing controller used in a typical display technology or a controller or a control device capable of performing other control functions in addition to the function of the typical timing controller. In some example embodiments, the display controller 140 may be a controller or a control device different from the timing controller, or a circuitry or a component included in the controller or the control device. The display controller 240 may be implemented with various circuits or electronic components such as an integrated circuit (IC), a field programmable gate array (FPGA), an application specific integrated circuit (ASIC), a processor, and/or the like.

The display controller 240 may be mounted on a printed circuit board, a flexible printed circuit, and/or the like and be electrically connected to the gate driving circuit 220 and the data driving circuit 230 through the printed circuit board, flexible printed circuit, and/or the like.

The display controller 240 may transmit signals to, and receive signals from, the data driving circuit 220 via one or more predetermined interfaces. In some example embodiments, such interfaces may include a low voltage differential signaling (LVDS) interface, an Embedded Clock Point-Point Interface (EPI), a serial peripheral interface (SPI), and the like.

In order to further provide a touch sensing function, as well as an image display function, the display device 100 according to aspects of the present disclosure may include at least one touch sensor, and a touch sensing circuit capable of detecting whether a touch event occurs by a touch object such as a finger, a pen, or the like, or of detecting a corresponding touch position, by sensing the touch sensor.

The touch sensing circuit may include a touch driving circuit 260 capable of generating and providing touch sensing data by driving and sensing the touch sensor and may also include a touch controller 270 capable of detecting the occurrence of a touch event or detecting a touch position using the touch sensing data, and the like.

The touch sensor may include a plurality of touch electrodes. The touch sensor may further include a plurality of touch lines for electrically connecting the plurality of touch electrodes to the touch driving circuit 260.

The touch sensor may be disposed in a touch panel, or in the form of a touch panel, outside of the display panel 110, or be disposed inside of the display panel 110. When the touch sensor is disposed in the touch panel, or in the form of the touch panel, outside of the display panel 110, such a touch sensor is referred to as an add-on type. When the add-on type of touch sensor is disposed, the touch panel and the display panel 110 may be separately manufactured and combined during an assembly process. The add-on type of touch panel may include a touch panel substrate and a plurality of touch electrodes on the touch panel substrate.

In order to have the touch sensor disposed inside of the display panel 110, a process of manufacturing the display panel 110 may include disposing the touch sensor over the substrate SUB together with signal lines and electrodes related to driving the display device.

The touch driving circuit 260 can supply a touch driving signal to at least one of the plurality of touch electrodes, and sense at least one of the plurality of touch electrodes to generate touch sensing data.

The touch sensing circuit can perform touch sensing using a self-capacitance sensing method or a mutual-capacitance sensing method.

When the touch sensing circuit performs touch sensing in the self-capacitance sensing method, the touch sensing circuit can perform touch sensing based on capacitance between each touch electrode and a touch object (e.g., a finger or a pen). According to the self-capacitance sensing method, each of the plurality of touch electrodes can serve as both a driving touch electrode and a sensing touch electrode. The touch driving circuit 260 can drive all or a part of the plurality of touch electrodes and sense all or a part of the plurality of touch electrodes.

When the touch sensing circuit performs touch sensing in the mutual-capacitance sensing method, the touch sensing circuit can perform touch sensing based on capacitance between touch electrodes. According to the mutual-capacitance sensing method, the plurality of touch electrodes are divided into driving touch electrodes and sensing touch electrodes. The touch driving circuit 260 can drive the driving touch electrodes and sense the sensing touch electrodes.

The touch driving circuit 260 and the touch controller 270 included in the touch sensing circuit may be implemented in separate devices or in a single device. Further, the touch driving circuit 260 and the data driving circuit 220 may be implemented in separate devices or in a single device.

The display device 100 may further include a power supply circuit for supplying various types of power to the display driving circuit and/or the touch sensing circuit.

The display device 100 according to aspects of the present disclosure may be a mobile terminal such as a smart phone, a tablet, or the like, or a monitor, a television (TV), or the like. Such devices may be of various types, sizes, and shapes. The display device 100 according to example embodiments of the present disclosure are not limited thereto, and includes displays of various types, sizes, and shapes for displaying information or images.

As described above, the display area DA of the display panel 110 may include a non-optical area NA and one or more optical areas OA1 and OA2. The non-optical area NA and the one or more optical areas OA1 and OA2 are areas where an image can be displayed. However, the non-optical area NA is an area in which a light transmission structure need not be implemented, and the one or more optical areas OA1 and OA2 are areas in which the light transmission structure need be implemented.

As discussed above with respect to the examples of FIGS. 1A, 1B, and 1C, although the display area DA of the display panel 110 may include the one or more optical areas OA1 and OA2 in addition to the non-optical area NA, for convenience of description, in the discussion that follows, it is assumed that the display area DA includes the first and second optical areas OA1 and OA2 and a non-optical area NA; and the non-optical area NA thereof includes the non-optical areas NAs in FIGS. 1A, 1B, and 1C, and the first and second optical areas OA1 and OA2 thereof include the first optical areas OA1*s* in FIGS. 1A, 1B, and 1C and the second optical areas OA2*s* of FIGS. 1B and 1C, respectively, unless explicitly stated otherwise.

Figure 3:
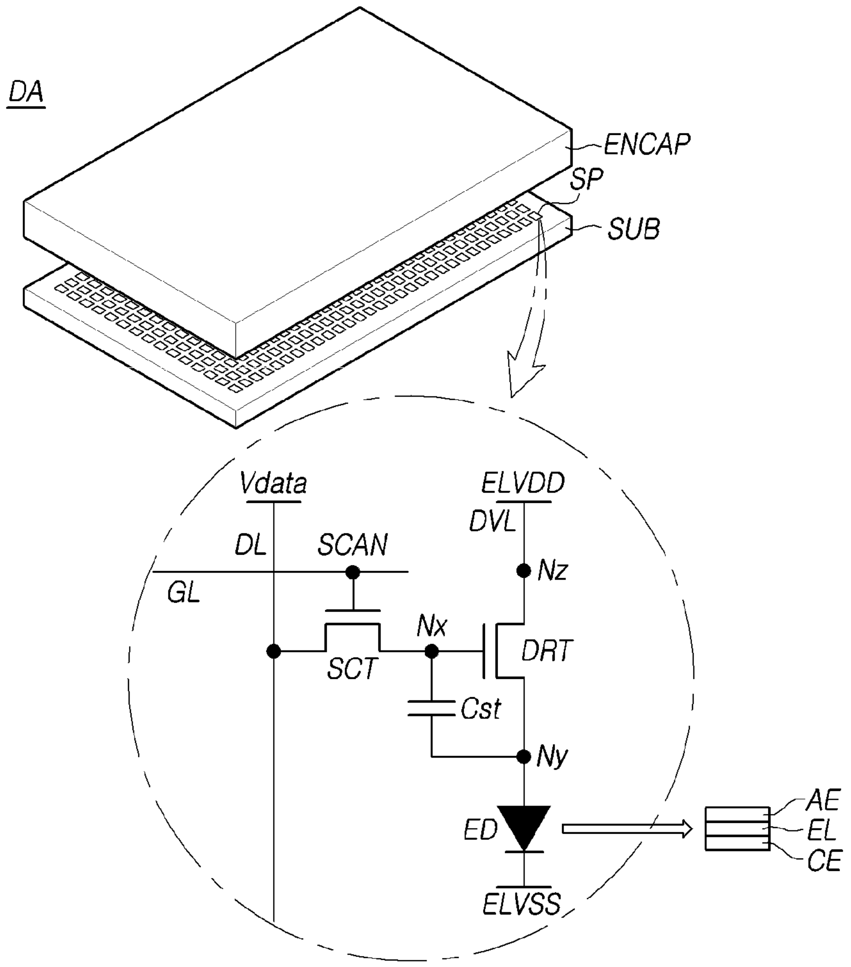
FIG. 3 illustrates an example equivalent circuit of a subpixel in a display panel according to aspects of the present disclosure.

FIG. 3 illustrates an example equivalent circuit of a subpixel SP in the display panel 110 according to aspects of the present disclosure.

Each of subpixels SP disposed in the non-optical area NA, the first optical area OA1, and the second optical area OA2 included in the display area DA of the display panel 110 may include a light emitting element ED, a driving transistor DRT for driving the light emitting element ED, a scan transistor SCT for transmitting a data voltage Vdata to a first node Nx of the driving transistor DRT, a storage capacitor Cst for maintaining a voltage at an approximate constant level during one frame, and the like.

The driving transistor DRT may include the first node Nx to which a data voltage is applied, a second node Ny electrically connected to the light emitting element ED, and a third node Nz to which a driving voltage ELVDD through a driving voltage line DVL is applied. In the driving transistor DRT, the first node Nx may be a gate node, the second node Ny may be a source node or a drain node, and the third node Nz may be the drain node or the source node.

The light emitting element ED may include an anode electrode AE, an emissive layer EL, and a cathode electrode CE. The anode electrode AE may be a pixel electrode disposed in each subpixel SP, and may be electrically connected to the second node Ny of the driving transistor DRT of each subpixel SP. The cathode electrode CE may be a common electrode commonly disposed in the plurality of subpixels SP, and a base voltage ELVSS such as a low-level voltage may be applied to the cathode electrode CE.

For example, the anode electrode AE may be the pixel electrode, and the cathode electrode CE may be the common electrode. In another example, the anode electrode AE may be the common electrode, and the cathode electrode CE may be the pixel electrode. For convenience of description, in the discussion that follows, it is assumed that the anode electrode AE is the pixel electrode, and the cathode electrode CE is the common electrode unless explicitly stated otherwise.

The light emitting element ED may be, for example, an organic light emitting diode (OLED), an inorganic light emitting diode, a quantum dot light emitting element, or the like. When the organic light emitting diode is used as the light emitting element ED, the emissive layer EL thereof may include an organic emissive layer including an organic material.

The scan transistor SCT may be turned on and off by a scan signal SCAN that is a gate signal applied through a gate line GL, and be electrically connected between the first node Nx of the driving transistor DRT and a data line DL.

The storage capacitor Cst may be electrically connected between the first node Nx and the second node Ny of the driving transistor DRT.

Each subpixel SP may include two transistors (2T: DRT and SCT) and one capacitor (1C: Cst) (which may be referred to as a "2T1C structure") as shown in FIG. 3, and in some cases, may further include one or more transistors, or further include one or more capacitors.

In an example embodiment, the storage capacitor Cst, which may be present between the first node Nx and the second node Ny of the driving transistor DRT, may be an external capacitor intentionally configured or designed to be located outside of the driving transistor DRT, other than internal capacitors, such as parasitic capacitors (e.g., a gate-to-source capacitance (Cgs) or a gate-to-drain capacitance (Cgd)). Each of the driving transistor DRT and the scan transistor SCT may be an n-type transistor or a p-type transistor.

Since circuit elements (e.g., in particular, a light emitting element ED) in each subpixel SP are vulnerable to external moisture or oxygen, an encapsulation layer ENCAP may be disposed in the display panel 110 in order to prevent the external moisture or oxygen from penetrating into the circuit elements (e.g., in particular, the light emitting element ED). The encapsulation layer ENCAP may be disposed to cover the light emitting element ED.

Figure 4:
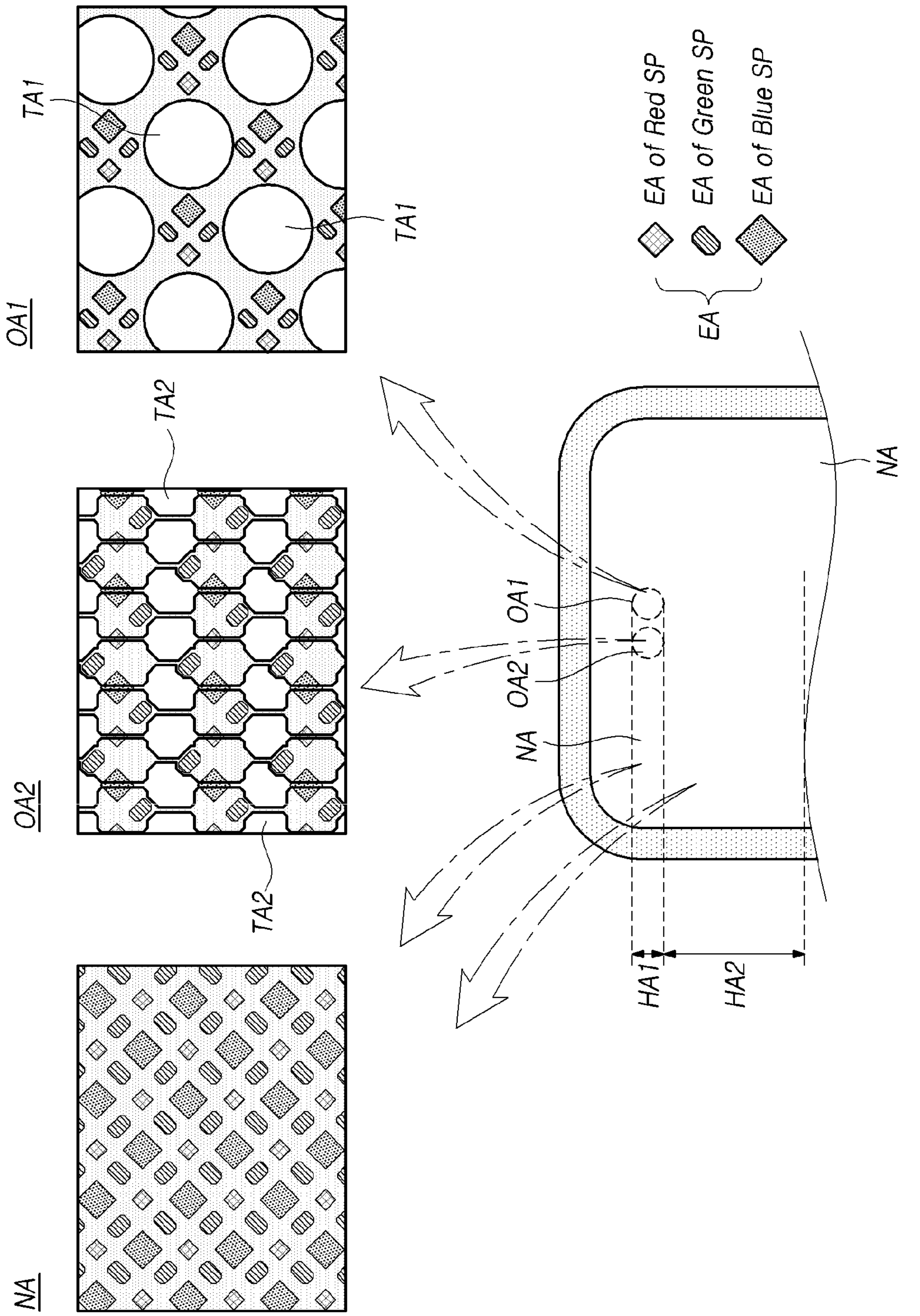
FIG. 4 illustrates example arrangements of subpixels in three areas included in a display area of the display panel according to aspects of the present disclosure.

FIG. 4 illustrates example arrangements of subpixels SP in the three areas NA, OA1, OA2 included in the display area DA of the display panel 110 according to aspects of the present disclosure.

Referring to FIG. 4, a plurality of subpixels SP may be disposed in each of the non-optical area NA, the first optical area OA1, and the second optical area OA2 included in the display area DA.

The plurality of subpixels SP may include, for example, a red subpixel (Red SP) emitting red light, a green subpixel (Green SP) emitting green light, and a blue subpixel (Blue SP) emitting blue light.

Accordingly, each of the non-optical area NA, the first optical area OA1, and the second optical area OA2 may include one or more light emitting areas EA of one or more red subpixels (Red SP), and one or more light emitting areas EA of one or more green subpixels (Green SP), and one or more light emitting areas EA of one or more blue subpixels (Blue SP).

Referring to FIG. 4, in one or more example embodiments, the non-optical area NA may not, and do not, include a light transmission structure, but may include light emitting areas EA. However, in one or more example embodiments, the first optical area OA1 and the second optical area OA2 need to include, and thus include, both the light emitting areas EA and the light transmission structure. Accordingly, in one or more example embodiments, the first optical area OA1 may include light emitting areas EA and first transmission areas TA1, and the second optical area OA2 may include the light emitting areas EA and second transmission area TA2.

The light emitting areas EA and the transmission areas TA1 and TA2 may be distinct according to whether the transmission of light is allowed. That is, the light emitting areas EA may be areas not allowing light to transmit (e.g., not allowing light to transmit to the back of the display panel), and the transmission areas TA1 and TA2 may be areas allowing light to transmit (e.g., allowing light to transmit to the back of the display panel).

The light emitting areas EA and the transmission areas TA1 and TA2 may be also distinct according to whether or not a specific metal layer is included. For example, a cathode electrode (e.g., the cathode electrode CE of FIG. 3) may be disposed in the light emitting areas EA, and the cathode electrode may not be, and is not, disposed in the transmission areas TA1 and TA2. Further, in one or more example embodiments, a light shield layer may be disposed in the light emitting areas EA, and the light shield layer may not be, and is not, disposed in the transmission areas TA1 and TA2.

Since the first optical area OA1 includes the first transmission areas TA1 and the second optical area OA2 includes the second transmission areas TA2, both of the first optical area OA1 and the second optical area OA2 are areas through which light can pass.

In an example embodiment, a transmittance (a degree of transmission) of the first optical area OA1 and a transmittance (a degree of transmission) of the second optical area OA2 may be substantially equal. In this case, in one example, the first transmission area TA1 of the first optical area OA1 and the second transmission area TA2 of the second optical area OA2 may have a substantially equal shape or size. In another example, even when the first transmission area TA1 of the first optical area OA1 and the second transmission area TA2 of the second optical area OA2 have different shapes or sizes, a ratio of the first transmission area TA1 in the first optical area OA1 and a ratio of the second transmission area TA2 in the second optical area OA2 may be substantially equal. In an example, each of the first transmission areas TA1*s* has the same shape and size. In an example, each of the second transmission areas TA2*s* has the same shape and size. A ratio of the first transmission area TA1 in the first optical area OA1 may refer to a ratio of the total area of all TA1*s* in all OA1*s* in the display panel 110 to the total area of all OA1*s* of the display panel 110. A ratio of the second transmission area TA2 in the second optical area OA2 may refer to a ratio of the total area of all TA2*s* in all OA2*s* of the display panel 110 to the total area of all OA2*s* of the display panel 110.

In another example embodiment, a transmittance (a degree of transmission) of the first optical area OA1 and a transmittance (a degree of transmission) of the second optical area OA2 may be different. In this case, in one example, the first transmission area TA1 of the first optical area OA1 and the second transmission area TA2 of the second optical area OA2 may have different shapes or sizes. In another example, even when the first transmission area TA1 of the first optical area OA1 and the second transmission area TA2 of the second optical area OA2 have a substantially equal shape or size, a ratio of the first transmission area TA1 in the first optical area OA1 and a ratio of the second transmission area TA2 in the second optical area OA2 may be different from each other.

For example, in a case where a first optical electronic device (e.g., the first optical electronic device 11 of FIGS. 1A, 1B and 1C) overlapping the first optical area OA1 is a camera, and a second optical electronic device (e.g., the second optical electronic device 12 of FIGS. 1B and 1C) overlapping the second optical area OA2 is a sensor for detecting images, the camera may need a greater amount of light than the sensor. Thus, in this case, the transmittance (degree of transmission) of the first optical area OA1 may be greater than the transmittance (degree of transmission) of the second optical area OA2. Further, in this case, the first transmission area TA1 of the first optical area OA1 may have a size greater than the second transmission area TA2 of the second optical area OA2. In another example, even when the first transmission area TA1 of the first optical area OA1 and the second transmission area TA2 of the second optical area OA2 have a substantially equal size, a ratio of the first transmission area TA1 in the first optical area OA1 may be greater than a ratio of the second transmission area TA2 in the second optical area OA2.

For convenience of description, the discussion that follows is provided based on the example embodiments in which the transmittance (degree of transmission) of the first optical area OA1 is greater than the transmittance (degree of transmission) of the second optical area OA2.

Further, the transmission areas TA1 and TA2 as shown in FIG. 4 may be referred to as transparent areas, and the term transmittance may be referred to as transparency. Further, in the discussion that follows, it is assumed that the first optical areas OA1*s* and the second optical areas OA2*s* are located in an upper edge of the display area DA of the display panel 110, and are disposed to be horizontally adjacent to each other such as being disposed in a direction in which the upper edge extends, as shown in FIG. 4, unless explicitly stated otherwise.

Referring to FIG. 4, a horizontal display area in which the first optical area OA1 and the second optical area OA2 are disposed is referred to as a first horizontal display area HAL and another horizontal display area in which the first optical area OA1 and the second optical area OA2 are not disposed is referred to as a second horizontal display area HA2.

Referring to FIG. 4, the first horizontal display area HA1 may include the non-optical area NA, the first optical area OA1, and the second optical area OA2. The second horizontal display area HA2 may include only the non-optical area NA.

In one or more aspects, the pixel density differentiation design scheme as described above may be applied as a method for increasing a transmittance of at least one of the first optical area OA1 and the second optical area OA2. According to the pixel density differentiation design scheme, in an example embodiment, the display panel 110 may be configured or designed such that the number of subpixels per unit area of at least one of the first optical area OA1 and the second optical area OA2 is greater than the number of subpixels per unit area of the non-optical area NA.

In another example embodiment, the pixel size differentiation design scheme may be applied as another method for increasing a transmittance of at least one of the first optical area OA1 and the second optical area OA2. According to the pixel size differentiation design scheme, the display panel 110 may be configured or designed such that the number of subpixels per unit area of at least one of the first optical area OA1 and the second optical area OA2 is equal to or similar to the number of subpixels per unit area of the non-optical area NA; however, a size of each subpixel SP (i.e., a size of a corresponding light emitting area) disposed in at least one of the first optical area OA1 and the second optical area OA2 is smaller than a size of each subpixel SP (i.e., a size of a corresponding light emitting area) disposed in the non-optical area NA.

For convenience of description, the discussion that follows is provided based on the pixel density differentiation design scheme of the two schemes (i.e., the pixel density differentiation design scheme and the pixel size differentiation design scheme) for increasing the transmittance of at least one of the first optical area OA1 and the second optical area OA2, unless explicitly stated otherwise.

Subpixels SP included in the first optical area OA1 may be disposed to be distributed over the whole (an edge area and an inner area thereof) of the first optical area OA1 as shown in FIG. 4, or be disposed only in the edge area of the first optical area OA1.

Likewise, subpixels SP included in the second optical area OA2 may be disposed to be distributed over the whole (an edge area and an inner area thereof) of the second optical area OA2 as shown in FIG. 4, or be disposed only in the edge area of the second optical area OA2.

Figure 5A:
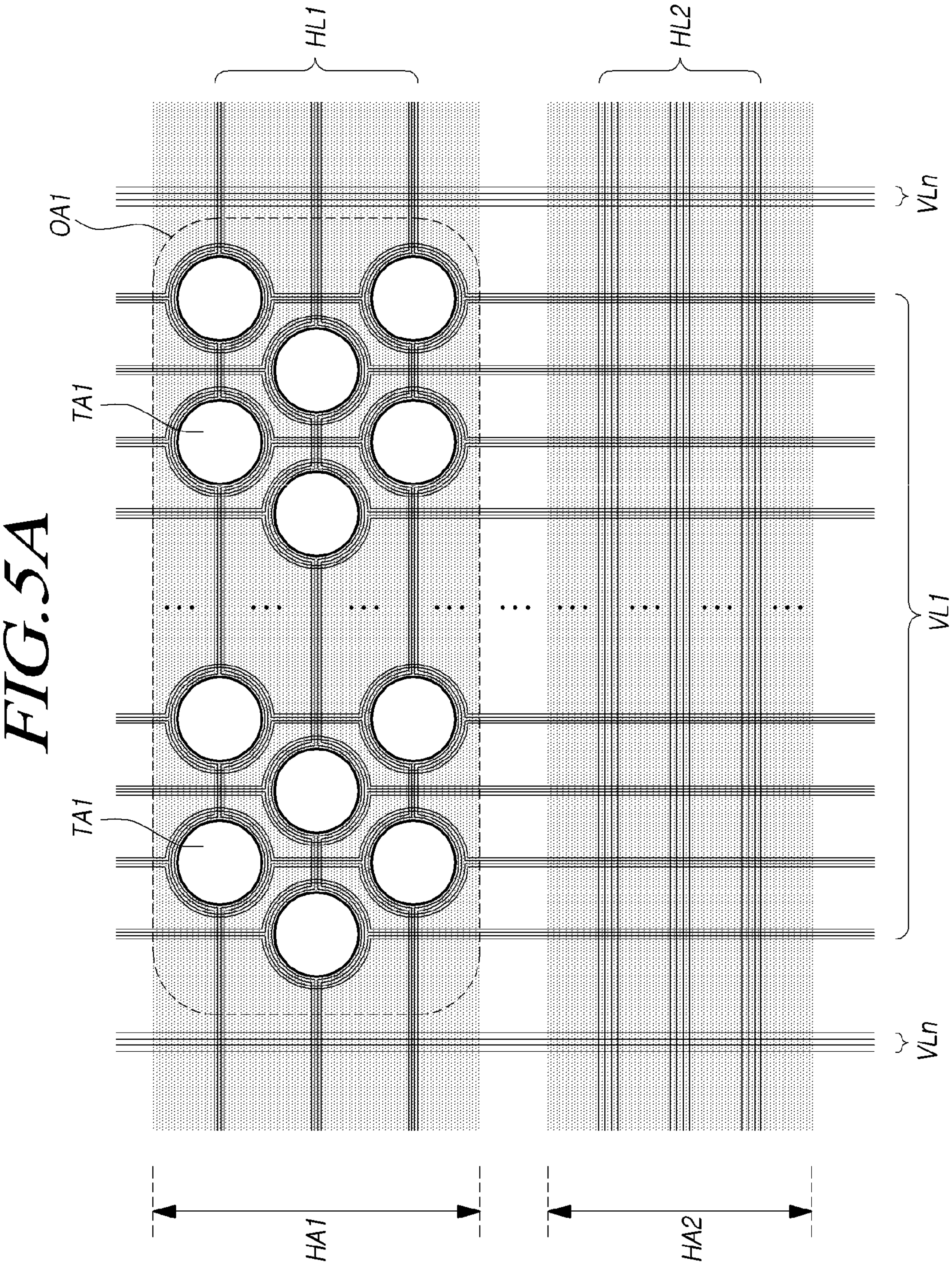
FIG. 5A illustrates example arrangements of signal lines in each of a first optical area and a non-optical area in the display panel according to aspects of the present disclosure.
Figure 5B:
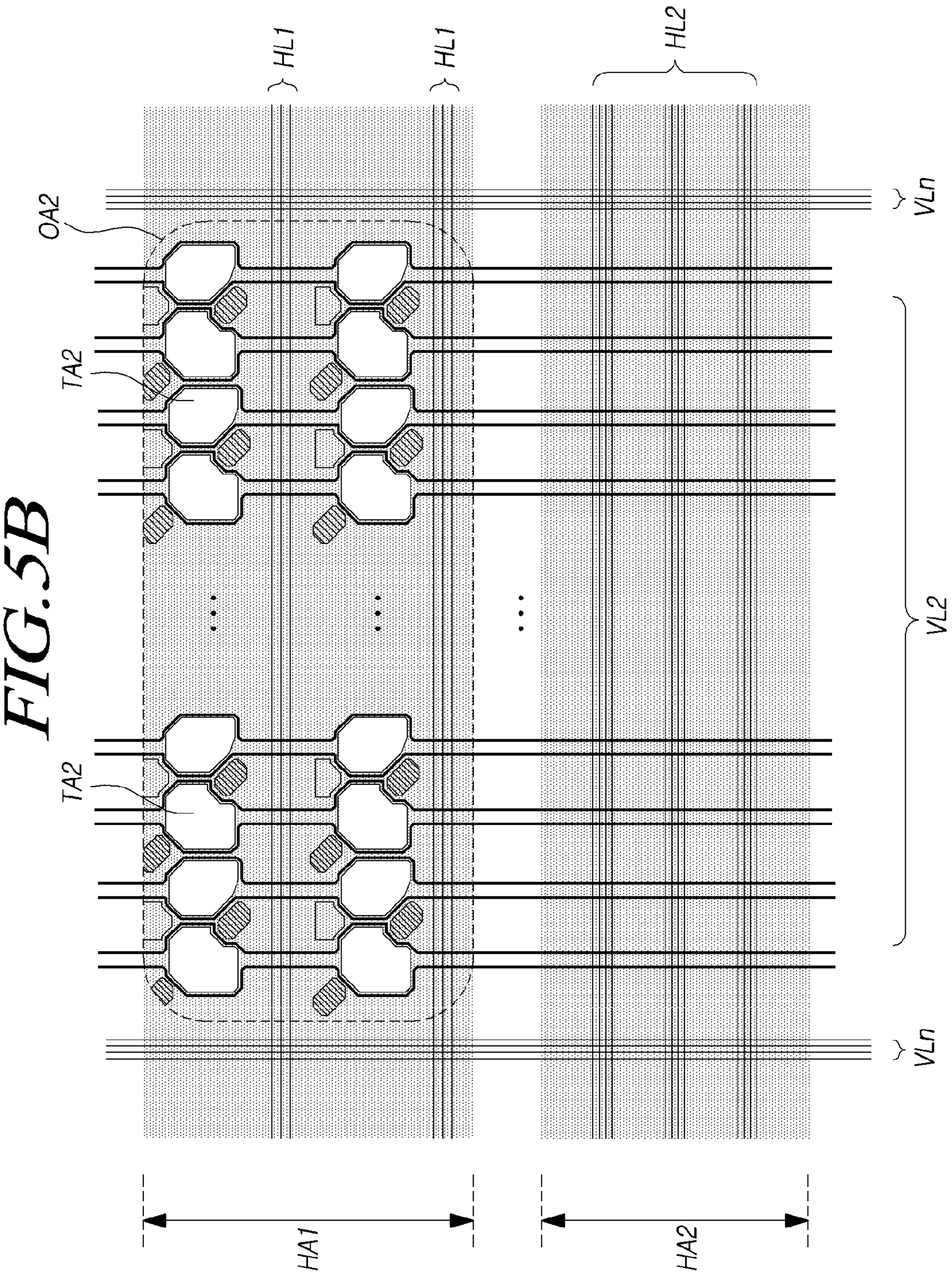
FIG. 5B illustrates example arrangements of signal lines in each of a second optical area and the non-optical area in the display panel according to aspects of the present disclosure.

FIG. 5A illustrates example arrangements of signal lines in each of the first optical area OA1 and the non-optical area NA of the display panel 110 according to aspects of the present disclosure, and FIG. 5B illustrates example arrangements of signal lines in each of the second optical area OA2 and the non-optical area NA of the display panel 110 according to aspects of the present disclosure.

First horizontal display areas HA1 shown in FIGS. 5A and 5B correspond to parts of a first horizontal display area HA1 of the display panel 110. Second horizontal display areas HA2 shown in FIGS. 5A and 5B correspond to parts of a second horizontal display area HA2 of the display panel 110.

The first optical area OA1 of FIG. 5A corresponds to a part of the first optical area OA1 of the display panel 110, and the second optical area OA2 of FIG. 5B corresponds to a part of the second optical area OA2 of the display panel 110.

Referring to FIGS. 5A and 5B, the first horizontal display area HA1 may include the non-optical area NA, the first optical area OA1, and the second optical area OA2. The second horizontal display area HA2 may include the non-optical area NA.

Various types of horizontal lines HL1 and HL2 and various types of vertical lines VLn, VL1, and VL2 may be disposed in the display panel 110.

In some example embodiments, the term “horizontal” and the term “vertical” are used to refer to two directions intersecting the display panel; however, it should be noted that the horizontal direction and the vertical direction may be changed depending on a viewing direction. The horizontal direction may refer to, for example, a direction in which one gate line GL is disposed to extend and, and the vertical direction may refer to, for example, a direction in which one data line DL is disposed to extend. As such, the term horizontal and the term vertical are used to represent two directions.

Referring to FIGS. 5A and 5B, the horizontal lines disposed in the display panel 110 may include first horizontal lines HL1 disposed in the first horizontal display area HA1 and second horizontal lines HL2 disposed on the second horizontal display area HA2.

The horizontal lines disposed in the display panel 110 may be gate lines GL. That is, the first horizontal lines HL1 and the second horizontal lines HL2 may be the gate lines GL. The gate lines GL may include various types of gate lines according to structures of one or more subpixels SP.

Referring to FIGS. 5A and 5B, the vertical lines disposed in the display panel 110 may include typical vertical lines VLn disposed only in the non-optical area NA, first vertical lines VL1 running through both of the first optical area OA1 and the non-optical area NA, and second vertical lines VL2 running through both of the second optical area OA2 and the non-optical area NA.

The vertical lines disposed in the display panel 110 may include data lines DL, driving voltage lines DVL, and the like, and may further include reference voltage lines, initialization voltage lines, and the like. That is, the typical vertical lines VLn, the first vertical lines VL1 and the second vertical lines VL2 may include the data lines DL, the driving voltage lines DVL, and the like, and may further include the reference voltage lines, the initialization voltage lines, and the like.

In some example embodiments, it should be noted that the term “horizontal” in the second horizontal line HL2 may mean only that a signal is carried from a left side, to a right side, of the display panel (or from the right side to the left side), and may not mean that the second horizontal line HL2 runs in a straight line only in the direct horizontal direction. For example, in FIGS. 5A and 5B, although the second horizontal lines HL2 are illustrated in a straight line, one or more of the second horizontal lines HL2 may include one or more bent or folded portions that are different from the configurations shown in FIGS. 5A and 5B. Likewise, one or more of the first horizontal lines HL1 may also include one or more bent or folded portions.

In some example embodiments, it should be noted that the term “vertical” in the typical vertical line VLn may mean only that a signal is carried from an upper portion, to a lower portion, of the display panel (or from the lower portion to the upper portion), and may not mean that the typical vertical line VLn runs in a straight line only in the direct vertical direction. For example, in FIGS. 5A and 5B, although the typical vertical lines VLn are illustrated in a straight line, one or more of the typical vertical lines VLn may include one or more bent or folded portions that are different from the configurations shown in FIGS. 5A and 5B. Likewise, one or more of the first vertical line VL1 and one or more of the second vertical line VL2 may also include one or more bent or folded portions.

Referring to FIG. 5A, the first optical area OA1 included in the first horizontal display area HA1 may include light emitting areas EA (see, e.g., FIG. 4) and first transmission areas TA1. In the first optical area OA1, respective outer areas of the first transmission areas TA1 may include corresponding light emitting areas EA.

Referring to FIG. 5A, in order to improve the transmittance of the first optical area OA1, the first horizontal lines HL1 may run through the first optical area OA1 while avoiding the first transmission areas TA1 in the first optical area OA1. Accordingly, each of the first horizontal lines HL1 running through the first optical area OA1 may include one or more curved or bent portions running around one or more respective outer edges of one or more of the first transmission areas TA1.

Accordingly, the first horizontal lines HL1 disposed in the first horizontal display area HA1 and the second horizontal lines HL2 disposed in the second horizontal display area HA2 may have different shapes or lengths. That is, the first horizontal lines HL1 running through the first optical area OA1 and the second horizontal lines HL2 not running through the first optical area OA1 may have different shapes or lengths.

Further, in order to improve the transmittance of the first optical area OA1, the first vertical lines VL1 may run through the first optical area OA1 while avoiding the first transmission areas TA1 in the first optical area OA1. Accordingly, each of the first vertical lines VL1 running through the first optical area OA1 may include one or more curved or bent portions running around one or more respective outer edges of one or more of the first transmission areas TA1.

Thus, the first vertical lines VL1 running through the first optical area OA1 and the typical vertical lines VLn disposed in the non-optical area NA without running through the first optical area OA1 may have different shapes or lengths.

Referring to FIG. 5A, the first transmission areas TA1 included in the first optical area OA1 in the first horizontal display area HA1 may be arranged in a diagonal direction.

Referring to FIG. 5A, in the first optical area OA1 in the first horizontal display area HAL one or more light emitting areas EA may be disposed between two horizontally adjacent first transmission areas TA1. In the first optical area OA1 in the first horizontal display area HAL one or more light emitting areas EA may be disposed between two vertically adjacent first transmission areas TA1.

Referring to FIG. 5A, each of the first horizontal lines HL1 disposed in the first horizontal display area HA1 (i.e., each of the first horizontal lines HL1 running through the first optical area OA1) may include one or more curved or bent portions running around one or more respective outer edges of one or more of the first transmission areas TA1.

Referring to FIG. 5B, the second optical area OA2 included in the first horizontal display area HA1 may include light emitting areas EA and second transmission areas TA2. In the second optical area OA2, respective outer areas of the second transmission areas TA2 may include corresponding light emitting areas EA.

In an example embodiment, the light emitting areas EA and the second transmission areas TA2 in the second optical area OA2 may have locations and arrangements substantially equal to the light emitting areas EA and the first transmission areas TA1 in the first optical area OA1 of FIG. 5A.

In another example embodiment, as shown in FIG. 5B, the light emitting areas EA and the second transmission areas TA2 in the second optical area OA2 may have locations and arrangements different from the light emitting areas EA and the first transmission areas TA1 in the first optical area OA1 of FIG. 5A.

For example, referring to FIG. 5B, the second transmission areas TA2 in the second optical area OA2 may be arranged in the horizontal direction (the left to right (or right to left) direction). In this example, a light emitting area EA may not be, and are not, disposed between two second transmission areas TA2 adjacent to each other in the horizontal direction. Further, one or more of the light emitting areas EA in the second optical area OA2 may be disposed between second transmission areas TA2 adjacent to each other in the vertical direction (the top to bottom (or bottom to top) direction). That is, one or more light emitting areas EA may be disposed between two rows of second transmission areas.

When running through the second optical area OA2 in the first horizontal display area HA1 and the non-optical area NA adjacent to the second optical area OA2, in an example embodiment, the first horizontal lines HL1 may have substantially the same arrangement as FIG. 5A.

In another example embodiment, as shown in FIG. 5B, when running through the second optical area OA2 in the first horizontal display area HA1 and the non-optical area NA adjacent to the second optical area OA2, the first horizontal lines HL1 may have an arrangement different from FIG. 5A. This is because the light emitting areas EA and the second transmission areas TA2 in the second optical area OA2 of FIG. 5B have locations and arrangements different from the light emitting areas EA and the first transmission areas TA1 in the first optical area OA1 of FIG. 5A.

Referring to FIG. 5B, when the first horizontal lines HL1 run through the second optical area OA2 in the first horizontal display area HA1 and the non-optical area NA adjacent to the second optical area OA2, the first horizontal lines HL1 may run between vertically adjacent second transmission areas TA2 in a straight line without having a curved or bent portion. In other words, in one or more examples, one first horizontal line HL1 may have one or more curved or bent portions in the first optical area OA1, but may not, and do not, have a curved or bent portion in the second optical area OA2.

In order to improve the transmittance of the second optical area OA2, the second vertical lines VL2 may run through the second optical area OA2 while avoiding the second transmission areas TA2 in the second optical area OA2. Accordingly, each of the second vertical lines VL2 running through the second optical area OA2 may include one or more curved or bent portions running around one or more respective outer edges of one or more of the second transmission areas TA2.

Thus, the second vertical lines VL2 running through the second optical area OA2 and the typical vertical lines VLn disposed in the non-optical area NA without running through the second optical area OA2 may have different shapes or lengths.

As shown in FIG. 5A, each, or one or more, of the first horizontal lines HL1 running through the first optical area OA1 may have one or more curved or bent portions running around one or more respective outer edges of one or more of the first transmission areas TA1.

Accordingly, a length of the first horizontal line HL1 running through the first optical area OA1 and the second optical area OA2 may be slightly longer than a length of the second horizontal line HL2 disposed only in the non-optical area NA without running through the first optical area OA1 and the second optical area OA2. Referring to FIGS. 4, 5A, and 5B, the first horizontal line HL1 passing through the first optical area OA1 also passes through the second optical area OA2. More specifically, the first horizontal line HL1 includes a portion placed in the first optical area OA1, a portion placed in the second optical area OA2, and a portion placed outside first optical area OA1 and the second optical area OA2. In the first horizontal line HL1, the portion placed in the first optical area OA1 may be curved, the portion placed in the second optical area OA2 may be straight or curved, and portions placed outside the first optical area OA1 and the second optical area OA2 may be straight. Because the first horizontal line HL1 has at least the portion placed in the first optical area OA1 curved, the length of the first horizontal line HL1 can be greater than the length of the second horizontal line HL2, where all portions are straight.

Accordingly, a resistance of the first horizontal line HL1 running through the first optical area OA1 and the second optical area OA2, which is referred to as a first resistance, may be slightly greater than a resistance of the second horizontal line HL2 disposed only in the non-optical area NA without running through the first optical area OA1 and the second optical area OA2, which is referred to as a second resistance. In the first horizontal line HL1, the portion placed in the first optical area OA1 may be curved, the portion placed in the second optical area OA2 may be straight or curved, and portions placed outside the first optical area OA1 and the second optical area OA2 may be straight. Because the first horizontal line HL1 has at least the portion placed in the first optical area OA1 curved, the resistance of the first horizontal line HL1 can be greater than the resistance of the second horizontal line HL2, where all portions are straight.

Referring to FIGS. 5A and 5B, according to an example light transmitting structure, the first optical area OA1 that at least partially overlaps the first optical electronic device 11 includes the first transmission areas TA1, and the second optical area OA2 that at least partially overlaps with the second optical electronic device 12 includes the second transmission areas TA2. Therefore, the number of subpixels per unit area in each of the first optical area OA1 and the second optical area OA2 may be less than that of the non-optical area NA.

Accordingly, the number of subpixels connected to each, or one or more, of the first horizontal lines HL1 running through the first optical area OA1 and the second optical area OA2 may be different from the number of subpixels connected to each, or one or more, of the second horizontal lines HL2 disposed only in the non-optical area NA without running through the first optical area OA1 and the second optical area OA2.

The number of subpixels connected to each, or one or more, of the first horizontal lines HL1 running through the first optical area OA1 and the second optical area OA2, which is referred to as a first number, may be less than the number of subpixels connected to each, or one or more, of the second horizontal lines HL2 disposed only in the non-optical area NA without running through the first optical area OA1 and the second optical area OA2, which is referred to as a second number.

A difference between the first number and the second number may vary according to a difference between a resolution of each of the first optical area OA1 and the second optical area OA2 and a resolution of the non-optical area NA. For example, as a difference between a resolution of each of the first optical area OA1 and the second optical area OA2 and a resolution of the non-optical area NA increases, a difference between the first number and the second number may increase.

As described above, since the number (the first number) of subpixels connected to each, or one or more, of the first horizontal lines HL1 running through the first optical area OA1 and the second optical area OA2 is less than the number of subpixels (second number) connected to each, or one or more, of the second horizontal lines HL2 disposed only in the non-optical area NA without running through the first optical area OA1 and the second optical area OA2, an area where the first horizontal line HL1 overlaps one or more other electrodes or lines adjacent to the first horizontal line HL1 may be smaller than an area where the second horizontal line HL2 overlaps one or more other electrodes or lines adjacent to the second horizontal line HL2.

Accordingly, a parasitic capacitance formed between the first horizontal line HL1 and one or more other electrodes or lines adjacent to the first horizontal line HL1, which is referred to as a first capacitance, may be greatly smaller than a parasitic capacitance formed between the second horizontal line HL2 and one or more other electrodes or lines adjacent to the second horizontal line HL2, which is referred to as a second capacitance.

Considering a relationship in magnitude between the first resistance and the second resistance (the first resistance≥the second resistance) and a relationship in magnitude between the first capacitance and the second capacitance (the first capacitance<<second capacitance), a resistance-capacitance (RC) value of the first horizontal line HL1 running through the first optical area OA1 and the second optical area OA2, which is referred to as a first RC value, may be greatly smaller than an RC value of the second horizontal lines HL2 disposed only in the non-optical area NA without running through the first optical area OA1 and the second optical area OA2, which is referred to as a second RC value. Thus, in this example, the first RC value is greatly smaller than the second RC value (i.e., the first RC value<<the second RC value).

Due to such a difference between the first RC value of the first horizontal line HL1 and the second RC value of the second horizontal line HL2, which is referred to as an RC load differentiation, a signal transmission characteristic through the first horizontal line HL1 may be different from a signal transmission characteristic through the second horizontal line HL2.

Figure 6:
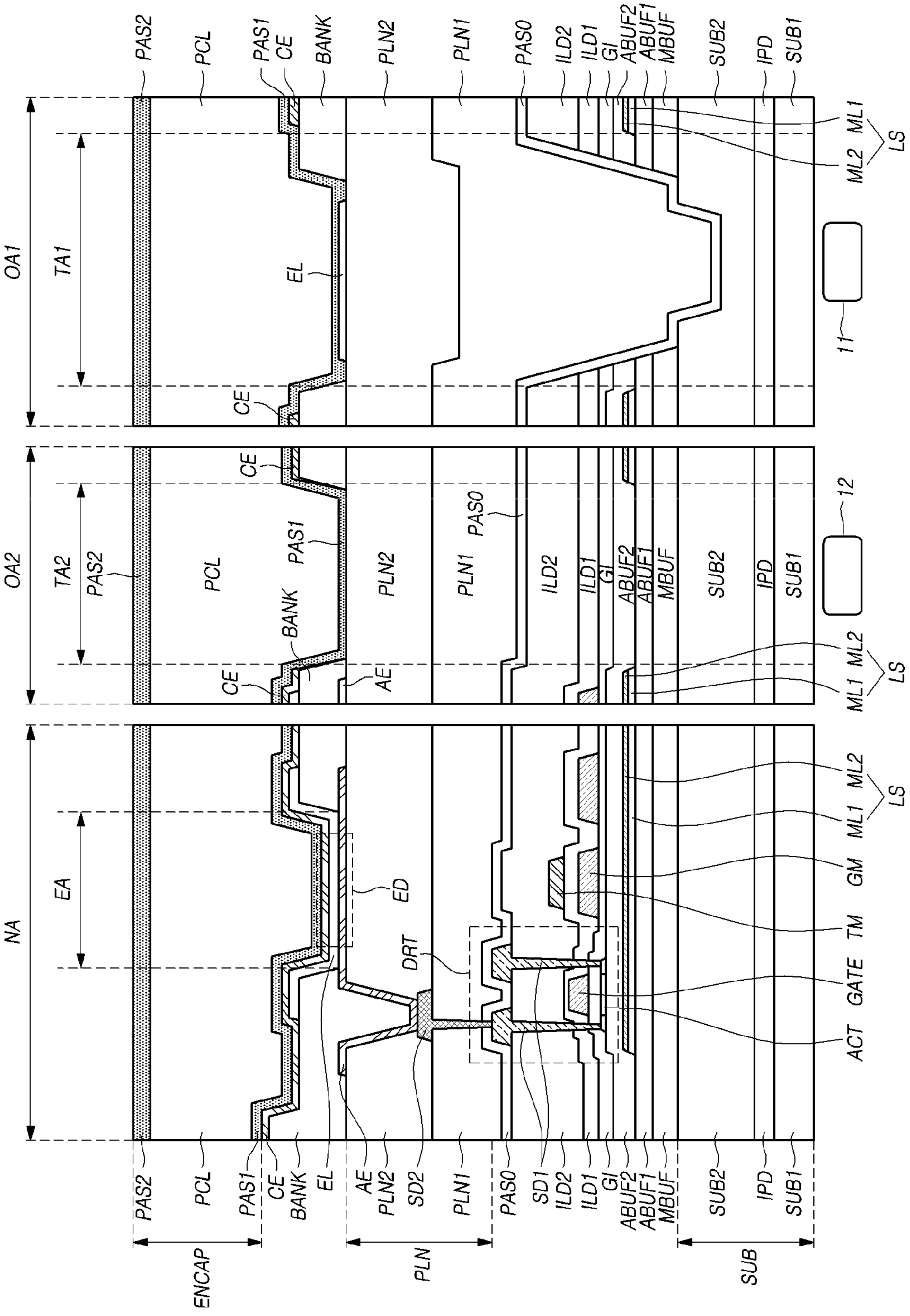
FIGS. 6 and 7 are example cross-sectional views of each of the first optical area, the second optical area, and the non-optical area included in the display area of the display panel according to aspects of the present disclosure.
Figure 7:
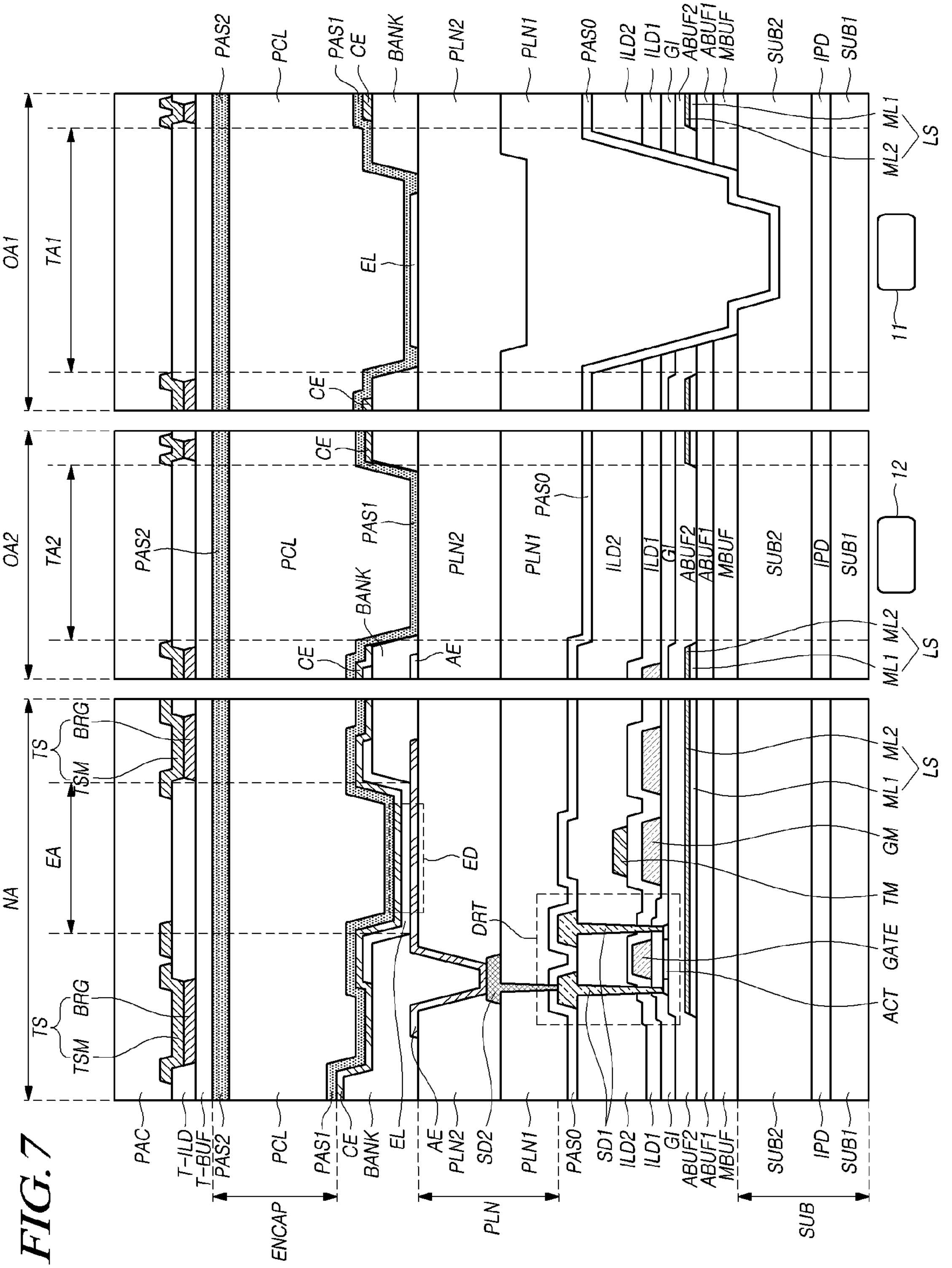

FIGS. 6 and 7 are example cross-sectional views of each of the first optical area OA1, the second optical area OA2, and the non-optical area NA included in the display area DA of the display panel 110 according to aspects of the present disclosure.

FIG. 6 shows the display panel 110 in an example where a touch sensor is present outside of the display panel 110 in the form of a touch panel. FIG. 7 shows the display panel 110 in an example where a touch sensor TS is present inside of the display panel 110.

Each of FIGS. 6 and 7 shows example cross-sectional views of the non-optical area NA, the first optical area OA1, and the second optical area OA2 included in the display area DA.

First, a stack structure of the non-optical area NA will be described with reference to FIGS. 6 and 7. Respective light emitting areas EA included in the first optical area OA1 and the second optical area OA2 may have the same stack structure as the non-optical area NA or a light emitting area EA in the non-optical area NA.

Referring to FIGS. 6 and 7, a substrate SUB may include a first substrate SUB1, an interlayer insulating layer IPD, and a second substrate SUB2. The interlayer insulating layer IPD may be located between the first substrate SUB1 and the second substrate SUB2. As the substrate SUB includes the first substrate SUB1, the interlayer insulating layer IPD, and the second substrate SUB2, the substrate SUB can prevent the penetration of moisture. The first substrate SUB1 and the second substrate SUB2 may be, for example, polyimide (PI) substrates. The first substrate SUB1 may be referred to as a primary PI substrate, and the second substrate SUB2 may be referred to as a secondary PI substrate.

Referring to FIGS. 6 and 7, various types of patterns ACT, SD1, GATE, for disposing one or more transistors such as a driving transistor DRT, and the like, various types of insulating layers MBUF, ABUF1, ABUF2, GI, ILD1, ILD2, PAS0, and various types of metal patterns TM, GM, ML1, ML2 may be disposed on or over the substrate SUB.

Referring to FIGS. 6 and 7, a multi-buffer layer MBUF may be disposed on the second substrate SUB2, and a first active buffer layer ABUF1 may be disposed on the multi-buffer layer MBUF.

A first metal layer ML1 and a second metal layer ML2 may be disposed on the first active buffer layer ABUF1. The first metal layer ML1 and the second metal layer ML2 may be, for example, a light shield layer LS for shielding light.

A second active buffer layer ABUF2 may be disposed on the first metal layer ML1 and the second metal layer ML2. An active layer ACT of the driving transistor DRT may be disposed on the second active buffer layer ABUF2.

A gate insulating layer GI may be disposed to cover the active layer ACT. A gate electrode GATE of the driving transistor DRT may be disposed on the gate insulating layer GI. In this situation, together with the gate electrode GATE of the driving transistor DRT, a gate material layer GM may be disposed on the gate insulating layer GI at a location different from a location where the driving transistor DRT is disposed.

The first interlayer insulating layer ILD1 may be disposed to cover the gate electrode GATE and the gate material layer GM. A metal pattern TM may be disposed on the first interlayer insulating layer ILD1. The metal pattern TM may be located at a location different from a location where the driving transistor DRT is formed. A second interlayer insulating layer ILD2 may be disposed to cover the metal pattern TM on the first interlayer insulating layer ILD1.

Two first source-drain electrode patterns SD1 may be disposed on the second interlayer insulating layer ILD2. One of the two first source-drain electrode patterns SD1 may be a source node of the driving transistor DRT, and the other may be a drain node of the driving transistor DRT.

The two first source-drain electrode patterns SD1 may be electrically connected to first and second side portions of the active layer ACT, respectively, through contact holes formed in the second interlayer insulating layer ILD2, the first interlayer insulating layer ILD1, and the gate insulating layer GI.

A portion of the active layer ACT overlapping the gate electrode GATE may be a channel region. One of the two first source-drain electrode patterns SD1 may be connected to the first side portion of the channel region of the active layer ACT, and the other of the two first source-drain electrode patterns SD1 may be connected to the second side portion of the channel region of the active layer ACT.

A passivation layer PAS0 may be disposed to cover the two first source-drain electrode patterns SD1. A planarization layer PLN may be disposed on the passivation layer PAS0. The planarization layer PLN may include a first planarization layer PLN1 and a second planarization layer PLN2. The first planarization layer PLN1 may be disposed on the passivation layer PAS0.

A second source-drain electrode pattern SD2 may be disposed on the first planarization layer PLN1. The second source-drain electrode pattern SD2 may be connected to one of the two first source-drain electrode patterns SD1 (corresponding to the second node Ny of the driving transistor DRT in the subpixel SP of FIG. 3) through a contact hole formed in the first planarization layer PLN1.

The second planarization layer PLN2 may be disposed to cover the second source-drain electrode pattern SD2. A light emitting element ED may be disposed on the second planarization layer PLN2.

According to an example stack structure of the light emitting element ED, an anode electrode AE may be disposed on the second planarization layer PLN2. The anode electrode AE may be electrically connected to the second source-drain electrode pattern SD2 through a contact hole formed in the second planarization layer PLN2.

A bank BANK may be disposed to cover a portion of the anode electrode AE. A portion of the bank BANK corresponding to a light emitting area EA of the subpixel SP may be opened. A portion of the anode electrode AE may be exposed through the opening (the opened portion) of the bank BANK. An emissive layer EL may be positioned on side surfaces of the bank BANK and in the opening (the opened portion) of the bank BANK. All or at least a portion of the emissive layer EL may be positioned between adjacent banks. In the opening of the bank BANK, the emissive layer EL may contact the anode electrode AE. A cathode electrode CE may be disposed on the emissive layer EL.

The light emitting element ED can be formed by including the anode electrode AE, the emissive layer EL, and the cathode electrode CE, as described above. The emissive layer EL may include an organic layer.

An encapsulation layer ENCAP may be disposed on the stack of the light emitting element ED. The encapsulation layer ENCAP may have a single-layer structure or a multilayer structure. For example, as shown in FIGS. 6 and 7, the encapsulation layer ENCAP may include a first encapsulation layer PAS1, a second encapsulation layer PCL, and a third encapsulation layer PAS2. The first encapsulation layer PAS1 and the third encapsulation layer PAS2 may be, for example, an inorganic layer, and the second encapsulation layer PCL may be, for example, an organic layer. Among the first encapsulation layer PAS1, the second encapsulation layer PCL, and the third encapsulation layer PAS2, the second encapsulation layer PCL may be the thickest and serve as a planarization layer.

The first encapsulation layer PAS1 may be disposed on the cathode electrode CE and may be disposed closest to the light emitting element ED. The first encapsulation layer PAS1 may include an inorganic insulating material capable of being deposited using low-temperature deposition. For example, the first encapsulation layer PAS1 may include, but not limited to, silicon nitride (SiNx), silicon oxide (SiOx), silicon oxynitride (SiON), aluminum oxide (Al2O3), or the like. Since the first encapsulation layer PAS1 can be deposited in a low temperature atmosphere, during the deposition process, the first encapsulation layer PAS1 can prevent the emissive layer EL including an organic material vulnerable to a high temperature atmosphere from being damaged.

The second encapsulation layer PCL may have a smaller area than the first encapsulation layer PAS1. In this case, the second encapsulation layer PCL may be disposed to expose both ends or edges of the first encapsulation layer PAS1. The second encapsulation layer PCL can serve as a buffer for relieving stress between corresponding layers while the display device 100 is curved or bent, and also serve to enhance planarization performance. For example, the second encapsulation layer PCL may include an organic insulating material, such as acrylic resin, epoxy resin, polyimide, polyethylene, silicon oxycarbon (SiOC), or the like. The second encapsulation layer PCL may be disposed, for example, using an inkjet scheme.

The third encapsulation layer PAS2 may be disposed over the substrate SUB over which the second encapsulation layer PCL is disposed to cover the respective top surfaces and side surfaces of the second encapsulation layer PCL and the first encapsulation layer PAS1. The third encapsulation layer PAS2 can minimize or prevent external moisture or oxygen from penetrating into the first encapsulation layer PAS1 and the second encapsulation layer PCL. For example, the third encapsulation layer PAS2 may include an inorganic insulating material, such as silicon nitride (SiNx), silicon oxide (SiOx), silicon oxynitride (SiON), aluminum oxide (Al2O3), or the like.

Referring to FIG. 7, in an example where a touch sensor TS is embedded into the display panel 110, the touch sensor TS may be disposed on the encapsulation layer ENCAP. The structure of the touch sensor will be described in detail as follows.

A touch buffer layer T-BUF may be disposed on the encapsulation layer ENCAP. The touch sensor TS may be disposed on the touch buffer layer T-BUF.

The touch sensor TS may include touch sensor metals TSM and at least one bridge metal BRG, which are located in different layers. A touch interlayer insulating layer T-ILD may be disposed between the touch sensor metals TSM and the bridge metal BRG. For example, the touch sensor metals TSM may include a first touch sensor metal TSM, a second touch sensor metal TSM, and a third touch sensor metal TSM, which are disposed adjacent to one another. In an example embodiment where the third touch sensor metal TSM is disposed between the first touch sensor metal TSM and the second touch sensor metal TSM, and the first touch sensor metal TSM and the second touch sensor metal TSM need to be, and are, electrically connected to each other, and the first touch sensor metal TSM and the second touch sensor metal TSM may be electrically connected to each other through the bridge metal BRG located in a different layer. The bridge metal BRG may be insulated from the third touch sensor metal TSM by the touch interlayer insulating layer T-ILD.

While the touch sensor TS is disposed on the display panel 110, a chemical solution (e.g., a developer or etchant) used in the corresponding process or moisture from the outside may be generated or introduced. In one or more aspects, by disposing the touch sensor TS on the touch buffer layer T-BUF, the subject technology can prevent a chemical solution or moisture from penetrating into the emissive layer EL including an organic material during the manufacturing process of the touch sensor TS. Accordingly, the touch buffer layer T-BUF can prevent damage to the emissive layer EL, which is vulnerable to a chemical solution or moisture.

In order to prevent damage to the emissive layer EL including an organic material, which is vulnerable to high temperatures, the touch buffer layer T-BUF can be formed at a low temperature less than or equal to a predetermined temperature (e.g., 100 degrees (° C.)) and be formed using an organic insulating material having a low permittivity of 1 to 3. For example, the touch buffer layer T-BUF may include an acrylic-based, epoxy-based, or siloxan-based material. As the display device 100 is bent, the encapsulation layer ENCAP may be damaged, and the touch sensor metal located on the touch buffer layer T-BUF may be cracked or broken. Even when the display device 100 is bent, the touch buffer layer T-BUF having the planarization performance as the organic insulating material can prevent the damage of the encapsulation layer ENCAP and/or the cracking or breaking of the metals (TSM, BRG) included in the touch sensor TS.

A protective layer PAC may be disposed to cover the touch sensor TS. The protective layer PAC may be, for example, an organic insulating layer.

Next, a stack structure of the first optical area OA1 will be described with reference to FIGS. 6 and 7.

Referring to FIGS. 6 and 7, a light emitting area EA in the first optical area OA1 may have the same stack structure as that in the non-optical area NA. Accordingly, in the discussion that follows, instead of repeatedly describing the light emitting area EA in the first optical area OA1, a stack structure of a first transmission area TA1 in the first optical area OA1 will be described in detail below.

In one or more examples, the cathode electrode CE may be disposed in the light emitting areas EA included in the non-optical area NA and the first optical area OA1, but may not be disposed in the first transmission area TA1 in the first optical area OA1. That is, the first transmission area TA1 in the first optical area OA1 may correspond to an opening of the cathode electrode CE.

Further, in one or more examples, the light shield layer LS including at least one of the first metal layer ML1 and the second metal layer ML2 may be disposed in the light emitting areas EA included in the non-optical area NA and the first optical area OA1, but may not be disposed in the first transmission area TA1 in the first optical area OA1. That is, the first transmission area TA1 in the first optical area OA1 may correspond to an opening of the light shield layer LS.

The substrates SUB1 and SUB2, and the various types of insulating layers MBUF, ABUF1, ABUF2, GI, ILD1, ILD2, PAS0, PLN (PLN1 and PLN2), BANK, ENCAP (PAS1, PCL, and PAS2), T-BUF, T-ILD, and PAC disposed in the light emitting areas EA included in the non-optical area NA and the first optical area OA1 may be disposed in the first transmission area TA1 in the first optical area OA1, equally, substantially equally, or similarly.

However, in one or more example embodiments, all or at least a part of one or more material layers having electrical properties (e.g., one or more metal material layers and/or one or more semiconductor layers), except for the insulating materials or layers, disposed in the light emitting areas EA included in the non-optical area NA and the first optical area OA1 may not be disposed in the first transmission area TA1 in the first optical area OA1.

For example, referring to FIGS. 6 and 7, all or at least a part of the metal material layers ML1, ML2, GATE, GM, TM, SD1, and SD2 related to at least one transistor and the semiconductor layer ACT may not be disposed in the first transmission area TA1.

Further, referring to FIGS. 6 and 7, in one or more example embodiments, the anode electrode AE and the cathode electrode CE included in the light emitting element ED may not be disposed in the first transmission area TA1. In this case, it should be noted that the emissive layer EL of the light emitting element ED may or may not be disposed in the first transmission area TA1 according to a design requirement.

Further, referring to FIG. 7, in one or more example embodiments, the touch sensor metal TSM and the bridge metal BRG included in the touch sensor TS may not be disposed in the first transmission area TA1 in the first optical area OA1.

Accordingly, the light transmittance of the first transmission area TA1 in the first optical area OA1 can be provided or improved because the material layers (e.g., one or more metal material layers and/or one or more semiconductor layers) having electrical properties are not disposed in the first transmission area TA1 in the first optical area OA1. As a consequence, the first optical electronic device 11 can receive light transmitting through the first transmission area TA1 and perform a corresponding function (e.g., image sensing).

In one or more aspects, since all or a portion of the first transmission area TA1 in the first optical area OA1 overlaps the first optical electronic device 11, to enable the first optical electronic device 11 to normally operate, it is necessary to increase a transmittance of the first transmission area TA1 in the first optical area OA1. To achieve the foregoing, in the display panel 110 of the display device 100 according to aspects of the present disclosure, a transmittance improvement structure TIS can be provided to the first transmission area TA1 in the first optical area OA1.

Referring to FIGS. 6 and 7, a plurality of insulating layers included in the display panel 110 may include the buffer layers MBUF, ABUF1, and ABUF2 between at least one substrate SUB1 or SUB2 and at least one transistor DRT or SCT, the planarization layers PLN1 and PLN2 between the transistor DRT and the light emitting element ED, the encapsulation layer ENCAP on the light emitting element ED, and the like.

Referring to FIG. 7, the plurality of insulating layers included in the display panel 110 may further include the touch buffer layer T-BUF and the touch interlayer insulating layer T-ILD located on the encapsulation layer ENCAP, and the like.

Referring to FIGS. 6 and 7, the first transmission area TA1 in the first optical area OA1 may have a structure in which the first planarization layer PLN1 and the passivation layer PAS0 have depressed portions that extend downward from respective surfaces thereof as a transmittance improvement structure TIS.

Referring to FIGS. 6 and 7, among the plurality of insulating layers, the first planarization layer PLN1 may include at least one depression (e.g., a recess, a trench, a concave portion, or a protrusion). The first planarization layer PLN1 may be, for example, an organic insulating layer.

In an example where the first planarization layer PLN1 has the depressed portion that extends downward from the surfaces thereof, the second planarization layer PLN2 can substantially serve to provide planarization. In an example embodiment, the second planarization layer PLN2 may also have a depressed portion that extends downward from the surface thereof. In this case, the second encapsulation layer PCL can substantially serve to provide planarization.

Referring to FIGS. 6 and 7, the depressed portions of the first planarization layer PLN1 and the passivation layer PAS0 may pass through insulating layers, such as the first interlayer insulating layer ILD, the second interlayer insulating layer ILD2, the gate insulating layer GI, and the like, for forming the transistor DRT, and buffer layers, such as the first active buffer layer ABUF1, the second active buffer layer ABUF2, the multi-buffer layer MBUF, and the like, located under the insulating layers, and extend up to an upper portion of the second substrate SUB2.

Referring to FIGS. 6 and 7, the substrate SUB may include at least one concave portion or depressed portion as a transmittance improvement structure TIS. For example, in the first transmission area TA1, an upper portion of the second substrate SUB2 may be indented or depressed downward, or the second substrate SUB2 may be perforated.

Referring to FIGS. 6 and 7, the first encapsulation layer PAS1 and the second encapsulation layer PCL included in the encapsulation layer ENCAP may also have a transmittance improvement structure TIS in which the first encapsulation layer PAS1 and the second encapsulation layer PCL have depressed portions that extend downward from the respective surfaces thereof. The second encapsulation layer PCL may be, for example, an organic insulating layer.

Referring to FIG. 7, to protect the touch sensor TS, the protective layer PAC may be disposed to cover the touch sensor TS on the encapsulation layer ENCAP. Still referring to FIG. 7, the protective layer PAC may have at least one depression (e.g., a recess, a trench, a concave portion, or a protrusion) as a transmittance improvement structure TIS in a portion overlapping the first transmission area TA1. The protective layer PAC may be, for example, an organic insulating layer.

Referring to FIG. 7, the touch sensor TS may include one or more touch sensor metals TSM with a mesh type. In an example where the touch sensor metal TSM is formed in the mesh type, a plurality of openings may be present in the touch sensor metal TSM. Each of the plurality of openings may be located to correspond to the light emitting area EA of the subpixel SP.

In order for the first optical area OA1 to have a transmittance higher than the non-optical area NA, an area of the touch sensor metal TSM per unit area in the first optical area OA1 may be smaller than an area of the touch sensor metal TSM per unit area in the non-optical area NA.

Referring to FIG. 7, in one or more example embodiments, the touch sensor TS may be disposed in the light emitting area EA in the first optical area OA1, but may not be disposed in the first transmission area TA1 in the first optical area OA1.

Next, a stack structure of the second optical area OA2 will be described with reference to FIGS. 6 and 7.

Referring to FIGS. 6 and 7, a light emitting area EA in the second optical area OA2 may have the same stack structure as that in the non-optical area NA. Accordingly, in the discussion that follows, instead of repeatedly describing the light emitting area EA in the second optical area OA2, a stack structure of a second transmission area TA2 in the second optical area OA2 will be described in detail below.

In one or more example embodiments, the cathode electrode CE may be disposed in the light emitting areas EA included in the non-optical area NA and the second optical area OA2, but may not be disposed in the second transmission area TA2 in the second optical area OA2. That is, the second transmission area TA2 in the second optical area OA2 may correspond to an opening of the cathode electrode CE.

Further, in one or more example embodiments, the light shield layer LS including at least one of the first metal layer ML1 and the second metal layer ML2 may be disposed in the light emitting areas EA included in the non-optical area NA and the second optical area OA2, but may not be disposed in the second transmission area TA2 in the second optical area OA2. That is, the second transmission area TA2 in the second optical area OA2 may correspond to an opening of the light shield layer LS.

When the transmittance of the second optical area OA2 and the transmittance of the first optical area OA1 are the same, the stack structure of the second transmission area TA2 in the second optical area OA2 may be the same as the stacked structure of the first transmission area TA1 in the first optical area OA1.

When the transmittance of the second optical area OA2 and the transmittance of the first optical area OA1 are different, the stack structure of the second transmission area TA2 in the second optical area OA2 may be different at least in part from the stacked structure of the first transmission area TA1 in the first optical area OA1.

For example, as shown in FIGS. 6 and 7, in one or more example embodiments, when the transmittance of the second optical area OA2 is lower than the transmittance of the first optical area OA1, the second transmission area TA2 in the second optical area OA2 may not have a transmittance improvement structure TIS. As a result, the first planarization layer PLN1 and the passivation layer PAS0 may not be indented or depressed. Further, a width of the second transmission area TA2 in the second optical area OA2 may be smaller than a width of the first transmission area TA1 in the first optical area OA1.

The substrates SUB1 and SUB2, and the various types of insulating layers MBUF, ABUF1, ABUF2, GI, ILD1, ILD2, PAS0, PLN (PLN1 and PLN2), BANK, ENCAP (PAS1, PCL, and PAS2), T-BUF, T-ILD, and PAC disposed in the light emitting areas EA included in the non-optical area NA and the second optical area OA2 may be disposed in the second transmission area TA2 in the second optical area OA2, equally, substantially equally, or similarly.

However, in one or more example embodiments, all or at least a part of one or more material layers having electrical properties (e.g., one or more metal material layers and/or one or more semiconductor layers), except for the insulating materials or layers, disposed in the light emitting areas EA included in the non-optical area NA and the second optical area OA2 may not be disposed in the second transmission area TA2 in the second optical area OA2.

For example, referring to FIGS. 6 and 7, all or at least a part of the metal material layers ML1, ML2, GATE, GM, TM, SD1, SD2 related to at least one transistor and the semiconductor layer ACT may not be disposed in the second transmission area TA2 in the second optical area OA2.

Further, referring to FIGS. 6 and 7, in one or more example embodiments, the anode electrode AE and the cathode electrode CE included in the light emitting element ED may not be disposed in the second transmission area TA2. In this case, it should be noted that the emissive layer EL of the light emitting element ED may or may not be disposed on the second transmission area TA2 according to a design requirement.

Further, referring to FIG. 7, in one or more example embodiments, the touch sensor metal TSM and the bridge metal BRG included in the touch sensor TS may not be disposed in the second transmission area TA2 in the second optical area OA2.

Accordingly, the light transmittance of the second transmission area TA2 in the second optical area OA2 can be provided or improved because the material layers (e.g., one or more metal material layers and/or one or more semiconductor layers) having electrical properties are not disposed in the second transmission area TA2 in the second optical area OA2. As a consequence, the second optical electronic device 12 can receive light transmitting through the second transmission area TA2 and perform a corresponding function (e.g., detecting an object or human body, or an external illumination detection).

Figure 8:
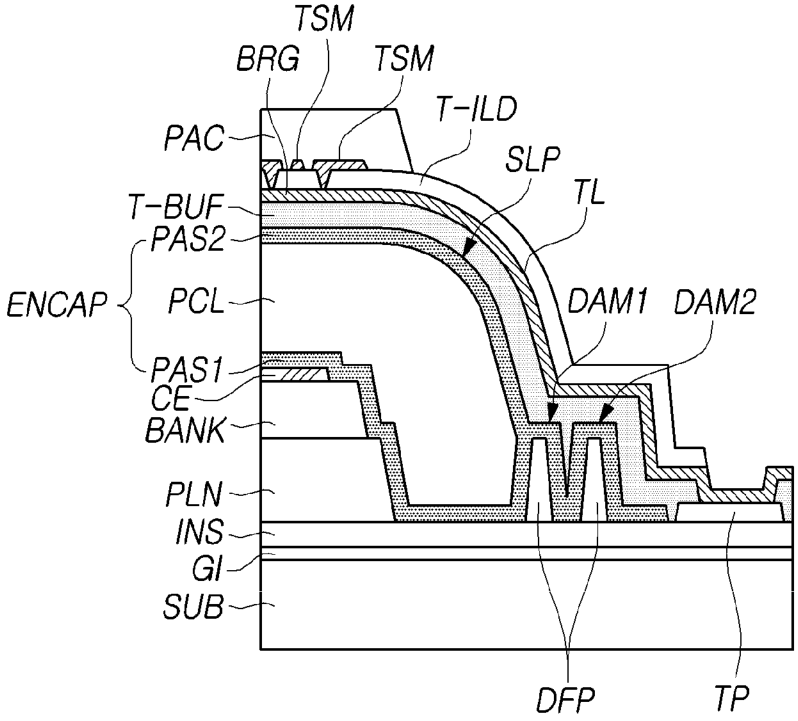
FIG. 8 is an example cross-sectional view of an edge of the display panel according to aspects of the present disclosure.

FIG. 8 is an example cross-sectional view of an edge of the display panel according to aspects of the present disclosure.

In FIG. 8, a single substrate SUB, which represents a combination of the first substrate SUB1 and the second substrate SUB2, is shown, and layers or portions located under the bank BANK are shown briefly. In FIG. 8, the first planarization layer PLN1 and the second planarization layer PLN2 are represented as one planarization layer PLN, and the second interlayer insulating layer ILD2 and the first interlayer insulating layer ILD1 under the planarization layer PLN are represented as one interlayer insulating layer INS.

Referring to FIG. 8, the first encapsulation layer PAS1 may be disposed on the cathode electrode CE and disposed closest to the light emitting element ED. The second encapsulation layer PCL may have a smaller area than the first encapsulation layer PAS1. In this case, the second encapsulation layer PCL may be disposed to expose both ends or edges of the first encapsulation layer PAS1. The third encapsulation layer PAS2 may be disposed over the substrate SUB over which the second encapsulation layer PCL is disposed to cover the respective top surfaces and side surfaces of the second encapsulation layer PCL and the first encapsulation layer PAS1. The third encapsulation layer PAS2 can minimize or prevent external moisture or oxygen from penetrating into the first encapsulation layer PAS1 and the second encapsulation layer PCL.

Referring to FIG. 8, in order to prevent the encapsulation layer ENCAP from collapsing, the display panel 110 may include one or more dams DAM1 and DAM2 at, or near, an end or edge of an inclined surface SLP of the encapsulation layer ENCAP. The one or more dams DAM1 and DAM2 may be present at, or near, a boundary point between the display area DA and the non-display area NDA. The one or more dams DAM1 and DAM2 may include the same material DFP as the bank BANK.

Referring to FIG. 8, in an example embodiment, the second encapsulation layer PCL including an organic material may be located only on an inner side of a first dam DAM1, which is located closest to the inclined surface SLP of the encapsulation layer ENCAP. That is, the second encapsulation layer PCL may not be located on all of the dams DAM1 and DAM2. In another example embodiment, the second encapsulation layer PCL including an organic material may be located on at least one or both the first dam DAM1 and a second dam DAM2.

For example, the second encapsulation layer PCL may extend only up to all, or at least a portion, of an upper portion of the first dam DAM1. In yet another example embodiment, the second encapsulation layer PCL may extend past the upper portion of the first dam DAM1 and extend up to all, or at least a portion of, an upper portion of the secondary dam DAM2.

Referring to FIG. 8, a touch pad TP, to which the touch driving circuit 260 of FIG. 2 is electrically connected, may be disposed on a portion of the substrate SUB, which corresponds to the outside of the one or more dams DAM1 and DAM2. A touch line TL can electrically connect, to the touch pad TP, the touch sensor metal TSM or the bridge metal BRG included in, or serving as, a touch electrode disposed in the display area DA.

One end or edge of the touch line TL may be electrically connected to the touch sensor metal TSM or the bridge metal BRG, and the other end or edge of the touch line TL may be electrically connected to the touch pad TP. The touch line TL may run downward along the inclined surface SLP of the encapsulation layer ENCAP, run along the respective upper portions of the dams DAM1 and DAM2, and extend up to the touch pad TP disposed outside of the dams DAM1 and DAM2.

Referring to FIG. 8, in an example embodiment, the touch line TL may be the bridge metal BRG. In another example embodiment, the touch line TL may be the touch sensor metal TSM.

Figure 9:
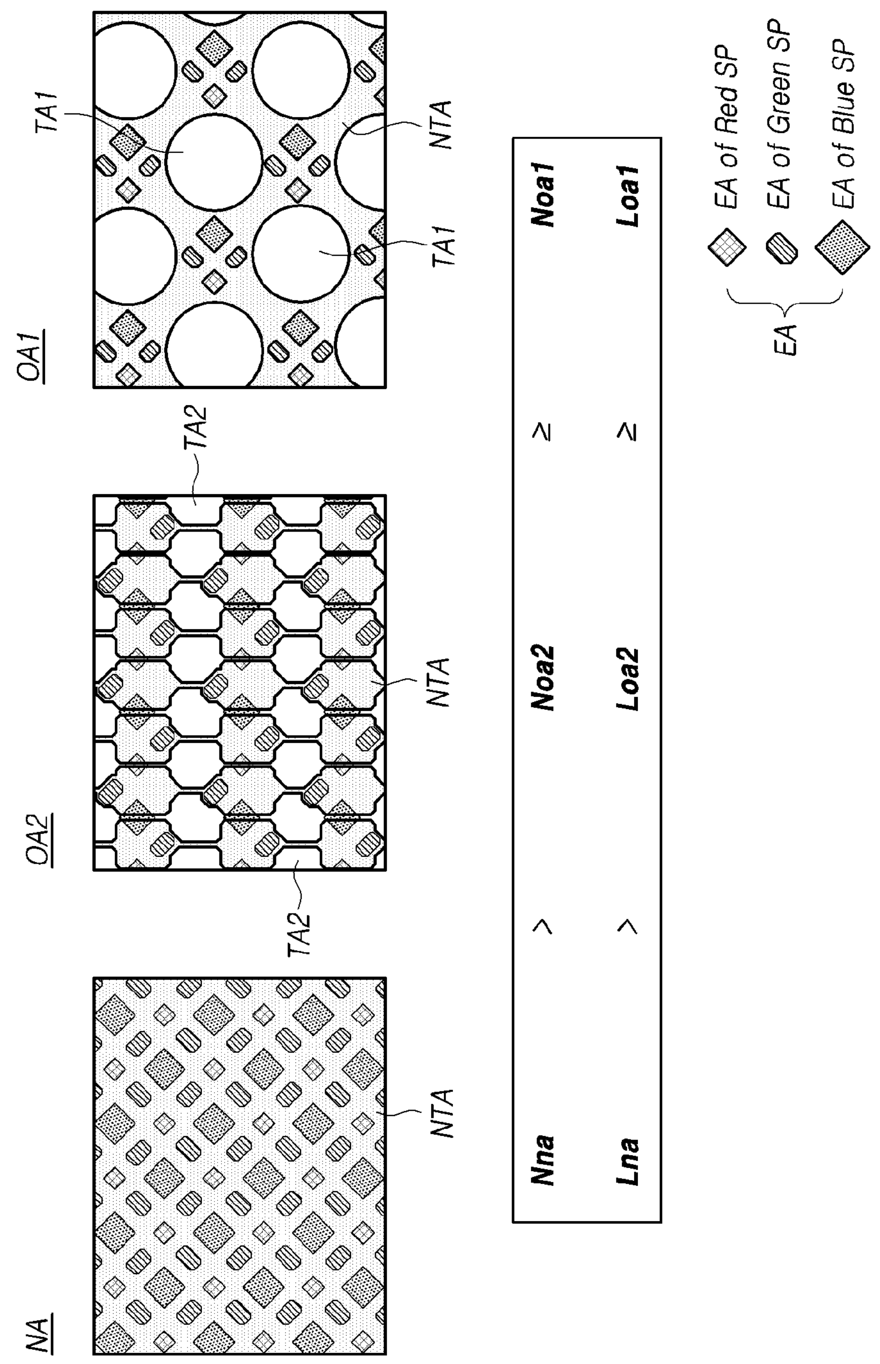
FIG. 9 illustrates example differences in luminance among the first optical area, the second optical area, and the non-optical area in the display device according to aspects of the present disclosure.

FIG. 9 illustrates example differences in luminance between the first optical area OA1, the second optical area OA2, and the non-optical area NA in the display device 100 according to aspects of the present disclosure.

Referring to FIG. 9, among the non-optical area NA, the first optical area OA1, and the second optical area OA2 included in the display area DA of the display device 100, the first optical area OA1 and the second optical area OA2 include the first transmission areas TA1 and the second transmission areas TA2, respectively. In this configuration, the number of subpixels per unit area in the first optical areas OA1 and the number of subpixels per unit area in the second optical areas OA2 may be smaller than the number of subpixels per unit area in the non-optical area NA.

The number of subpixels per unit area described herein may have the same meaning as a density of pixels, a degree of integration of pixels, or the like. For example, pixels per inch (PPI) may be used as the unit of the number of subpixels per unit area. The greater the number of subpixels per unit area is, the higher the resolution may be, and the smaller the number of subpixels per unit area is, the lower the resolution may be.

Referring to FIG. 9, for example, when at least a portion of the first optical area OA1 overlaps the first optical electronic device 11 of FIG. 1A, 1B or 1C, and at least a portion of the second optical area OA2 overlaps the second optical electronic device 12 of FIG. 1B or 1C, the first optical electronic device 11 may need an amount of received light similar to or greater than an amount of received light needed by the second optical electronic device 12. In this example, the number of subpixels Noa2 per unit area in the second optical area OA2 may be equal to or greater than the number of subpixels Noa1 per unit area in the first optical area OA1; the number of subpixels Noa2 per unit area in the second optical area OA2 may be smaller than the number of subpixels Nna per unit area in the non-optical area NA; and the number of subpixels Noa1 per unit area in the first optical area OA1 may be smaller than the number of subpixels Nna per unit area in the non-optical area NA. Therefore, a relationship between Nna, Noa2, and Noa1 can be represented as $Nna>Noa2\geq Noa1$.

As described above, since there is a difference in the number of subpixels per unit area among the non-optical area NA, the first optical area OA1, and the second optical area OA2, the luminance Lna of the non-optical area NA, the luminance Loa1 of the first optical area OA1, and the luminance Loa2 of the second optical area OA2 may be different from one another even when subpixels SP disposed in the non-optical area NA, subpixels SP disposed in the first optical area OA1, and subpixels SP disposed in the second optical area OA2 are supplied with the same data voltage Vdata of FIG. 3.

Referring to FIG. 9, for example, when the number of subpixels Nna per unit area in the non-optical area NA is greater than the number of subpixels Noa1 per unit area in the first optical area OA1 and the number of subpixels Noa2 per unit area in the second optical area OA2, and the number of subpixels Noa2 per unit area in the second optical area OA2 is equal to or greater than the number of subpixels Noa1 per unit area in the first optical area OA1 (Nna>Noa2≥Noa1), the luminance Lna of the non-optical area NA may be greater than the luminance Loa1 of the first optical area OA1 and the luminance Loa2 of the second optical area OA2, and the luminance Loa2 of the second optical area OA2 may be equal to or greater than the luminance Loa1 of the first optical area OA1. Therefore, a relationship between Lna, Loa2, and Loa1 can be represented as Lna>Loa2≥Loa1.

As described above, a luminance difference (luminance non-uniformity) between the non-optical area NA, the first optical area OA1, and the second optical area OA2 may cause image quality to be degraded. To address this issue, example embodiments of the present disclosure provide a subpixel structure (pixel circuit) capable of compensating for a luminance difference among the non-optical area NA, the first optical area OA1, and the second optical area OA2.

Hereinafter, a subpixel structure capable of compensating for a luminance difference according to example embodiments of the present disclosure will be described in detail. For convenience of description, it should be noted that the subpixel structure capable of compensating for the luminance difference according to example embodiments of the present disclosure will be discussed based on a subpixel SP of the first optical area OA1, in which an amount of reduction in luminance may be the largest due to the smallest number of subpixels per unit area.

Figure 10:
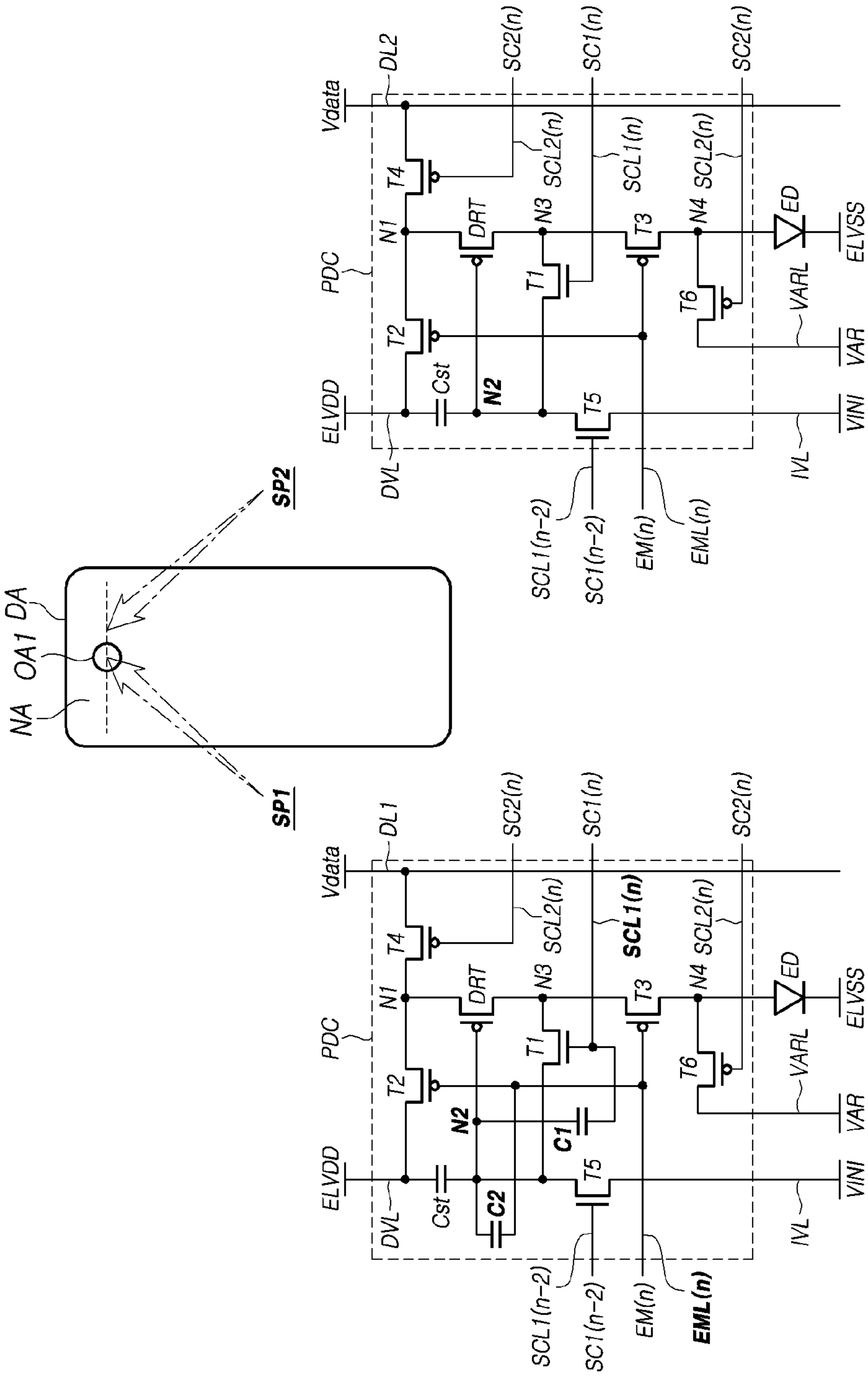
FIG. 10 illustrates an example equivalent circuit of a first subpixel in the first optical area and an example equivalent circuit of a second subpixel in the non-optical area in the display device according to aspects of the present disclosure.

FIG. 10 illustrates an example equivalent circuit of a first subpixel SP1 in the first optical area OA1 and an example equivalent circuit of a second subpixel SP2 in the non-optical area NA in the display device 100 according to aspects of the present disclosure.

Referring to FIG. 10, the display area DA of the display panel 110 may include the first optical area OA1 and the non-optical area NA located outside of the first optical area OA1. The number of subpixels per unit area in the first optical areas OA1 may be smaller than the number of subpixels per unit area in the non-optical area NA.

Referring to FIGS. 9 and 10, a plurality of subpixels SP may include the first subpixel SP1 disposed in the first optical area OA1 and the second subpixel SP2 disposed in the non-optical area NA. The first subpixel SP1 may be disposed in a non-transmission area NTA except for a plurality of first transmission areas TA1 in the first optical area OA1. In this example, the non-transmission area NTA except for the plurality of first transmission areas TA1 in the first optical area OA1 may include light emitting areas EA of subpixels SP. The non-transmission area NTA except for the plurality of first transmission areas TA1 in the first optical area OA1 may include a pixel driving circuit area where pixel driving circuits PDC of the subpixels SP are disposed. In the non-transmission area NTA except for the plurality of first transmission areas TA1 in the first optical area OA1, the light emitting areas EA and the pixel driving circuit area may overlap each other.

Referring to FIG. 10, in the display device 100 according to aspects of the present disclosure, each of the plurality of subpixels SP disposed in the display area DA for displaying an image may include a first node N1, a second node N2, a third node N3, and a fourth node N4, as electrical nodes needed for driving the subpixel SP.

Referring to FIG. 10, each of the plurality of subpixels SP may include a light emitting element ED connected to the fourth node N4, a driving transistor DRT that is controlled by a voltage at the second node N2 and capable of driving the light emitting element ED, a first transistor T1 that is controlled by a first scan signal SC1(*n*) supplied through a first scan line SCL1(*n*) and capable of controlling a connection between the second node N2 and the third node N3, a second transistor T2 that is controlled by a light emitting control signal EM(n) supplied through a light emitting control line EML(n) and capable of controlling a connection between the first node N1 and a driving voltage line DVL, and a third transistor T3 that is controlled by the light emitting control signal EM(n) and capable of controlling a connection between the third node N3 and the fourth node N4.

Referring to FIG. 10, each of the plurality of subpixels SP may further include a fourth transistor T4 capable of controlling a connection between the first node N1 and the first data line DL1, a fifth transistor T5 capable of controlling a connection between the second node N2 and a first initialization line IVL, a sixth transistor T6 capable of controlling a connection between the fourth node N4 and a second initialization line VARL, and a storage capacitor Cst connected between the second node N2 and the driving voltage line DVL.

The fourth transistor T4 can be turned on or turned off by a second scan signal SC2(*n*) supplied through a second scan line SCL2(*n*). The fifth transistor T5 can be turned on or turned off by a first scan signal SC1(*n*−2) at an (n−2)-th stage supplied through a first scan line SCL1(*n*−2) at the (n−2)-th stage. The sixth transistor T6 can be turned on or turned off by the second scan signal SC2(*n*) supplied through the second scan line SCL2(*n*). Further, the sixth transistor T6 can be turned on or turned off by a second scan signal SC2(*n*+1) at an (n+1)-th stage supplied through a second scan line SCL2(*n*+1) at the (n+1)-th stage.

The gate signals SC1(*n*), SC2(*n*), SC1(*n*−2), and EM(n) supplied to the gate nodes of each of the first to sixth transistors T1 to T6 in FIG. 10 may be integrated or separated.

As shown in FIG. 10, the first transistor T1 and the fifth transistor T5 may be n-type transistors, and the driving transistor DRT, the second transistor T2, the third transistor T3, the fourth transistor T4, and the sixth transistor T6 may be p-type transistors. This configuration with different types of transistors is merely an example for convenience of description, and may be variously modified. For example, all of the seven transistors (DRT and T1 to T6) may be n-type transistors or p-type transistors. In another example, some of the seven transistors (DRT and T1 to T6) may be n-type transistors, and the others may be p-type transistors.

As shown in FIG. 10, the first subpixel SP1 disposed in the first optical area OA1 includes the seven transistors (DRT and T1 to T6) and the storage capacitor Cst, and the second subpixel SP2 disposed in the non-optical area NA may also include the seven transistors (DRT and T1 to T6) and the storage capacitor Cst.

Referring to FIG. 10, in the display device 100 according to aspects of the present disclosure, the first subpixel SP1 disposed in the first optical area OA1 may include a luminance difference compensation structure, and the second subpixel SP2 disposed in the non-optical area NA may not include such a luminance difference compensation structure.

Referring to FIG. 10, the first subpixel SP1 disposed in the first optical area OA1 can have a structure for compensating for a luminance difference such that the node N2 of the first subpixel SP1 disposed in the first optical area OA1 can be capacitively coupled with at least one of the first scan line SCL1(*n*) and the light emitting control line EML(n).

Referring to FIG. 10, since the second subpixel SP2 disposed in the non-optical area NA may not have a structure for compensating for a luminance difference, the node N2 of the second subpixel SP2 disposed in the non-optical area NA may not be capacitively coupled with the first scan line SCL1(*n*) and the light emitting control line EML(n).

Referring to FIG. 10, in the display device 100 according to aspects of the present disclosure, the first subpixel SP1 disposed in the first optical area OA1 may have a structure in which the second node N2 is capacitively coupled with at least one of the first scan line SCL1(*n*) and the light emitting control line EML(n). This structure may be referred to as a luminance difference compensation structure.

More specifically, referring to FIG. 10, in the display device 100 according to aspects of the present disclosure, the first subpixel SP1 disposed in the first optical area OA1 may include at least one of a first compensation capacitor C1 configured between the second node N2 and the first scan line SCL1(*n*) and a second compensation capacitor C2 configured between the second node N2 and the light emitting control line EML(n).

In the display device 100 according to aspects of the present disclosure, the luminance difference compensation structure included in the first subpixel SP1 disposed in the first optical area OA1 may include at least one of the first compensation capacitor C1 and the second compensation capacitor C2.

Referring to FIG. 10, in the display device 100 according to aspects of the present disclosure, the second subpixel SP2 disposed in the non-optical area NA, which does not have a luminance difference compensation structure, may not include at least one of a first compensation capacitor C1 configured between the second node N2 and the first scan line SCL1(*n*) and a second compensation capacitor C2 configured between the second node N2 and the light emitting control line EML(n).

As described above, as a first luminance difference compensation structure, to compensate for a luminance difference, the first subpixel SP1 disposed in the first optical area OA1 may include the first compensation capacitor C1 configured between the second node N2 and the first scan line SCL1.

Further, as a second luminance difference compensation structure, to compensate for a luminance difference, the first subpixel SP1 disposed in the first optical area OA1 may include the second compensation capacitor C2 configured between the second node N2 and the light emitting control line EML(n).

Further, as a third luminance difference compensation structure, to compensate for a luminance difference, the first subpixel SP1 disposed in the first optical area OA1 may include the first compensation capacitor C1 configured between the second node N2 and the first scan line SCL1 and the second compensation capacitor C2 configured between the second node N2 and the light emitting control line EML(n).

In one or more aspects, a capacitance of the first compensation capacitor C1 in the first luminance difference compensation structure, a capacitance of the second compensation capacitor C2 in the second luminance difference compensation structure, and a combined capacitance of the first compensation capacitor C1 and the second compensation capacitor C2 in the third luminance difference compensation structure are values for compensating for a luminance difference and are needed to be equal.

In the third luminance difference compensation structure, if the combined capacitances of the first compensation capacitor C1 and the second compensation capacitor C2 can be remained equally, the first capacitance of the first compensation capacitor C1 and the second capacitance of the second compensation capacitor C2 may be distributed at a predefined ratio. For example, the first capacitance of the first compensation capacitor C1 and the second capacitance of the second compensation capacitor C2 may be equal to each other. In another example, the first capacitance of the first compensation capacitor C1 and the second capacitance of the second compensation capacitor C2 may be different from each other.

The principles of reducing a luminance difference between the first optical area OA1 and the non-optical area NA by the luminance difference compensation structure of the first subpixel SP1 disposed in the first optical area OA1 will be briefly described, and more detailed discussion will be described with reference to other figures.

A first data voltage Vdata through the first data line DL1 can be applied to the first subpixel SP1 disposed in the first optical area OA1, and a second data voltage Vdata through a second data line DL2 or the first data line DL1 can be applied to the second subpixel SP2 disposed in the non-optical area NA. As shown in FIG. 10, the second subpixel SP2 may be placed in a different column than the first subpixel SP1. In this case, the second subpixel SP2 can be connected to the second data line DL2 different from the first data line DL1 to which the first subpixel SP1 is connected. Alternatively, the second subpixel SP2 can be placed in NA and in the same column as the first subpixel SP1. In this case, the second subpixel SP2 and the first subpixel SP1 can be connected to the same first data line DL1.

When the first data voltage Vdata is the same as the second data voltage Vdata, a voltage difference between gate and source voltages of the driving transistor DRT during a light emitting period of the first subpixel SP1 may be greater than a voltage difference between gate and source voltages of the driving transistor DRT during a light emitting period of the second subpixel SP2.

The gate voltage of the driving transistor DRT in the first subpixel SP1 may be lowered due to kickback occurring by at least one of the first compensation capacitor C1 and the second compensation capacitor C2 serving as a luminance difference compensation structure of the first subpixel SP1 disposed in the first optical area OA1. As a result, a voltage difference between gate and source voltages of the driving transistor DRT during the light emitting period of the first subpixel SP1 may become greater than a voltage difference between gate and source voltages of the driving transistor DRT during the light emitting period of the second subpixel SP2. In this example, the gate voltage of the driving transistor DRT is the voltage at the second node N2.

In the display device 100 according to aspects of the present disclosure, a voltage difference between the gate and source voltages of the driving transistor DRT in the first subpixel SP1 may increase, as the compensation capacitors C1 and C2 are configured in the first subpixel SP1 disposed in the first optical area OA1, and the kickback occurs by the compensation capacitors C1 and C2 in the gate voltage of the driving transistor DRT in the first subpixel SP1. Accordingly, one first subpixel SP1 disposed in the first optical area OA1 can emit light more brightly than one second subpixel SP2 disposed in the non-optical area NA. As a result, the luminance (or a level thereof) of the first optical area OA1 having a relatively small number of subpixels per unit area may become similar to that of the non-optical area NA having a relatively large number of subpixels per unit area.

That is, although the total number of first subpixels SP1 disposed in the first optical area OA1 is small, as each of the first subpixels SP1 disposed in the first optical area OA1 emits light more brightly, the overall luminance (or a level thereof) of the first optical area OA1 may become similar to that of the non-optical area NA.

As described above, as the overall luminance of the first optical area OA1 becomes similar to the luminance of the non-optical area NA, a difference between the luminance Loa1 of the first optical area OA1 and the luminance Lna of the non-optical area NA may be smaller than a difference in luminance between the first subpixel SP1 that emits light more brightly due to the kickback and the second subpixel SP2 in which the kickback does not occur. That is, a difference between the luminance Loa1 of the first optical area OA1 and the luminance Lna of the non-optical area NA may be smaller than a difference between the luminance of the first subpixel SP1 based on the first data voltage Vdata and the luminance of the second subpixel SP2 based on the second data voltage Vdata.

In one or more example embodiments, the subpixels SP1, SP2 illustrated in FIG. 10 include seven transistors (DRT and T1 to T6), and active layers (or source/drain/gate electrodes) of the seven transistors (DRT and T1 to T6) may be all formed in the same layer, or active layers (or source/drain/gate electrodes) of at least some of the seven transistors (DRT and T1 to T6) may be formed in a different layer from active layers (or source/drain/gate electrodes) of the remaining transistors.

For example, in a case where the active layers (or source/drain/gate electrodes) of the seven transistors (DRT and T1 to T6) are all disposed in the same layer, the active layers of the seven transistors (DRT and T1 to T6) may include a low temperature polysilicon (LTPS) semiconductor or an oxide semiconductor.

In another example, the active layers of at least some of the seven transistors (DRT and T1 to T6) may be disposed in a first layer, and the active layers of the remaining transistors may be disposed in a second layer higher than, or different from, the first layer. For example, the active layers disposed in the first layer may include a low temperature polysilicon (LTPS) semiconductor, and the active layers disposed in the second layer may include an oxide semiconductor. In another example, the active layers disposed in the first layer may include the oxide semiconductor, and the active layers disposed in the second layer may include the low temperature polysilicon (LTPS) semiconductor.

Hereinafter, methods of driving subpixels in the display device 100 according to aspects of the present disclosure will be described in more detail with reference to FIGS. 11 and 12A to 12I. With respect to the driving methods of the subpixels in the display device 100, a driving method of the first subpixel SP1 of the first optical area OA1 may be equal to a driving method of the second subpixel SP2 of the non-optical area NA. Accordingly, the driving method of the first subpixel SP1 of the first optical area OA1 will be described as a representative method.

Figure 11:
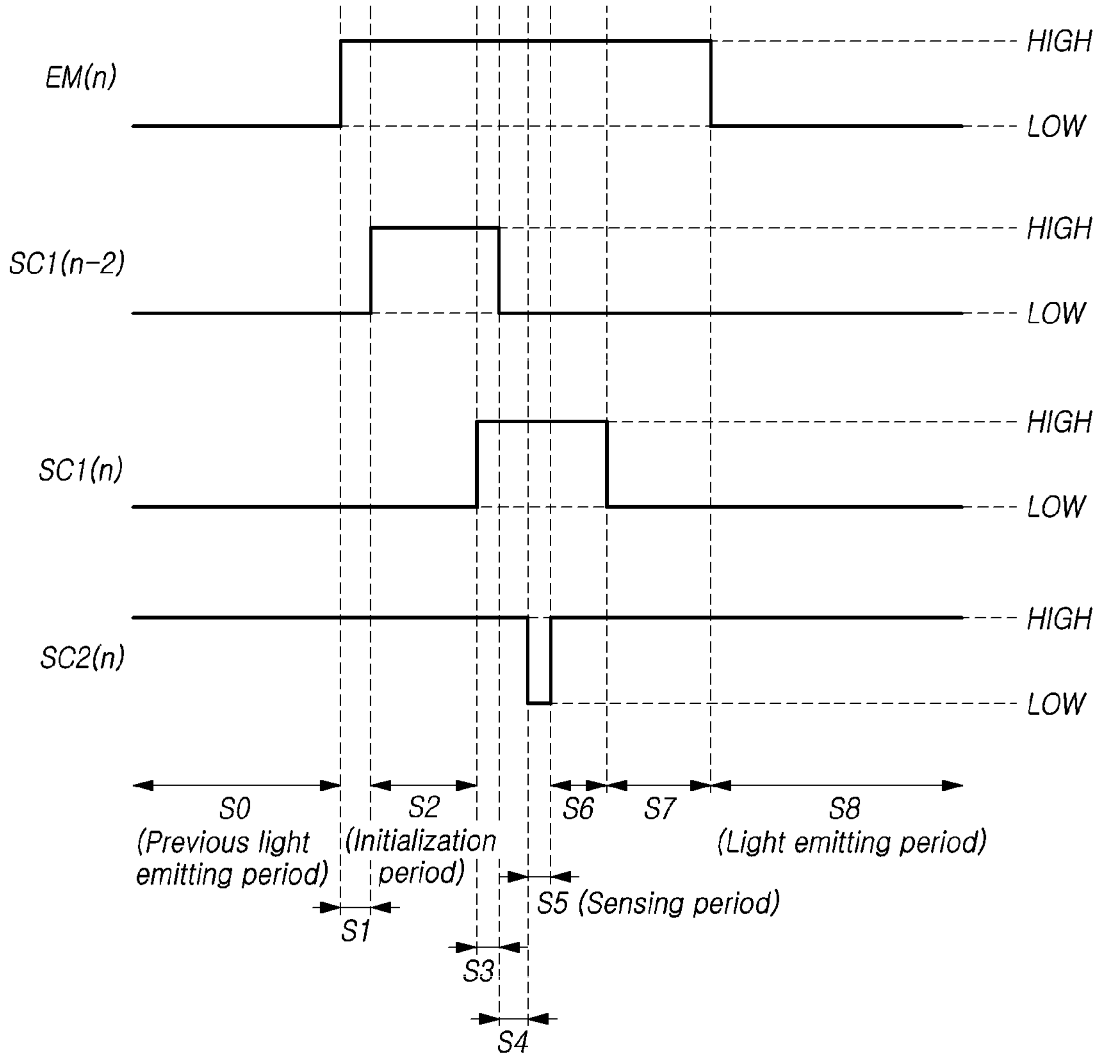
FIG. 11 illustrates an example driving timing diagram of the first subpixel in the display device according to aspects of the present disclosure.

FIG. 11 shows an example driving timing diagram of the first subpixel SP1 in the display device 100 according to aspects of the present disclosure, and FIGS. 12A to 12I show example driving situations of the first subpixel SP1 in each of detailed driving periods S0 to S8 when the first subpixel SP1 is driven according to the driving timing diagram of FIG. 11.

Referring to FIG. 11, after a previous light emitting period S0 ends, in which the first subpixel SP1 emits light in a previous frame, a driving period of the first subpixel SP1 in a current frame may include eight periods (i.e., first to eighth periods S1 to S8), which result from subdividing the driving period according to voltage level variations of the gate signals (EM(n), SC1(*n*−2), SC1(*n*), and SC2(*n*)).

Referring to FIG. 11, among the eight periods, first to eighth periods S1 to S8, a second period S2, a fifth period S5, and an eighth period S8 may be an initialization period, a sensing period, and a light emitting period, respectively. A period including a first period S1, the second period S2, and a third period S3 may be also referred to as the initialization period.

Referring to FIG. 11, in the display device 100 according to aspects of the present disclosure, a first kickback timing at which a sixth period S6 is changed to a seventh period S7 may be a kickback timing related to the first compensation capacitor C1, and a second kickback timing at which the seventh period S7 is changed to the eighth period S8 may be a kickback timing related to the second compensation capacitor C2.

In the discussion that follows, the driving of the first subpixel in a previous light emitting period S0 in a previous frame, and in eight periods, first to eighth periods S1 to S8, in a current frame will be described with reference to FIGS. 11 and 12A to 12I.

According to the example of FIG. 10, among the seven transistors (DRT and T1 to T6) included in the first subpixel SP1, the first transistor T1 and the fifth transistor T5 may be n-type transistors, and the remaining transistors (DRT, T2 to T4, and T6) may be p-type transistors.

Accordingly, a turn-on level voltage of each of an n-th first scan signal SC1(*n*) and an (n−2)-th first scan signal SC1(*n*−2) can be a high-level voltage HIGH, and a turn-off level voltage of each of the n-th first scan signal SC1(*n*) and the (n−2)-th first scan signal SC1(*n*−2) can be a low-level voltage LOW.

Further, a turn-on level voltage of each of an n-th light emitting control signal EM(n) and an n-th second scan signal SC2(*n*) can be a low-level voltage LOW, and a turn-off level voltage of each of the n-th light emitting control signal EM(n) and the n-th second scan signal SC2(*n*) can be a high-level voltage HIGH.

Figure 12A:
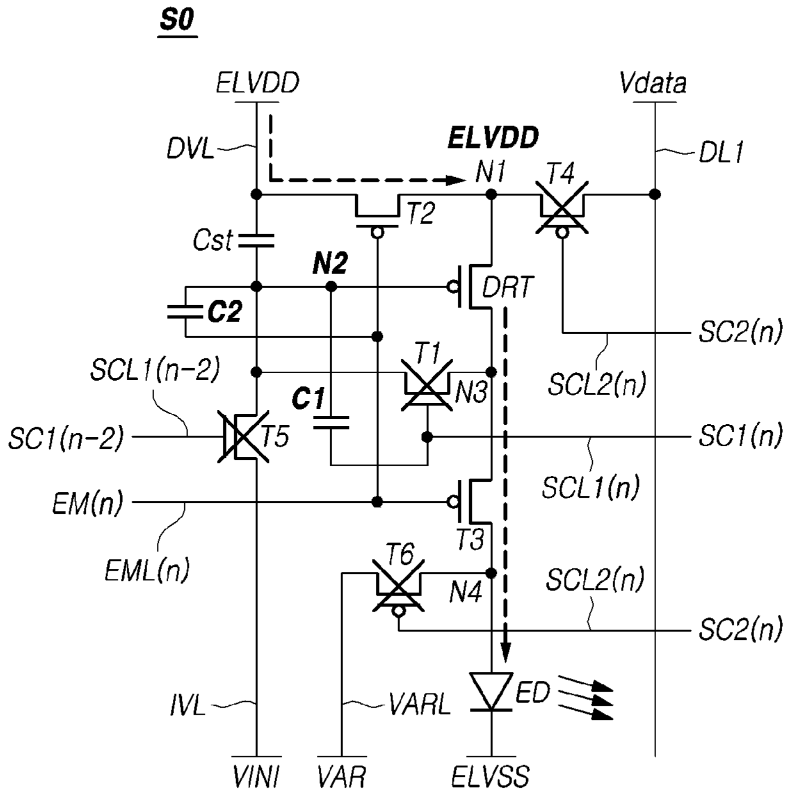
FIGS. 12A to 12I illustrate example driving situations of the first subpixel in each of detailed driving periods when the first subpixel is driven according to the driving timing diagram of FIG. 11 in the display device according to aspects of the present disclosure.

Referring to FIGS. 11 and 12A, during the previous light emitting period S0 in the previous frame, the n-th light emitting control signal EM(n), the (n−2)-th first scan Signal SC1(*n*−2), the n-th first scan signal SC1(*n*), and the n-th second scan signal SC2(*n*) may equal to the low-level voltage LOW, the low-level voltage LOW, the low-level voltage LOW, and the high-level voltage HIGH, respectively.

Accordingly, during the previous light emitting period S0, the second transistor T2 and the third transistor T3 can be, or remain, turned on, and the first transistor T1, the fourth transistor T4, and the fifth transistor T5, and the sixth transistor T6 can be, or remain, turned off. Hereinafter, a state in which a transistor is, or remains, turned on may be referred to as "turn-on state," and a state in which a transistor is, or remains, turned off may be referred to as "turn-off state."

During the previous light emitting period S0, as the second transistor T2 is turned on, a driving voltage ELVDD supplied through the driving voltage line DVL can be applied to the first node N1.

During the previous light emitting period S0, the driving transistor DRT can supply a driving current to the light emitting element ED through the third transistor T3, which is turned on. In turn, the light emitting element ED can emit light.

Figure 12B:
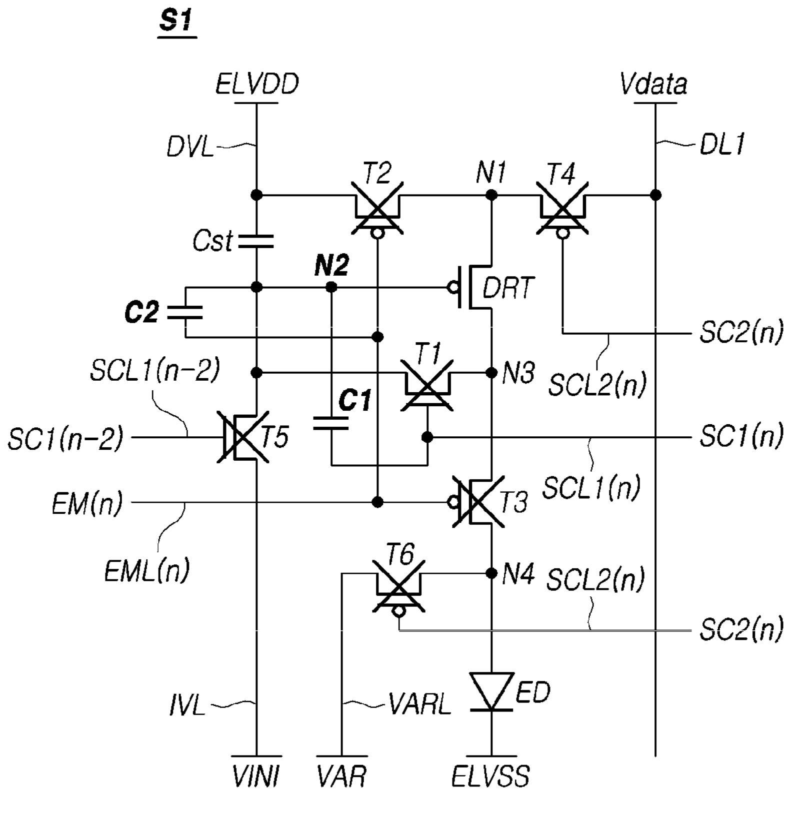

Referring to FIGS. 11 and 12B, during the first period S1 in the current frame, the (n−2)-th first scan Signal SC1($n$−2), the n-th first scan signal SC1($n$), and the n-th second scan signal SC2($n$) may equal to the low-level voltage LOW, the low-level voltage LOW, and the high-level voltage HIGH, respectively. When the first period S1 starts, the n-th light emitting control signal EM(n) may be changed from the low-level voltage LOW to the high-level voltage HIGH.

Accordingly, during the first period S1, the first transistor T1, the fourth transistor T4, the fifth transistor T5, and the sixth transistor T6 can be in the turn-off state. When the first period S1 starts, the second transistor T2 and the third transistor T3 can be turned off.

During the first period S1, the first subpixel SP1 can be initialized as all transistors (DRT and T1 to T6) included in the first subpixel SP1 are in the turn-off state. That is, the first period S1 may be included in the initialization period for initializing the driving of the first subpixel SP1.

Figure 12C:
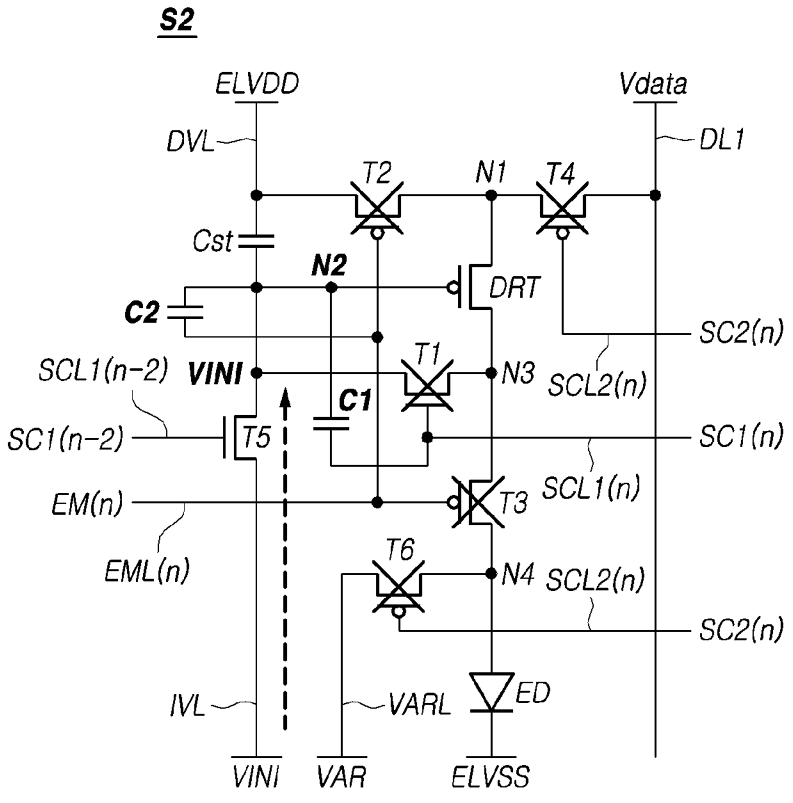

Referring to FIGS. 11 and 12C, during the second period S2, the n-th light emitting control signal EM(n), the n-th first scan signal SC1($n$), and the n-th second scan signal SC2($n$) may equal to the high-level voltage HIGH, the low-level voltage LOW, and the high-level voltage HIGH, respectively. When the second period S2 starts, the (n−2)-th first scan Signal SC1($n$−2) may be changed from the low-level voltage LOW to the high-level voltage HIGH.

Accordingly, during the second period S2, the first to fourth transistor T1 to T4 and the sixth transistor T6 can be in the turn-off state, and the fifth transistor T5 can be turned on.

During the second period S2, a first initialization voltage VINI supplied through the first initialization line IVL may be applied to the second node N2 through the fifth transistor T5, which is turned on. The first initialization voltage VINI may be a low-level voltage capable of turning on the p-type driving transistor DRT. Accordingly, during the second period S2, the driving transistor DRT can be turned on.

The second period S2 may be included in the initialization period in which the driving of the first subpixel SP1 is initialized as the first initialization voltage VINI is applied to the second node N2. The second node N2 may correspond to a gate node of the second transistor DRT.

Figure 12D:
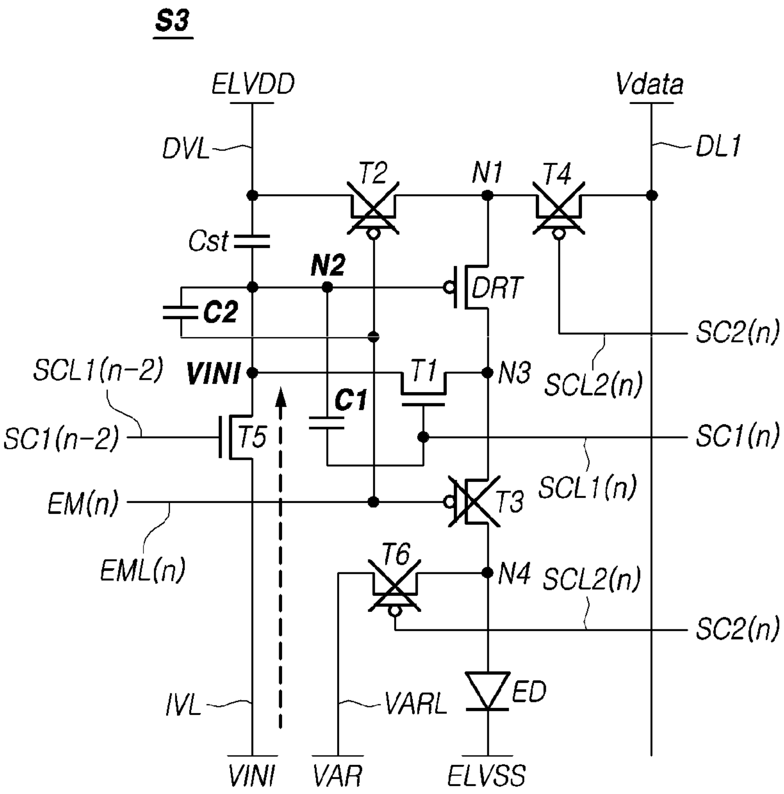

Referring to FIGS. 11 and 12D, during the third period S3, all of the n-th light emitting control signal EM(n), the n-th second scan signal SC2($n$), and the (n−2)-th first scan Signal SC1($n$−2) may equal to the high-level voltage HIGH. When the third period S3 starts, the n-th first scan signal SC1($n$) may be changed from the low-level voltage LOW to the high-level voltage HIGH.

Accordingly, during the third period S3, the second transistor T2, the third transistor T3, the fourth transistor T4, and the sixth transistor T6 can be in the turn-off state; the fifth transistor T5 and the driving transistor DRT can be in the turn-on state; and the first transistor T1 can be turned on.

In the third period S3, as the first transistor T1 is turned on, the second node N2 and the third node N3 can be electrically connected. That is, the driving transistor DRT can be in a diode connection state in which the gate node and the drain node (or the source node) thereof are electrically connected.

The third period S3 may be included in the initialization period in which the driving of the first subpixel SP1 is initialized and may be a preparation stage for sensing. Here, the sensing may mean sensing a threshold voltage Vth of the driving transistor DRT.

Figure 12E:
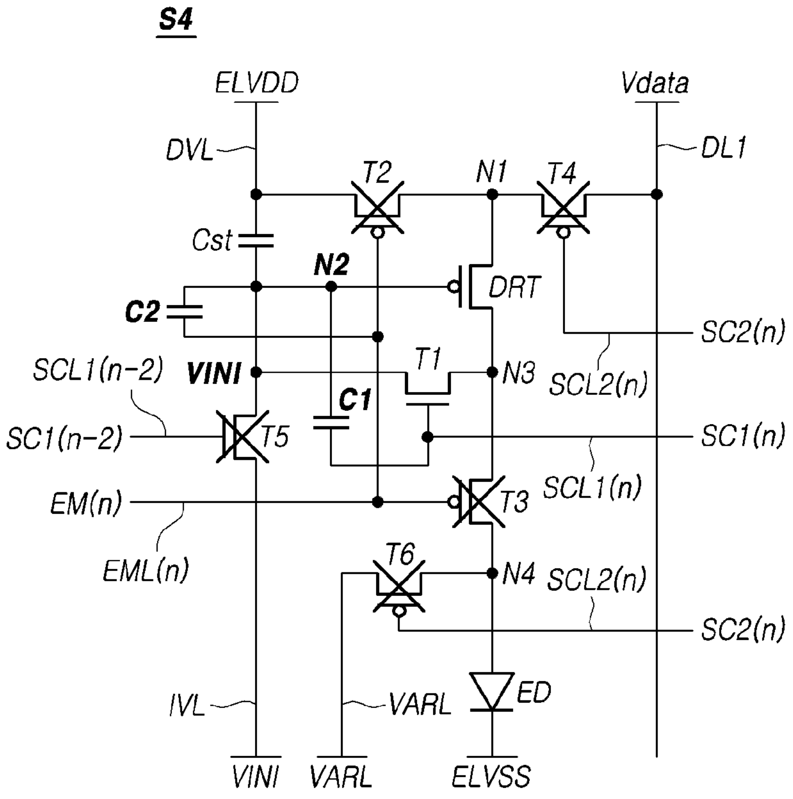

Referring to FIGS. 11 and 12E, during the fourth period S4, all of the n-th light emitting control signal EM(n), the n-th second scan signal SC2($n$), and the n-th first scan signal SC1($n$) may equal to the high-level voltage HIGH. When the fourth period S4 starts, the (n−2)-th first scan Signal SC1 ($n$−2) may be changed from the high-level voltage HIGH to the low-level voltage LOW.

Accordingly, during the fourth period S4, the second transistor T2, the third transistor T3, the fourth transistor T4, and the sixth transistor T6 can be in the turn-off state; the first transistor T1 and the driving transistor DRT can be in the turn-on state; and the fifth transistor T5 can be turned off. In the fourth period S4, the second node N2 can be in an electrically floating state. The floating state may also be referred to as a state in which a voltage is not applied. The fourth period S4 may be a preparation stage for sensing the threshold voltage Vth of the driving transistor DRT.

Figure 12F:
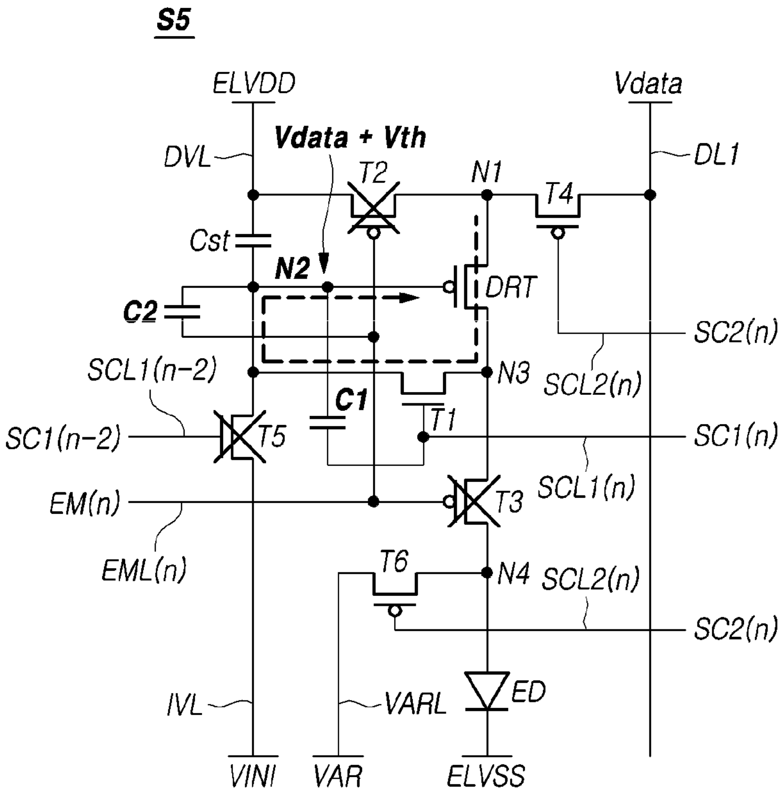

Referring to FIGS. 11 and 12F, the fifth period S5 may be a sensing period in which the threshold voltage Vth of the driving transistor DRT is substantially detected.

During the fifth period S5, the n-th light emitting control signal EM(n), the n-th first scan signal SC1($n$), and the (n−2)-th first scan signal SC1($n$−2) may equal to the high-level voltage HIGH, the high-level voltage HIGH, and the low-level voltage LOW, respectively. When the fifth period S5 starts, the n-th second scan signal SC2($n$) may be changed from the high-level voltage HIGH to the low-level voltage LOW.

Accordingly, during the fifth period S5, the second transistor T2, the third transistor T3, and the fifth transistor T5 can be in the turn-off state; the first transistor T1 and the driving transistor DRT can be in the turn-on state; and the fourth transistor T4 and the sixth transistor T5 T6 can be turned on.

The first data voltage Vdata supplied through the first data line DL1 may be supplied to the second node N2 through the fourth transistor T4 and the first transistor T3, which are turned on. In this case, a voltage at the second node N2 (i.e., the gate voltage Vg of the driving transistor DRT) can equal to a voltage resulting from the adding of a threshold voltage Vth of the driving transistor DRT to the first data voltage Vth supplied through the first data line DL1 (i.e., Vg=Vdata+Vth).

Therefore, as a voltage difference between the gate voltage Vg and the source voltage Vs of the driving transistor DRT includes the threshold voltage Vth of the driving transistor DRT (i.e., Vgs=Vg−Vs=Vdata+Vth−Vs), a driving current to be supplied by the driving transistor DRT to the light emitting element ED may not be affected by the threshold voltage Vth. This is because the threshold voltage Vth is canceled as the driving current is determined by the square of a voltage difference between the difference voltage between the gate voltage Vg and the source voltage Vs of the driving transistor DRT (i.e., Vgs=Vg−Vs=Vdata+Vth−Vs) and the threshold voltage Vth (i.e., Vdata+Vth−Vs−Vth).

During the fifth period S5, a second initialization voltage VAR supplied through the second initialization line VARL may be applied to the fourth node N4 through the sixth transistor T6, which is turned on. The fourth node N4 may correspond to the anode electrode AE of the light emitting element ED. Accordingly, during the fifth period S5, as the second initialization voltage VAR is applied to the fourth node N4, the anode electrode AE can be reset. That is, the light emitting element ED can be reset.

Figure 12G:
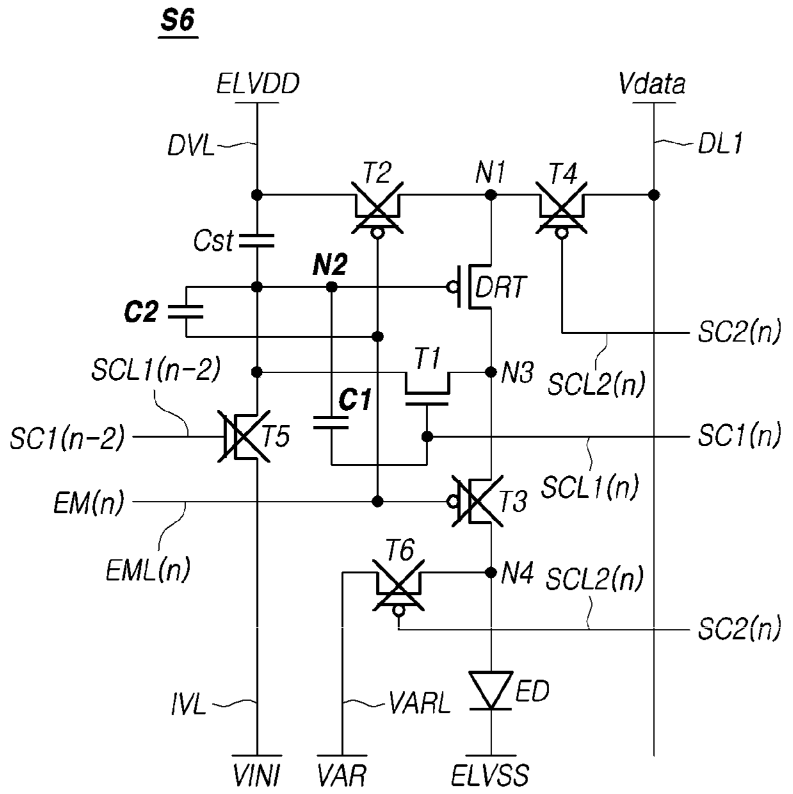

Referring to FIGS. 11 and 12G, during the sixth period S6, the n-th light emitting control signal EM(n), the n-th first scan signal SC1(*n*), and the (n−2)-th first scan Signal SC1 (*n*−2) may equal to the high-level voltage HIGH, the high-level voltage HIGH, and the low-level voltage LOW, respectively. When the sixth period S6 starts, the n-th second scan signal SC2(*n*) may be changed from the low-level voltage LOW to the high-level voltage HIGH.

Accordingly, during the sixth period S6, the first transistor T1 can be in the turn-on state, and the second transistor T2, the third transistor T3, and the fifth transistor T5 can be in the turn-off state. The fourth transistor T4 and the sixth transistor T6 can be turned off.

Figure 12H:
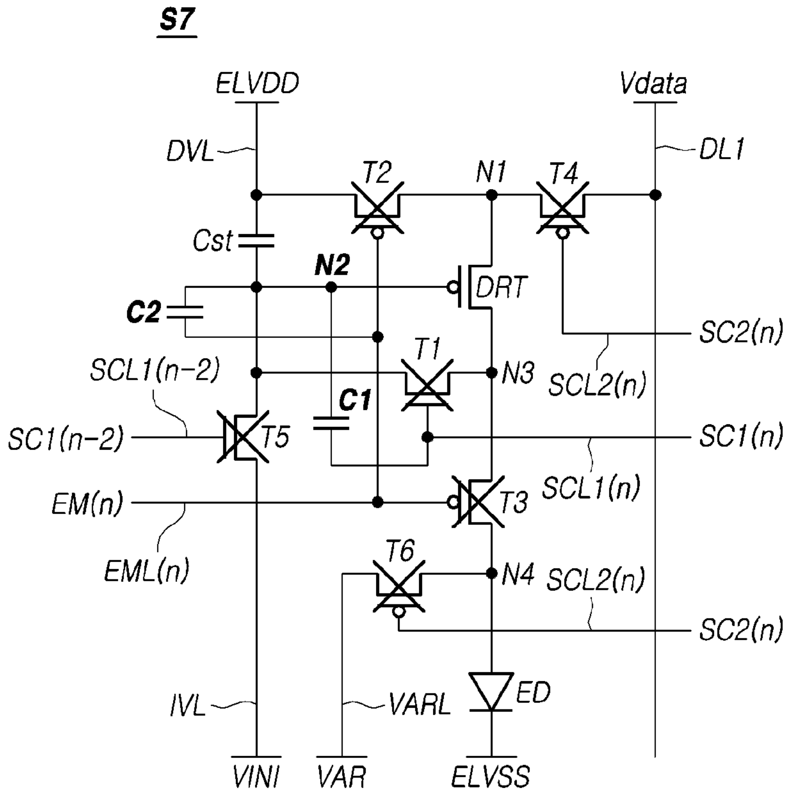

Referring to FIGS. 11 and 12H, during the seventh period S7, the n-th light emitting control signal EM(n), the (n−2)-th first scan Signal SC1(*n*−2), and the n-th second scan signal SC2(*n*) may equal to the high-level voltage HIGH, the low-level voltage LOW, and the high-level voltage HIGH, respectively. When the seventh period S7 starts, the n-th first scan signal SC1(*n*) may be changed from the high-level voltage HIGH to the low-level voltage LOW. Accordingly, during the seventh period S7, the second to sixth transistors T2 to T6 can be in the turn-off state, and the first transistor T1 can be turned off.

In an example where the first subpixel SP1 includes the first compensation capacitor C1, a first kickback can occur by the first compensation capacitor C1 when the seventh period S7 starts. The first kickback can cause a voltage at the second node N2 to be lowered. The voltage at the second node N2 can equal to the gate voltage of the driving transistor DRT.

This will be described again as follows. Since the first compensation capacitor C1 is formed between the n-th first scan line SCL1(*n*) and the second node N2, when the seventh period S7 starts, the voltage at the second node N2 may be lowered as the n-th first scan signal SC1(*n*) is changed from the high-level voltage HIGH to the low-level voltage LOW.

Figure 12I:
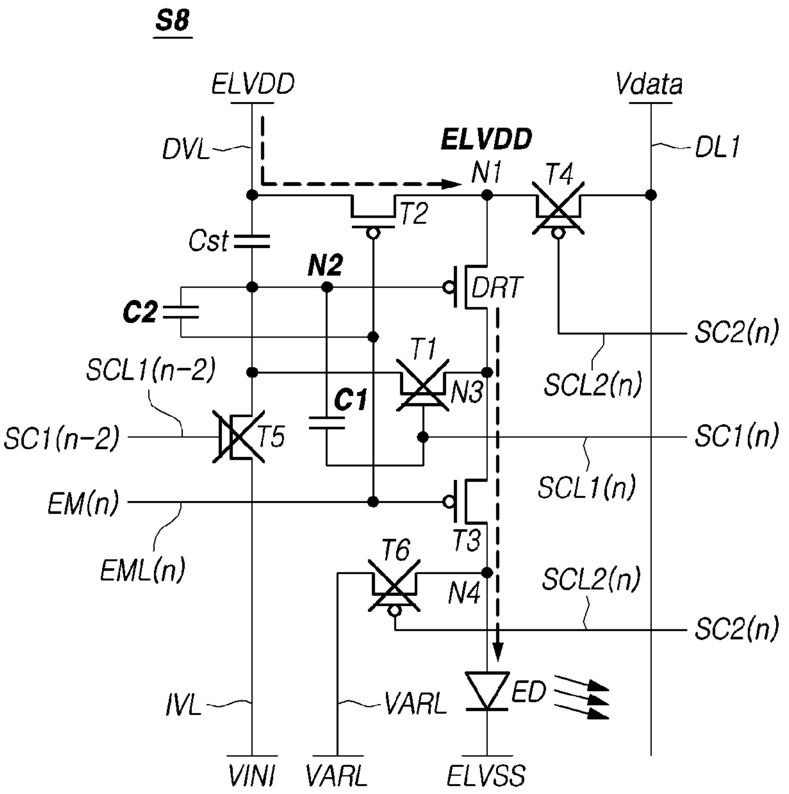

Referring to FIGS. 11 and 12I, during the eighth period S8, the (n−2)-th first scan signal SC1(*n*−2), the n-th second scan signal SC2(*n*), and the n-th first scan signal SC1(*n*) may equal to the low-level voltage LOW, the high-level voltage HIGH, and the low-level voltage LOW, respectively. When the eighth period S8 starts, the n-th light emitting control signal EM(n) may be changed from the high-level voltage HIGH to the low-level voltage LOW. Accordingly, during the eighth period S8, the first transistor T1, the fourth transistor T4, the fifth transistor T5, and the sixth transistor T6 can be in the turn-off state, and the second transistor T2 and the third transistor T3 can be turned on.

During the eighth period S8, as the second transistor T2 is turned on, a driving voltage ELVDD supplied through the driving voltage line DVL can be applied to the first node N1. During the eighth period S8, the driving transistor DRT can supply a driving current to the light emitting element ED through the third transistor T3, which is turned on. In turn, the light emitting element ED can emit light.

In an example where the first subpixel SP1 includes the second compensation capacitor C2, a second kickback can occur by the second compensation capacitor C2 when the eighth period S8 starts. The second kickback can cause a voltage at the second node N2 to be lowered. The voltage at the second node N2 can equal to the gate voltage of the driving transistor DRT.

This will be described again as follows. Since the second compensation capacitor C2 is formed between the n-th light emitting control line EML(n) and the second node N2, when the eighth period S8 starts, the voltage at the second node N2 may be lowered as the n-th light emitting control signal EM(n) is changed from the high-level voltage HIGH, which is the turn-off level voltage, to the low-level voltage LOW, which is the turn-on level voltage.

In the discussion that follows, a principle in which a difference in luminance between the first optical area OA1 and the non-optical area NA by kickback is compensated will be described with reference to graphs representing changes in voltage at the second node N2 shown in FIGS. 13, 14A, 14B, and 14C.

Figure 13:
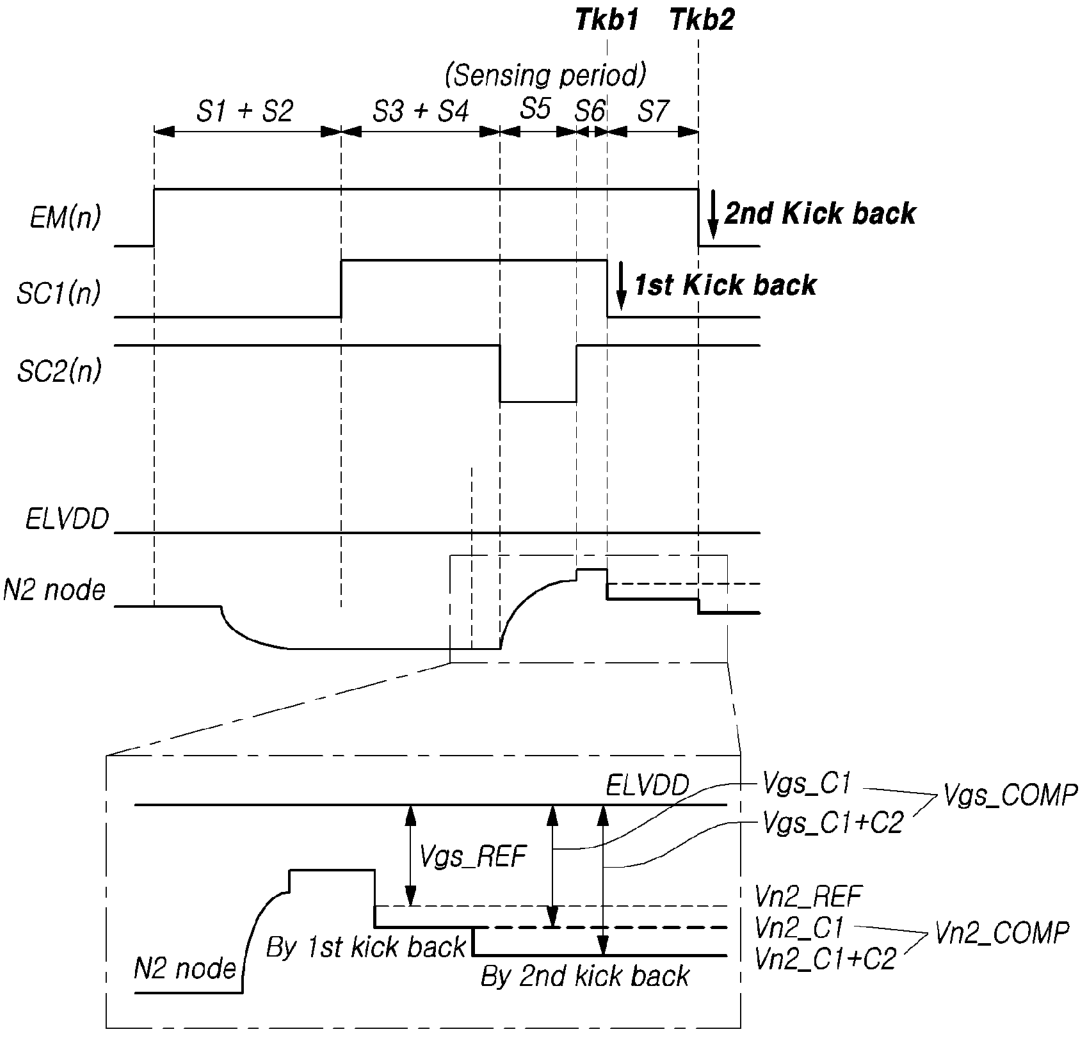
FIG. 13 illustrates an example change in voltage at a second node of the first subpixel in the first optical area and an example change in voltage at a second node of the second subpixel in the non-optical area in the display device according to aspects of the present disclosure.
Figure 14A:
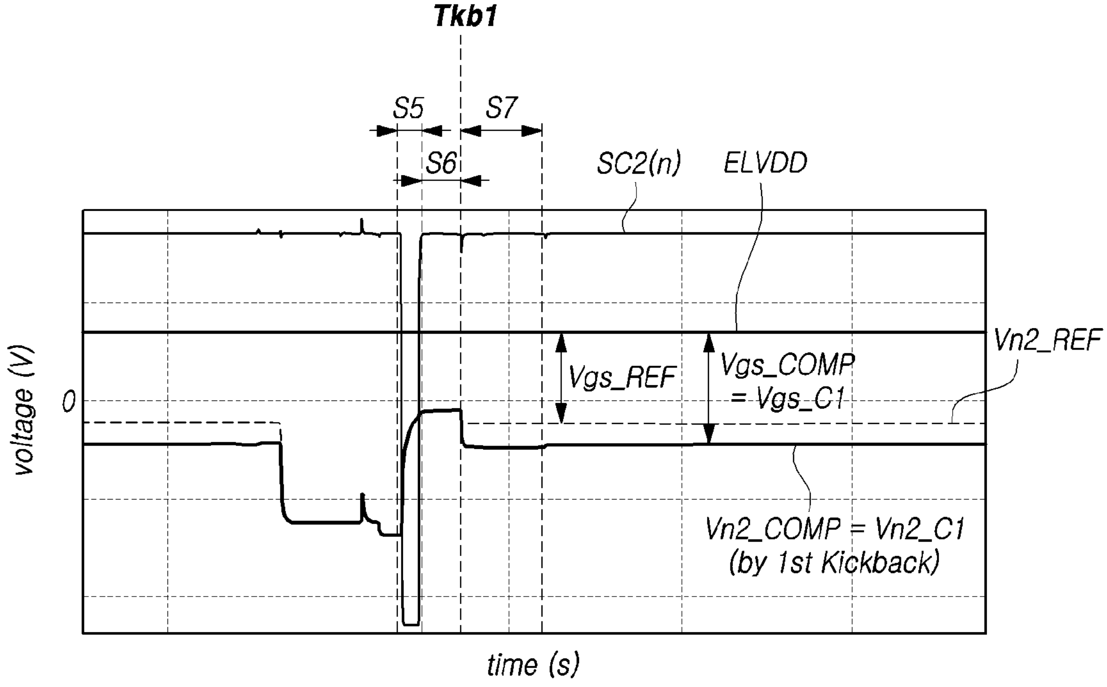
FIG. 14A illustrates an example change in voltage at the second node of the first subpixel in a case where the first subpixel of the first optical area includes a first compensation capacitor in the display device according to aspects of the present disclosure.
Figure 14B:
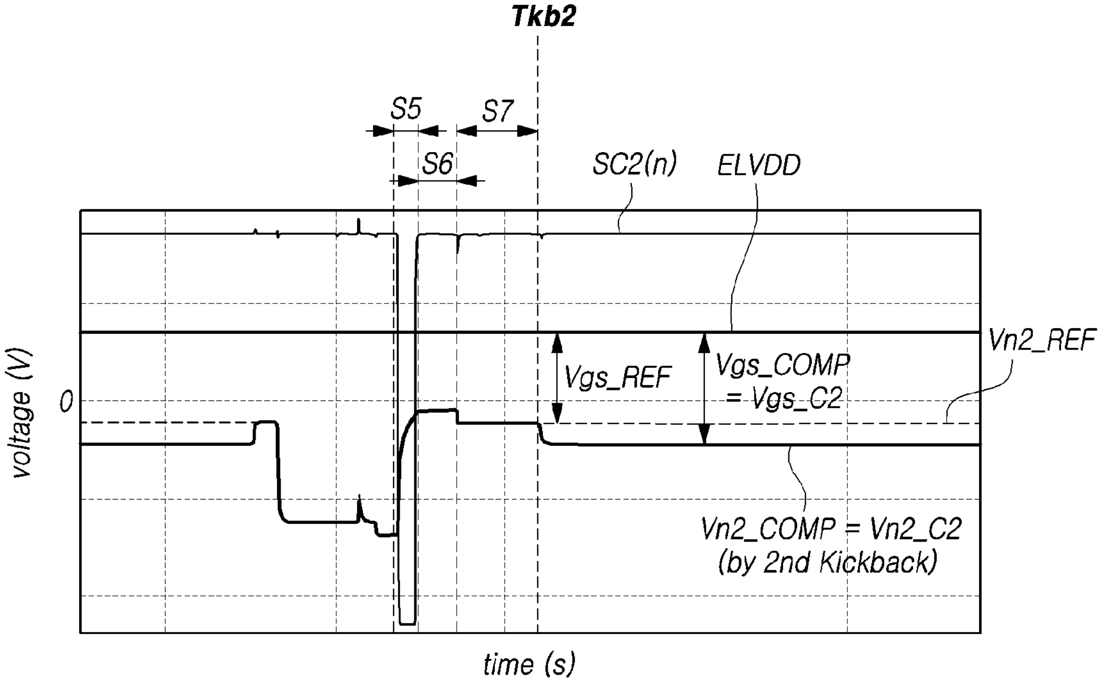
FIG. 14B illustrates an example change in voltage at the second node of the first subpixel in a case where the first subpixel of the first optical area includes a second compensation capacitor in the display device according to aspects of the present disclosure.
Figure 14C:
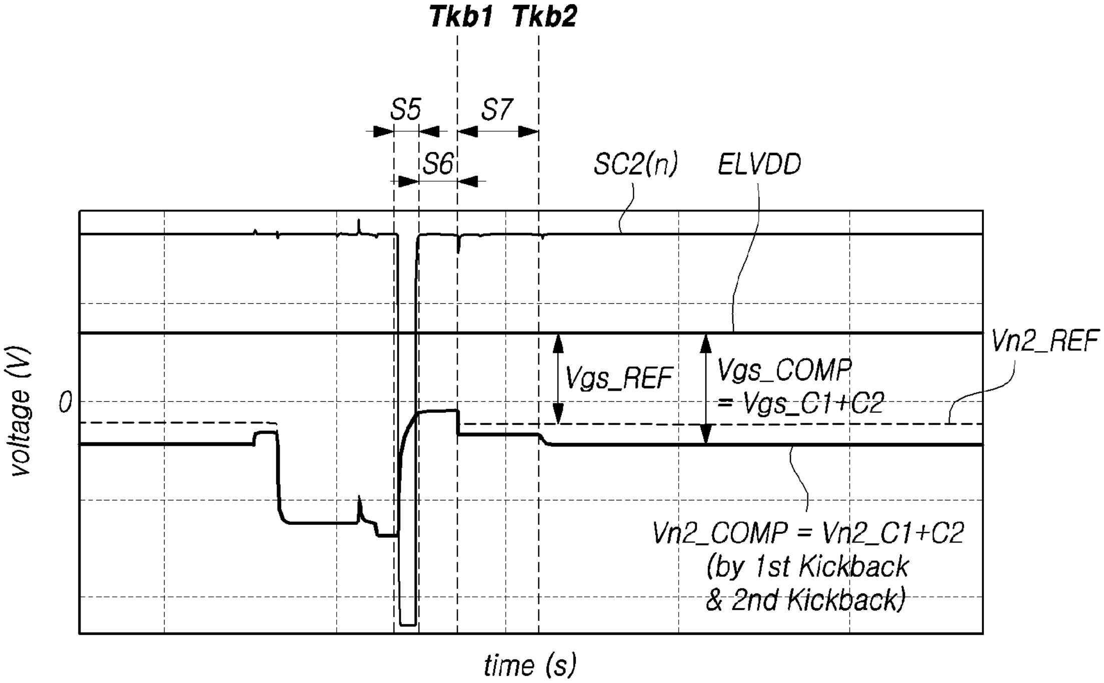
FIG. 14C illustrates an example change in voltage at the second node of the first subpixel in a case where the first subpixel of the first optical area includes both the first compensation capacitor and the second compensation capacitor in the display device according to aspects of the present disclosure.

In the display device 100 according to aspects of the present disclosure, FIG. 13 illustrates an example change in voltage at the second node N2 of the first subpixel SP1 in the first optical area OA1 and an example change in voltage at the second node N2 of the second subpixel SP2 in the non-optical area NA; FIG. 14A illustrates an example change in voltage at the second node N2 of the first subpixel SP1 in a case where the first subpixel SP1 of the first optical area OA1 includes a first compensation capacitor C1; FIG. 14B illustrates an example change in voltage at the second node N2 of the first subpixel SP1 in a case where the first subpixel SP1 of the first optical area OA1 includes a second compensation capacitor C2; and FIG. 14C illustrates an example change in voltage at the second node N2 of the first subpixel SP1 in a case where the first subpixel SP1 of the first optical area OA1 includes both the first compensation capacitor C1 and the second compensation capacitor C2.

Referring to FIGS. 13 and 14A to 14C, in the display device 100 according to aspects of the present disclosure, the second node N2 of the first subpixel SP1 in the first optical area OA1 can be capacitively coupled with at least one of the first scan line SCL1(*n*) and the light emitting control line EML(n). Due to this, kickback on the second node N2 can occur at a kickback timing.

Referring to FIGS. 13 and 14A to 14C, as the kickback occurs in a negative voltage direction (voltage decreasing direction) at the second node N2, a voltage at the second node N2 corresponds to the gate node of the driving transistor DRT can be lowered. Accordingly, a voltage difference Vgs between gate and source voltages of the driving transistor DRT can increase. Accordingly, the driving transistor DRT of the first subpixel SP1 can supply a more amount of driving current to the light emitting element ED.

Due to this, the luminance of the first subpixel SP can increase, leading the overall luminance Loa1 (or a level thereof) of the first optical area OA1 to become similar to the luminance Lna (or a level thereof) of the non-optical area NA. That is, a difference in luminance between the first optical area OA1 and the non-optical area NA can be compensated.

Referring to FIGS. 13 and 14A to 14C, kickback timing during the driving periods S1 to S8 of the first subpixel SP1 may include one or more of a first kickback timing Tkb1 at which the sixth period S6 ends and the seventh period S7 starts, and a second kickback timing Tkb2 at which the seventh period S7 ends and the eighth period S8 starts. The first kickback timing Tkb1 may be a timing at which a first kickback occurs, and the second kickback timing Tkb2 may be a timing at which a second kickback occurs.

FIG. 13 is a graph representing example changes in voltage at the second node N2 based on respective voltage level changes of a light emitting control signal EM(n), a first scan signal SC1(*n*), and a second scan signal SC2(*n*) in a case where the first kickback and the second kickback sequentially occur.

Referring to FIG. 13, a driving voltage ELVDD can be a voltage applied to the source node of the driving transistor DRT. The source node of the driving transistor DRT can correspond to the first node N1.

FIG. 14A shows an example in which only the first kick occurs; FIG. 14B shows an example in which only the second kick occurs; and FIG. 14C shows an example in which the first kickback and the second kickback occur sequentially.

Referring to FIGS. 13 and 14A to 14C, the first kickback timing Tkb1 at which the first kickback occurs may be related to the first compensation capacitor C1, and be a timing at which the first scan signal SC1(*n*) is changed from the high-level voltage HIGH to the low-level voltage LOW.

Referring to FIG. 14A, at the first kickback timing Tkb1 at which the first kickback occurs, a voltage at the second node N2 forming the first compensation capacitor C1 together with the first scan line SCL1(*n*) can fall as a voltage on the first scan line SCL1(*n*) through which the first scan signal SC1(*n*) is supplied is changed to the low-level voltage LOW. In this example, a falling width of the voltage at the second node N2 can depend on a voltage change width HIGH-LOW of the first scan signal SC1(*n*).

Referring to FIG. 14A, the voltage Vn2_COMP lowered at the second node N2 by the first kickback can become a first kickback gate voltage Vn2_C1. Accordingly, a voltage difference Vgs_COMP between gate and source voltages of the driving transistor DRT can become a first kickback gate-source voltage Vgs_C1.

Referring to FIG. 14A, when driving a subpixel SP in which the first kickback does not occur, a voltage at the second node N2 may be a reference gate voltage Vn2_REF, and a voltage difference between gate and source voltages of the driving transistor DRT may be a reference gate-source voltage Vgs_REF.

In this example, the subpixel SP in which the first kickback does not occur may be the first subpixel SP1 including only the second compensation capacitor C2 not including the first compensation capacitor C1 or the second subpixel SP2 of the non-optical area NA that does not include both the first compensation capacitor C1 and the second compensation capacitor C2.

Referring to FIG. 14A, when the first kickback occurs, the first kickback gate-source voltage Vgs_C1, which is the voltage difference Vgs_COMP between the gate and source voltages of the driving transistor DRT, can become greater than the reference gate-source voltage Vgs_REF, which is the voltage difference between the gate and source voltages of the driving transistor DRT when the first kickback does not occur.

Referring to FIG. 14B, at the second kickback timing Tkb2 at which the second kickback occurs, a voltage at the second node N2 forming the second compensation capacitor C2 together with the light emitting control line EML(n) can fall as a voltage on the light emitting control line EML(n) through which the light emitting control signal EM(n) is supplied is changed to the low-level voltage LOW. In this example, a falling width of the voltage at the second node N2 can depend on a voltage change width HIGH-LOW of the light emitting control signal EM(n).

Referring to FIG. 14B, the voltage Vn2_COMP lowered at the second node N2 by the second kickback can become a second kickback gate voltage Vn2_C2. Accordingly, a voltage difference Vgs_COMP between gate and source voltages of the driving transistor DRT can become a second kickback gate-source voltage Vgs_C2.

Referring to FIG. 14B, when driving a subpixel SP in which the second kickback does not occur, a voltage at the second node N2 may be a reference gate voltage Vn2_REF, and a voltage difference between gate and source voltages of the driving transistor DRT may be a reference gate-source voltage Vgs_REF.

In this example, the subpixel SP in which the second kickback does not occur may be the first subpixel SP1 including only the first compensation capacitor C1 not including the second compensation capacitor C2 or the second subpixel SP2 of the non-optical area NA that does not include both the first compensation capacitor C1 and the second compensation capacitor C2.

Referring to FIG. 14B, when the second kickback occurs, the second kickback gate-source voltage Vgs_C2, which is the voltage difference Vgs_COMP between the gate and source voltages of the driving transistor DRT, can become greater than the reference gate-source voltage Vgs_REF, which is the voltage difference between the gate and source voltages of the driving transistor DRT when the second kickback does not occur.

Referring to FIGS. 13 and 14C, at the first kickback timing Tkb1 at which the first kickback occurs, a voltage at the second node N2 forming the first compensation capacitor C1 together with the first scan line SCL1(*n*) can fall as a voltage on the first scan line SCL1(*n*) through which the first scan signal SC1(*n*) is supplied is changed to the low-level voltage LOW. In this example, a falling width of the voltage at the second node N2 can depend on a voltage change width HIGH-LOW of the first scan signal SC1(*n*).

Referring to FIGS. 13 and 14C, the voltage Vn2_COMP lowered at the second node N2 by the first kickback can become a first kickback gate voltage Vn2_C1. Accordingly, a voltage difference Vgs_COMP between gate and source voltages of the driving transistor DRT can become a first kickback gate-source voltage Vgs_C1.

Referring to FIGS. 13 and 14C, when driving a subpixel SP in which the first kickback does not occur, a voltage at the second node N2 may be a reference gate voltage Vn2_REF, and a voltage difference between gate and source voltages of the driving transistor DRT may be a reference gate-source voltage Vgs_REF.

Referring to FIGS. 13 and 14C, when the first kickback occurs, the first kickback gate-source voltage Vgs_C1, which is the voltage difference Vgs_COMP between the gate and source voltages of the driving transistor DRT, can become greater than the reference gate-source voltage Vgs_REF, which is the voltage difference between the gate and source voltages of the driving transistor DRT when the first kickback does not occur.

Referring to FIGS. 13 and 14C, at the second kickback timing Tkb2 at which the second kickback occurs after the first kickback, a voltage at the second node N2 forming the second compensation capacitor C2 together with the light emitting control line EML(n) can fall as a voltage on the light emitting control line EML(n) through which the light emitting control signal EM(n) is supplied is changed to the low-level voltage LOW. In this example, a falling width of the voltage at the second node N2 can depend on a voltage change width HIGH-LOW of the light emitting control signal EM(n).

Referring to FIGS. 13 and 14C, the voltage Vn2_COMP lowered at the second node N2 by the second kickback can become a third kickback gate voltage Vn2_C1+C2. Accordingly, a voltage difference Vgs_COMP between gate and source voltages of the driving transistor DRT can become a third kickback gate-source voltage Vgs_C1+C2. In this example, the third kickback gate voltage Vn2_C1+C2 can be equal to or greater than the second kickback gate voltage Vn2_C2. The third kickback gate-source voltage Vgs_C1+C2 can be equal to or greater than the second kickback gate-source voltage Vgs_C2.

Referring to FIGS. 13 and 14C, when driving a subpixel SP in which the second kickback does not occur, a voltage at the second node N2 may be a reference gate voltage Vn2_REF, and a voltage difference between gate and source voltages of the driving transistor DRT may be a reference gate-source voltage Vgs_REF.

In this example, the subpixel SP in which the second kickback does not occur may be the second subpixel SP2 in the non-optical area NA that does not include both the first compensation capacitor C1 and the second compensation capacitor C2.

Referring to FIGS. 13 and 14C, when the second kickback occurs subsequently after the first kickback, the third kickback gate-source voltage Vgs_C1+C2, which is the voltage difference Vgs_COMP between the gate and source voltages of the driving transistor DRT, can become much greater than the reference gate-source voltage Vgs_REF, which is the voltage difference between the gate and source voltages of the driving transistor DRT when both the first kickback and the second kickback do not occur.

In one or more example embodiments, the first subpixel SP1 of the first optical area OA1 and the second subpixel SP2 of the non-optical area NA may be disposed in the same row, in the same column or in different columns. In this case, a first data voltage Vdata through the first data line DL1 can be applied to the first subpixel SP1 of the first optical area OA1, and a second data voltage Vdata through the second data line DL2 or the first data line DL1 can be applied to the second subpixel SP2 of the non-optical area NA.

When the first data voltage Vdata is the same as the second data voltage Vdata, a voltage difference (Vgs_COMP, i.e., Vgs_C1, Vgs_C2, or Vgs_C1+C2) between gate and source voltages of the driving transistor DRT during a light emitting period S8 of the first subpixel SP1 can be greater than a voltage difference Vgs_REF between gate and source voltages of the driving transistor DRT during a light emitting period S8 of the second subpixel SP2.

A voltage difference (Vgs_COMP, i.e., Vgs_C1, Vgs_C2, or Vgs_C1+C2) between the gate and source voltages of the driving transistor DRT in the first subpixel SP1 can increase as the compensation capacitors C1 and C2 are configured in the first subpixel SP1 disposed in the first optical area OA1, and kickback on a gate voltage of the driving transistor DRT in the first subpixel SP1 occurs by the compensation capacitors C1 and C2.

Accordingly, even when the first data voltage Vdata supplied to the first subpixel SP1 disposed in the first optical area OA1 is equal to the second data voltage Vdata supplied to the second subpixel SP2 disposed in the non-optical area NA, one first subpixel SP1 disposed in the first optical area OA1 can emit light more brightly than one second subpixel SP2 disposed in the non-optical area NA. As a result, the overall luminance (or a level thereof) of the first optical area OA1 having a relatively small number of subpixels per unit area can become similar to that of the non-optical area NA having a relatively large number of subpixels per unit area.

That is, although the total number of first subpixels SP1 disposed in the first optical area OA1 is small, as each of the first subpixels SP1 disposed in the first optical area OA1 emits light more brightly, therefore, the overall luminance (or a level thereof) of the first optical area OA1 can become similar to that of the non-optical area NA.

As described above, when the first data voltage Vdata supplied to the first subpixel SP1 disposed in the first optical area OA1 is equal to the second data voltage Vdata supplied to the second subpixel SP2 disposed in the non-optical area NA, according to the schemes for compensating for the luminance difference, a difference between the luminance Loa1 of the first optical area OA1 and the luminance Lna of the non-optical area NA can be smaller than a difference between the luminance of the first subpixel SP1 by the supplying of the first data voltage Vdata and the luminance of the second subpixel SP2 by the supplying of the second data voltage Vdata.

Referring to FIGS. 13 and 14A to 14C, at the first kickback timing Tkb1, the first scan signal SC1(*n*) can be changed from the turn-on level voltage (the high-level voltage HIGH) to the turn-off level voltage (the low-level voltage LOW). At the second kickback timing Tkb2 later than the first kickback timing Tkb1, the light emitting control signal EM(n) can be changed from the turn-off level voltage (the high-level voltage HIGH) to the turn-on level voltage (the low-level voltage LOW.

Referring to FIG. 14A, at the first kickback timing Tkb1, the voltage of the second node N2 can be changed according to a change in voltage of the first scan signal SC1(*n*). Referring to FIG. 14B, at the second kickback timing Tkb2, the voltage of the second node N2 can be changed according to a change in voltage of the light emitting control signal EM(n).

Referring to FIG. 14C, the voltage of the second node N2 can be changed according to a change in voltage of the first scan signal SC1(*n*) at the first kickback timing Tkb1, and the voltage of the second node N2 can be changed according to a change in voltage of the control signal EM(n) at the second kickback timing Tkb2.

Hereinafter, a luminance difference compensation structure in which in the first subpixel SP1 disposed in the first optical area OA1, the second node N2 is capacitively coupled with at least one of the first scan line SCL1(*n*) and the light emitting control line EML(n) will be described in more detail with reference to FIGS. 15A and 15B. In these examples, the luminance difference compensation structure may include at least one of the first compensation capacitor C1 and the second compensation capacitor C2.

In the discussion that follows, for convenience of description, it is assumed that the first subpixel SP1 of the first optical area OA1 includes both the first compensation capacitor C1 and the second compensation capacitor C2, and thus, a luminance difference compensation structure including both the first compensation capacitor C1 and the second compensation capacitor C2 will be described in more detail with reference to FIGS. 15A and 15B. Thereafter, in comparison, a structure in a plan view of the second subpixel SP2 of the non-optical area NA not including a luminance difference compensation structure will be discussed with reference to FIGS. 16A and 16B.

Figure 15A:
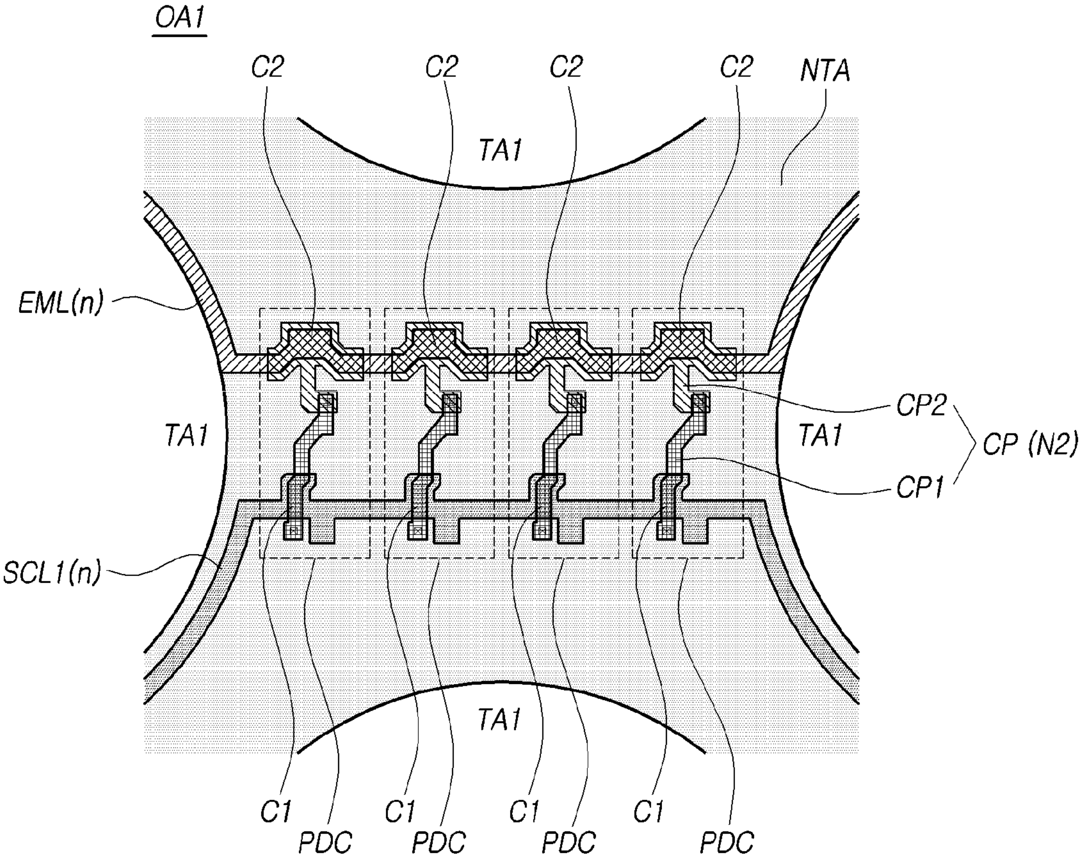
FIGS. 15A and 15B illustrate example structures in a plan view of the first compensation capacitor and the second compensation capacitor included in the first subpixel of the first optical area in the display device according to aspects of the present disclosure.
Figure 15B:
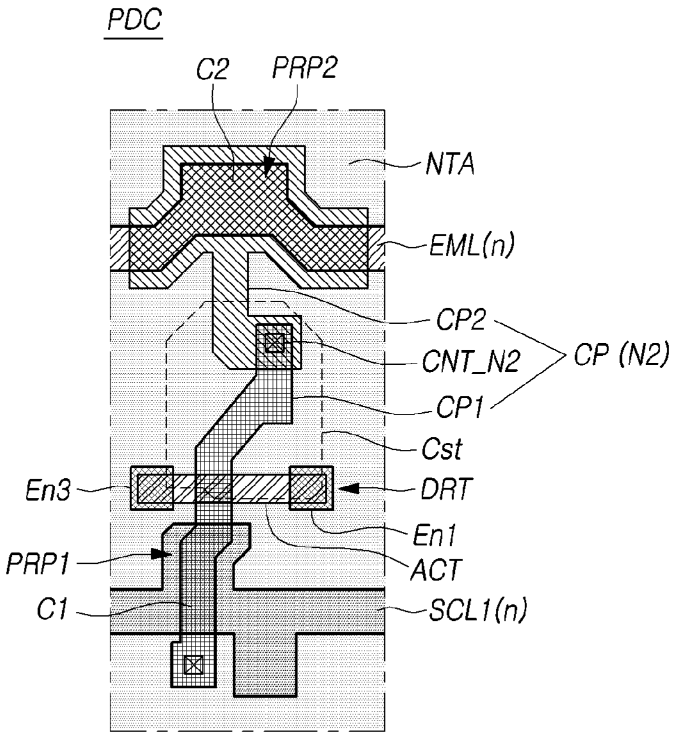

FIGS. 15A and 15B illustrate example structures in a plan view of the first compensation capacitor C1 and the second compensation capacitor C2 included in the first subpixel SP1 disposed in the first optical area OA1 in the display device 100 according to aspects of the present disclosure.

Referring to FIGS. 15A and 15B, the first scan line SCL1(*n*) and the light emitting control line EML(n) may run through the first optical area OA1. When the first scan line SCL1(*n*) and the light emitting control line EML(n) run through the first optical area OA1, the first scan line SCL1(*n*) and the light emitting control line EML(n) may be disposed in the non-transmission area NTA of the first optical area OA1 while avoiding the first transmission areas TA1 thereof.

Referring to FIGS. 15A and 15B, each of the first scan line SCL1(*n*) and the light emitting control line EML(n) may run through areas of pixel driving circuits PDC of a plurality of first subpixels SP1 disposed in the non-transmission area NTA in the first optical area OA1.

Referring to FIGS. 15A and 15B, a connection pattern CP may be disposed in each of areas of the pixel driving circuits PDC of the plurality of first subpixels SP1 disposed in the non-transmission area NTA in the first optical area OA1. That is, each first subpixel SP1 may include the connection pattern CP corresponding to the second node N2.

Referring to FIGS. 15A and 15B, a driving transistor DRT and a storage capacitor Cst may be disposed in each of the areas of the pixel driving circuits PDC of the plurality of first subpixels SP1 disposed in the non-transmission area NTA in the first optical area OA1.

Referring to FIGS. 15A and 15B, each driving transistor DRT may include a source electrode En1 corresponding to the first node N1, a drain electrode En3 corresponding to the third node N3, a connection pattern CP corresponding to the second node N2 and serving as a gate electrode, and an active layer ACT. Referring to FIGS. 15A and 15B, the storage capacitor Cst may be formed between the second node N2 and the driving voltage line DVL.

Referring to FIGS. 15A and 15B, as the connection pattern CP and the first scan line SCL1(*n*) overlap each other, the first compensation capacitor C1 can be formed. The capacitance of the first compensation capacitor C1 can be proportional to an area in which the connection pattern CP and the first scan line SCL1(*n*) overlap.

Referring to FIGS. 15A and 15B, in order to increase the capacitance of the first compensation capacitor C1, the first scan line SCL1(*n*) may include a first compensation protrusion PRP1 in the non-transmission area NTA in the first optical area OA1. For example, the first compensation protrusion PRP1 of the first scan line SCL1(*n*) may protrude upwardly to be adjacent to the driving transistor DRT.

Referring to FIGS. 15A and 15B, in the non-transmission area NTA in the first optical area OA1, the connection pattern CP may intersect the active layer ACT of the driving transistor DRT and overlap the first compensation protrusion PRP1.

Referring to FIGS. 15A and 15B, as the connection pattern CP and the light emitting control line EML(n) overlap each other, the second compensation capacitor C2 can be formed. The capacitance of the second compensation capacitor C2 can be proportional to an area in which the connection pattern CP and the light emitting control line EML(n) overlap.

Referring to FIGS. 15A and 15B, in order to increase the capacitance of the second compensation capacitor C2, the light emitting control line EML(n) may include a second compensation protrusion PRP2 in the non-transmission area NTA in the first optical area OA1. For example, the second compensation protrusion PRP2 of the light emitting control line EML(n) may protrude upwardly to be moved away from the driving transistor DRT.

Referring to FIGS. 15A and 15B, in the non-transmission area NTA in the first optical area OA1, the connection pattern CP may intersect the active layer ACT of the driving transistor DRT and overlap the second compensation protrusion PRP2. Referring to FIGS. 15A and 15B, the connection pattern CP may intersect the active layer ACT of the driving transistor DRT, overlap the first compensation protrusion PRP1 of the first scan line SCL1(*n*), and overlap the second compensation protrusion PRP2 of the light emitting control line EML(n).

Referring to FIGS. 15A and 15B, the connection pattern CP may include a first connection pattern CP1 overlapping the first compensation protrusion PRP1 and a second connection pattern CP2 overlapping the second compensation protrusion PRP2. The first connection pattern CP1 and the second connection pattern CP2 may be located in different layers and may be electrically connected to each other through a contact hole CNT_N2.

Figure 16A:
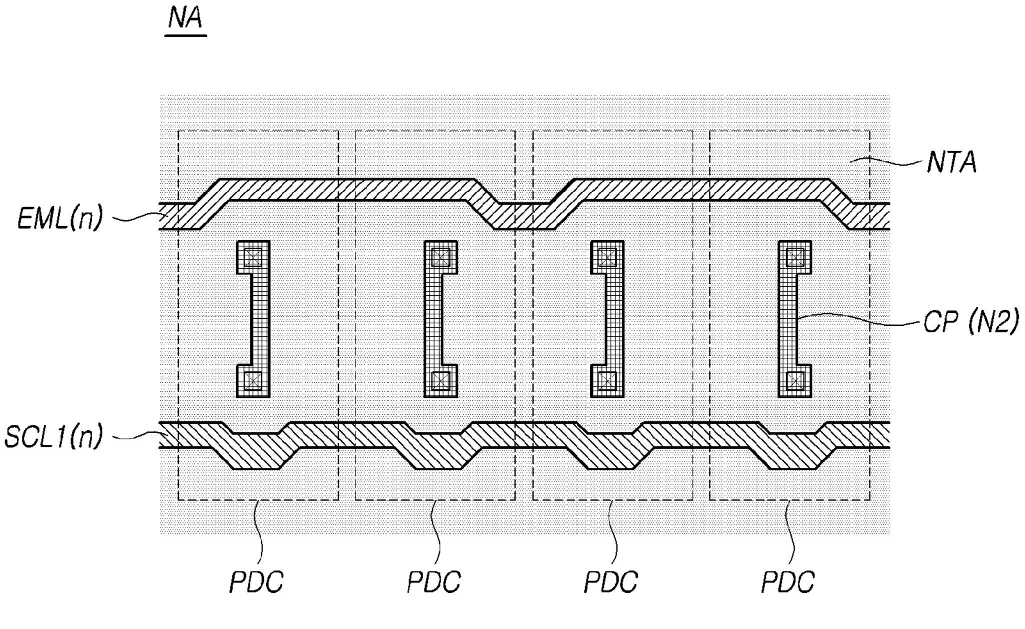
FIGS. 16A and 16B illustrate example structures in a plan view of the second subpixel of the non-optical area in the display device according to aspects of the present disclosure.
Figure 16B:
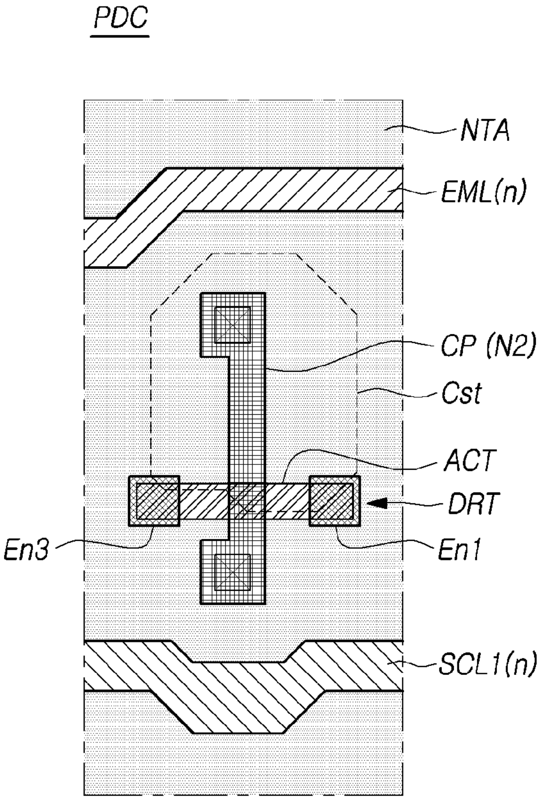

FIGS. 16A and 16B illustrate example structures in a plan view of the second subpixel SP2 of the non-optical area NA in the display device 100 according to aspects of the present disclosure.

Referring to FIGS. 16A and 16B, in one or more example embodiments, the second subpixel SP2 disposed in the non-optical area NA may not include the first compensation capacitor C1 and the second compensation capacitor C2 serving as the luminance difference compensation structure. Accordingly, each of the first scan line SCL1(*n*) and the light emitting control line EML(n) may not include a protrusion for expanding an area overlapped with the connection pattern CP corresponding to the second node N2. The connection pattern CP corresponding to the second node N2 may not overlap the first scan line SCL1(*n*). The connection pattern CP corresponding to the second node N2 may not overlap the light emitting control line EML(n).

In some situations, the connection pattern CP may partially overlap at least one of the first scan line SCL1(*n*) and the light emitting control line EML(n). In this situation, since an area in which the connection pattern CP overlaps at least one of the first scan line SCL1(*n*) and the light emitting control line EML(n) is very small, kickback capable of changing corresponding luminance (or a characteristic in the luminance) may not occur.

As described above, the luminance difference compensation structure formed in the first subpixel SP1 of the first optical area OA1 has been provided in order to compensate for a difference in luminance between the first optical area OA1 and the non-optical area NA. The luminance difference compensation structure formed in the first subpixel SP1 of the first optical area OA1 as described above may be equally applied to a third subpixel SP3 of the second optical area OA2. Hereinafter, in order to compensate for a difference in luminance between the second optical area OA2 and the non-optical area NA, a luminance difference compensation structure formed in the third subpixel SP3 of the second optical area OA2 will be briefly described with reference to FIG. 17.

Figure 17:
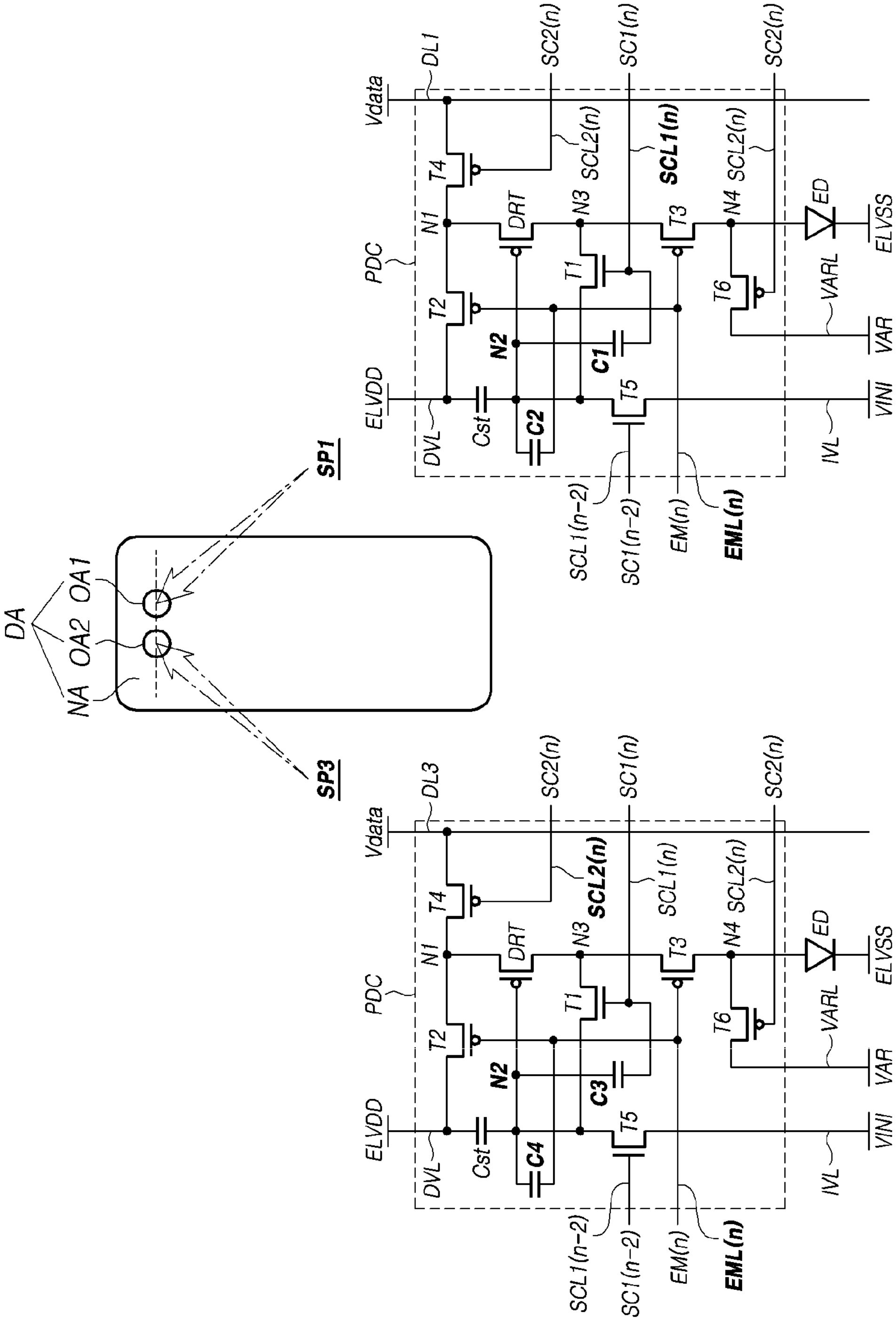
FIG. 17 illustrates an example equivalent circuit of a first subpixel of the first optical area and an example equivalent circuit of a third subpixel of the second optical area in the display device according to aspects of the present disclosure.

FIG. 17 illustrates an example equivalent circuit of the first subpixel SP1 of the first optical area OA1 and an equivalent circuit of the third subpixel SP3 of the second optical area OA2 in the display device 100 according to aspects of the present disclosure.

Referring to FIG. 17, the display area DA of the display panel 110 may include the first optical area OA1, the second optical area OA2, and the non-optical area NA different from the first optical area OA1 and the second optical area OA2. The first subpixel SP1 may be disposed in a non-transmission area NTA except for a plurality of first transmission areas TA1 in the first optical area OA1. The third subpixel SP3 may be disposed in a non-transmission area NTA except for a plurality of second transmission areas TA2 in the second optical area OA2.

In order to compensate for a difference in luminance between the first optical area OA1 and the non-optical area NA, the first subpixel SP1 of the first optical area OA1 may include at least one of the first compensation capacitor C1 formed between the second node N2 and the first scan line SCL1(*n*), and the second compensation capacitor C2 formed between the second node N2 and the light emitting control line EML(n).

In order to compensate for a difference in luminance between the second optical area OA2 and the non-optical area NA, the third subpixel SP3 of the second optical area OA2 may include at least one of a third compensation capacitor C3 formed between the second node N2 and the first scan line SCL1(*n*), and a fourth compensation capacitor C4 formed between the second node N2 and the light emitting control line EML(n).

The number of subpixels per unit area in the first optical areas OA1 may be smaller than the number of subpixels per unit area in the non-optical area NA. The number of subpixels Noa2 per unit area in the second optical area OA2 may be greater than or equal to the number of subpixels Noa1 per unit area in the first optical area OA1, and the number of subpixels Noa2 per unit area in the second optical area OA2 may be less than the number of subpixels Nna per unit area in the non-optical area NA.

As described above, a difference in the number of subpixels per unit area between the first optical area OA1 and the non-optical area NA may be greater than or equal to a difference in the number of subpixels per unit area between the second optical area OA2 and the non-optical area NA. Accordingly, a difference in luminance between the first optical area OA1 and the non-optical area NA may be greater than or equal to a difference in luminance between the second optical area OA2 and the non-optical area NA.

Accordingly, a magnitude of luminance difference compensation between the first optical area OA1 and the non-optical area NA may be greater than or equal to a magnitude of luminance difference compensation between the second optical area OA2 and the non-optical area NA. Taking account of this, the first and second compensation capacitors C1 and C2 in the first subpixel SP1 of the first optical area OA1, and the third and fourth compensation capacitors C3 and C4 in the third subpixel SP3 of the second optical area OA2 are needed to be designed.

For example, the capacitance of the first compensation capacitor C1 in the first subpixel SP1 of the first optical area OA1 may be greater than or equal to the capacitance of the third compensation capacitor C3 in the third subpixel SP3 of the second optical area OA2.

In another example, the capacitance of the second compensation capacitor C2 in the first subpixel SP1 of the first optical area OA1 may be greater than or equal to the capacitance of the fourth compensation capacitor C4 in the third subpixel SP3 of the second optical area OA2.

In yet another example, a combined capacitance of the first compensation capacitor C1 and the second compensation capacitor C2 in the first subpixel SP1 of the first optical area OA1 may be greater than or equal to a combined capacitance of the third compensation capacitor C3 and the fourth compensation capacitor C4 in the third subpixel SP3 of the second optical area OA2.

The display device 100 according to the example embodiments described above can be described as follows.

The display device 100 according to aspects of the present disclosure may include a plurality of subpixels SP disposed in the display area DA for displaying an image, each of the plurality of subpixels SP including a light emitting element ED, a driving transistor DRT for driving the light emitting element ED, and a transistor whose turn-on/turn-off is controlled by a gate signal supplied through a gate line GL.

In this example, the transistor may be the first transistor T1 or the fifth transistor T5; the gate line GL may be the first scan line SCL1(*n*) or the light emitting control line EML(n); and the gate signal may be the first scan signal SC1(*n*) or the light emitting control signal EM(n).

The plurality of subpixels SP may include one or more subpixels disposed in a specific area in the display area DA. The specific area may be the first optical area OA1 or the second optical area OA2. The subpixel disposed in the specific area may be the first subpixel SP1 of the first optical area OA1 or the third subpixel SP3 of the second optical area OA2.

The subpixel disposed in the specific area may include a compensation capacitor formed by the overlapping of a gate node of the driving transistor DRT or a connection pattern CP connected to the gate node and the gate line GL.

The gate node of the driving transistor DRT in the subpixel disposed in the specific area may be the second node N2. The compensation capacitor may be the first compensation capacitor C1 or the second compensation capacitor C2.

At a timing at which a data voltage or a voltage translated from the data voltage is applied to the gate node of the driving transistor DRT in the subpixel disposed in the specific area, a voltage level of the gate signal supplied through the gate line GL may be changed to a low-level voltage. In this example, the timing at which the data voltage or the voltage in which the data voltage or the voltage translated from the data voltage is applied to the gate node of the driving transistor DRT may be the first kickback timing Tkb1 or the second kickback timing Tkb2.

One or more example embodiments described herein may provide the display device 100 having the light transmission structure in which one or more optical electronic devices 11 and 12 located under the display area DA of the display panel 110 are able to normally receive or detect light.

One or more example embodiments described herein may provide the display device 100 capable of normally performing display driving in one or more optical areas OA1 and OA2 included in the display area DA of the display panel 110 and overlapping one or more optical electronic devices 11 and 12.

One or more example embodiments described herein may provide the display device 100 capable of reducing or preventing a difference in luminance between one or more optical areas OA1 and OA2 and the non-optical area NA.

One or more example embodiments described herein may provide the display device 100 capable of reducing or preventing a difference in luminance between one or more optical areas OA1 and OA2 and the non-optical area NA by configuring or designing one or more subpixels in the optical area to have a luminance difference compensation structure.

Various examples of aspects of the disclosure are described below for convenience. These are provided as examples, and do not limit the subject technology.

One or more example embodiments provide a display device, including: a plurality of subpixels disposed in a display area for displaying an image, each of the plurality of subpixels including: a first node, a second node, a third node, and a fourth node; a light emitting element connected to the fourth node; a driving transistor configured to be controlled by a voltage at the second node and configured to drive the light emitting element; a first transistor configured to be controlled by a first scan signal supplied through a first scan line and configured to control a connection between the second node and the third node; a second transistor configured to be controlled by a light emitting control signal supplied through a light emitting control line and configured to control a connection between the first node and a driving voltage line; and a third transistor configured to be controlled by the light emitting control signal and configured to control a connection between the third node and the fourth node, wherein the plurality of subpixels includes a first subpixel disposed in a first area in the display area, and wherein the second node in the first subpixel is capacitively coupled with at least one of the first scan line and the light emitting control line.

One or more examples provide that: the display area includes an optical area including a plurality of light emitting areas and a plurality of transmission areas; the display area further includes a non-optical area located outside of the optical area, the non-optical area including a plurality of light emitting areas; and the first area is a non-transmission area except for the plurality of transmission areas in the optical area.

One or more examples provide that the plurality of subpixels includes a second subpixel disposed in the non-optical area, and the second node in the second subpixel does not have capacitive coupling with the first scan line and the light emitting control line.

One or more examples provide that: the display device is configured to apply, to the first subpixel, a first data voltage through a first data line; the display device is configured to apply, to the second subpixel, a second data voltage through a second data line or the first data line; and when the first data voltage is substantially equal to the second data voltage, a voltage difference between gate and source voltages of the driving transistor during a light emitting period of the first subpixel is greater than a voltage difference between gate and source voltages of the driving transistor during a light emitting period of the second subpixel.

One or more examples provide that when the first data voltage is substantially equal to the second data voltage, a difference between luminance of the optical area and luminance of the non-optical area is smaller than a difference between luminance of the first subpixel based on the first data voltage and luminance of the second subpixel based on the second data voltage.

One or more examples provide that the first subpixel includes a first compensation capacitor between the second node and the first scan line.

One or more examples provide that at a first timing, the first scan signal is changed from a first turn-on level voltage to a first turn-off level voltage, and at a second timing later than the first timing, the light emitting control signal is changed from a second turn-off level voltage to a second turn-on level voltage, and that at the first timing, the voltage at the second node is changed according to a change in voltage of the first scan signal.

One or more examples provide that the first subpixel includes a connection pattern corresponding to the second node, and the first scan line includes a first compensation protrusion, and that the connection pattern intersects an active layer of the driving transistor and overlaps the first compensation protrusion.

One or more examples provide that the first subpixel includes a second compensation capacitor between the second node and the light emitting control line.

One or more examples provide that at a first timing, the first scan signal is changed from a first turn-on level voltage to a first turn-off level voltage, and at a second timing later than the first timing, the light emitting control signal is changed from a second turn-off level voltage to a second turn-on level voltage, and that at the second timing, the voltage at the second node is changed according to a change in voltage of the light emitting control signal.

One or more examples provide that the first subpixel includes a connection pattern corresponding to the second node, and the light emitting control line includes a second compensation protrusion, and that the connection pattern intersects an active layer of the driving transistor and overlaps the second compensation protrusion.

One or more examples provide that the first subpixel includes a first compensation capacitor between the second node and the first scan line and a second compensation capacitor between the second node and the light emitting control line.

One or more examples provide that at a first timing, the first scan signal is changed from a first turn-on level voltage to a first turn-off level voltage, and at a second timing later than the first timing, the light emitting control signal is changed from a second turn-off level voltage to a second turn-on level voltage, and that at the first timing, the voltage at the second node is changed according to a change in voltage of the first scan signal, and at the second timing, the voltage at the second node is changed according to a change in voltage of the light emitting control signal.

One or more examples provide that the first subpixel includes a connection pattern corresponding to the second node, and the first scan line and the light emitting control line include a first compensation protrusion and a second compensation protrusion, respectively, and that the connection pattern intersects an active layer of the driving transistor, overlaps the first compensation protrusion, and overlaps the second compensation protrusion.

One or more examples provide that the connection pattern includes a first connection pattern overlapping the first compensation protrusion and a second connection pattern overlapping the second compensation protrusion, and that the first connection pattern and the second connection pattern are located in different layers and electrically connected through a contact hole.

One or more examples provide that a first capacitance of the first compensation capacitor and a second capacitance of the second compensation capacitor are substantially equal to each other.

One or more examples provide that a first capacitance of the first compensation capacitor and a second capacitance of the second compensation capacitor are different from each other.

One or more examples provide that each of the plurality of subpixels further includes: a fourth transistor configured to control a connection between the first node and a first data line; a fifth transistor configured to control a connection between the second node and a first initialization line; a sixth transistor configured to control a connection between the fourth node and a second initialization line; and a storage capacitor disposed between the second node and the driving voltage line.

One or more examples provide that the display area includes a first optical area, a second optical area, and a non-optical area, the non-optical area being different from the first and second optical areas, that each of the first optical area and the second optical area includes a plurality of light emitting areas and a plurality of transmission areas, and the non-optical area includes a plurality of light emitting areas, that a number of subpixels per unit area in the first optical area is smaller than a number of subpixels per unit area in the non-optical area, and that a number of subpixels per unit area in the second optical area is greater than or equal to the number of subpixels per unit area in the first optical area, and is smaller than the number of subpixels per unit area in the non-optical area.

One or more examples provide that the first subpixel is disposed in the first area, which is a non-transmission area except for the plurality of transmission areas in the first optical area, that the plurality of subpixels further includes a third subpixel disposed in a non-transmission area except for the plurality of transmission areas in the second optical area, that the first subpixel includes at least one of a first compensation capacitor between the second node and the first scan line of the first subpixel and a second compensation capacitor between the second node and the light emitting control line of the first subpixel, and that the third subpixel includes a third compensation capacitor between the second node and the first scan line of the third subpixel and a fourth compensation capacitor between the second node and the light emitting control line of the third subpixel.

One or more examples provide that a capacitance of the first compensation capacitor is greater than or equal to a capacitance of the third compensation capacitor; a capacitance of the second compensation capacitor is greater than or equal to a capacitance of the fourth compensation capacitor; or a combined capacitance of the first compensation capacitor and the second compensation capacitor is equal to or greater than a combined capacitance of the third compensation capacitor and the fourth compensation capacitor.

One or more example embodiments provide a display device, including: a plurality of subpixels disposed in a display area for displaying an image, each of the plurality of subpixels including: a first node, a second node, a third node, and a fourth node; a light emitting element connected to the fourth node; a driving transistor configured to be controlled by a voltage at the second node and configured to drive the light emitting element; a first transistor configured to be controlled by a first scan signal supplied through a first scan line and configured to control a connection between the second node and the third node; a second transistor configured to be controlled by a light emitting control signal supplied through a light emitting control line and configured to control a connection between the first node and a driving voltage line; and a third transistor configured to be controlled by the light emitting control signal and configured to control a connection between the third node and the fourth node, wherein the plurality of subpixels includes a first subpixel disposed in a first area in the display area, and wherein the first subpixel includes at least one of a first compensation capacitor between the second node and the first scan line and a second compensation capacitor between the second node and the light emitting control line.

One or more examples provide that the plurality of subpixels includes a second subpixel disposed in a non-optical area.

One or more examples provide that: the display device is configured to apply, to the first subpixel, a first data voltage through a first data line; the display device is configured to apply, to the second subpixel, a second data voltage through a second data line or the first data line; and when the first data voltage is substantially equal to the second data voltage, a voltage difference between gate and source voltages of the driving transistor during a light emitting period of the first subpixel is greater than a voltage difference between gate and source voltages of the driving transistor during a light emitting period of the second subpixel.

One or more example embodiments provide a display device, including: a plurality of subpixels disposed in a display area for displaying an image, each of the plurality of subpixels including: a light emitting element; a driving transistor configured to drive the light emitting element; and a transistor configured to have turn-on or turn-off of the transistor controlled by a gate signal supplied through a gate line, wherein the plurality of subpixels includes a subpixel disposed in a specific area in the display area, and the subpixel disposed in the specific area includes a compensation capacitor formed by overlapping of a gate node of the driving transistor or a connection pattern connected to the gate node of the driving transistor and the gate line, wherein a voltage level of the gate signal supplied through the gate line is changed to a second voltage level at a timing at which a data voltage or a voltage resulting from changing of the data voltage is applied to the gate node of the driving transistor, and wherein the second voltage level is lower than the voltage level.

The above description has been presented to enable any person skilled in the art to make, use and practice the technical features of the present invention, and has been provided in the context of a particular application and its requirements as examples. Various modifications, additions and substitutions to the described embodiments will be readily apparent to those skilled in the art, and the principles described herein may be applied to other embodiments and applications without departing from the scope of the present invention. The above description and the accompanying drawings provide examples of the technical features of the present invention for illustrative purposes only. That is, the disclosed embodiments are intended to illustrate the scope of the technical features of the present invention. Thus, the scope of the present invention is not limited to the embodiments shown, but is to be accorded the widest scope consistent with the claims. The scope of protection of the present invention should be construed based on the following claims, and all technical features within the scope of equivalents thereof should be construed as being included within the scope of the present invention.

What is claimed is:

1. A display device, comprising:

a plurality of subpixels disposed in a display area for displaying an image, each of the plurality of subpixels comprising:

a first node, a second node, a third node, and a fourth node;

a driving transistor configured to be controlled by a voltage at the second node and configured to control emission of a corresponding one of the plurality of subpixels;

a first transistor configured to be controlled by a first scan signal supplied through a first scan line and configured to control a connection between the second node and the third node;

a second transistor configured to be controlled by a light emitting control signal supplied through a light emitting control line and configured to control a connection between the first node and a driving voltage line; and a third transistor configured to be controlled by the light emitting control signal and configured to control a connection between the third node and the fourth node, wherein the display area comprises an optical area including respective light emitting areas of a first plurality of subpixels disposed in the optical area among the plurality of subpixels, and a plurality of transmission areas allowing light reaching a surface of the display device to be transmitted and disposed adjacent to the light emitting areas, wherein the first plurality of subpixels comprises a first subpixel disposed in a first area in the optical area, and wherein the second node in the first subpixel between at least two adjacent transmission areas among the plurality of transmission areas is capacitively coupled with at least one of the first scan line and the light emitting control line.

2. The display device according to claim 1, wherein:

the display area further comprises a normal area that is different from the optical area and is located outside of the optical area, the normal area including a second plurality of light emitting areas disposed in the normal area among the plurality of subpixels; and the first area is a non-transmission area except for the plurality of transmission areas in the optical area.

3. The display device according to claim 2, wherein a second plurality of subpixels comprises a second subpixel disposed in the normal area, and the second node in the second subpixel does not have capacitive coupling with the first scan line and the light emitting control line.

4. The display device according to claim 3, wherein:

the display device is configured to apply, to the first subpixel, a first data voltage through a first data line;

the display device is configured to apply, to the second subpixel, a second data voltage through a second data line; and when the first data voltage is substantially equal to the second data voltage, a voltage difference between gate and source voltages of the driving transistor during a light emitting period of the first subpixel is greater than a voltage difference between gate and source voltages of the driving transistor during a light emitting period of the second subpixel.

5. The display device according to claim 4, wherein when the first data voltage is substantially equal to the second data voltage, a difference between luminance of the optical area and luminance of the normal area is smaller than a difference between luminance of the first subpixel based on the first data voltage and luminance of the second subpixel based on the second data voltage.

6. The display device according to claim 1, wherein the first subpixel comprises a first compensation capacitor between the second node and the first scan line.

7. The display device according to claim 6, wherein at a first timing, the first scan signal is changed from a first turn-on level voltage to a first turn-off level voltage, and at a second timing later than the first timing, the light emitting control signal is changed from a second turn-off level voltage to a second turn-on level voltage, and wherein at the first timing, the voltage at the second node is changed according to a change in voltage of the first scan signal.

8. The display device according to claim 6, wherein the first subpixel comprises a connection pattern corresponding to the second node, and the first scan line comprises a first compensation protrusion, and wherein the connection pattern intersects an active layer of the driving transistor and overlaps the first compensation protrusion.

9. The display device according to claim 1, wherein the first subpixel comprises a second compensation capacitor between the second node and the light emitting control line.

10. The display device according to claim 9, wherein at a first timing, the first scan signal is changed from a first turn-on level voltage to a first turn-off level voltage, and at a second timing later than the first timing, the light emitting control signal is changed from a second turn-off level voltage to a second turn-on level voltage, and wherein at the second timing, the voltage at the second node is changed according to a change in voltage of the light emitting control signal.

11. The display device according to claim 9, wherein the first subpixel comprises a connection pattern corresponding to the second node, and the light emitting control line comprises a second compensation protrusion, and wherein the connection pattern intersects an active layer of the driving transistor and overlaps the second compensation protrusion.

12. The display device according to claim 1, wherein the first subpixel comprises a first compensation capacitor between the second node and the first scan line and a second compensation capacitor between the second node and the light emitting control line.

13. The display device according to claim 12, wherein at a first timing, the first scan signal is changed from a first turn-on level voltage to a first turn-off level voltage, and at a second timing later than the first timing, the light emitting control signal is changed from a second turn-off level voltage to a second turn-on level voltage, and wherein at the first timing, the voltage at the second node is changed according to a change in voltage of the first scan signal, and at the second timing, the voltage at the second node is changed according to a change in voltage of the light emitting control signal.

14. The display device according to claim 12, wherein the first subpixel comprises a connection pattern corresponding to the second node, and the first scan line and the light emitting control line comprise a first compensation protrusion and a second compensation protrusion, respectively, and wherein the connection pattern intersects an active layer of the driving transistor, overlaps the first compensation protrusion, and overlaps the second compensation protrusion.

15. The display device according to claim 14, wherein the connection pattern comprises a first connection pattern overlapping the first compensation protrusion and a second connection pattern overlapping the second compensation protrusion, and wherein the first connection pattern and the second connection pattern are located in different layers and electrically connected to each other through a contact hole.

16. The display device according to claim 12, wherein a first capacitance of the first compensation capacitor and a second capacitance of the second compensation capacitor are substantially equal to each other.

17. The display device according to claim 12, wherein a first capacitance of the first compensation capacitor and a second capacitance of the second compensation capacitor are different from each other.

18. The display device according to claim 1, wherein each of the plurality of subpixels further comprises:

a fourth transistor configured to control a connection between the first node and a first data line;

a fifth transistor configured to control a connection between the second node and a first initialization line;

a sixth transistor configured to control a connection between the fourth node and a second initialization line; and a storage capacitor disposed between the second node and the driving voltage line.

19. The display device according to claim 1, wherein the display area comprises a first optical area, a second optical area, and a normal area, the normal area being different from the first and second optical areas, wherein each of the first optical area and the second optical area comprises a plurality of light emitting areas and a plurality of transmission areas, and the normal area comprises a plurality of light emitting areas, wherein a number of subpixels per unit area in the first optical area is smaller than a number of subpixels per unit area in the normal area, and wherein a number of subpixels per unit area in the second optical area is greater than the number of subpixels per unit area in the first optical area, and is smaller than the number of subpixels per unit area in the normal area.

20. The display device according to claim 19, wherein the first area in which the first subpixel is disposed is a non-transmission area except for the plurality of transmission areas in the first optical area, wherein the plurality of subpixels further comprises a third subpixel disposed in a non-transmission area except for the plurality of transmission areas in the second optical area, wherein the first subpixel comprises at least one of a first compensation capacitor between the second node and the first scan line of the first subpixel and a second compensation capacitor between the second node and the light emitting control line of the first subpixel, and wherein the third subpixel comprises a third compensation capacitor between the second node and the first scan line of the third subpixel and a fourth compensation capacitor between the second node and the light emitting control line of the third subpixel.

21. The display device according to claim 20, wherein a capacitance of the first compensation capacitor is greater than a capacitance of the third compensation capacitor; a capacitance of the second compensation capacitor is greater than a capacitance of the fourth compensation capacitor.

22. The display device according to claim 3, wherein:

the display device is configured to apply, to the first subpixel, a first data voltage through a first data line;

the display device is configured to apply, to the second subpixel, a second data voltage through the first data line; and when the first data voltage is substantially equal to the second data voltage, a voltage difference between gate and source voltages of the driving transistor during a light emitting period of the first subpixel is greater than a voltage difference between gate and source voltages of the driving transistor during a light emitting period of the second subpixel.

23. The display device according to claim 1, wherein the display area comprises a first optical area, a second optical area, and a normal area, the normal area being different from the first and second optical areas, wherein each of the first optical area and the second optical area comprises a plurality of light emitting areas and a plurality of transmission areas, and the normal area comprises a plurality of light emitting areas, wherein a number of subpixels per unit area in the first optical area is smaller than a number of subpixels per unit area in the normal area, and wherein a number of subpixels per unit area in the second optical area is equal to the number of subpixels per unit area in the first optical area, and is smaller than the number of subpixels per unit area in the normal area.

24. The display device according to claim 20, wherein a capacitance of the first compensation capacitor is equal to a capacitance of the third compensation capacitor; a capacitance of the second compensation capacitor is equal to a capacitance of the fourth compensation capacitor; or a combined capacitance of the first compensation capacitor and the second compensation capacitor is equal to or greater than a combined capacitance of the third compensation capacitor and the fourth compensation capacitor.

* * * * *